United States Patent [19]
Krontz et al.

[11] Patent Number: 5,790,895
[45] Date of Patent: Aug. 4, 1998

[54] MODEM SHARING

[75] Inventors: Jeoff M. Krontz; Theodore F. Emerson, both of Houston, Tex.

[73] Assignee: Compaq Computer Corporation, Houston, Tex.

[21] Appl. No.: 733,415

[22] Filed: Oct. 18, 1996

[51] Int. Cl.$^6$ ................................. H04M 11/00
[52] U.S. Cl. .................. 395/884; 395/860; 395/856; 395/728
[58] Field of Search ..................... 395/821, 884, 395/856, 200.53, 728, 732, 860, 872; 379/93.05; 370/825.08, 825.06, 825.04, 825.07, 825.15

[56] References Cited

U.S. PATENT DOCUMENTS

| | | | |
|---|---|---|---|
| 4,667,193 | 5/1987 | Cotie et al. | 340/823.08 |
| 4,797,878 | 1/1989 | Armstrong | 370/96 |
| 5,577,105 | 11/1996 | Baum et al. | 379/93 |
| 5,628,030 | 5/1997 | Tuckner | 395/884 |
| 5,678,059 | 10/1997 | Ramasouang et al. | 395/821 |

*Primary Examiner*—Larry D. Donaghue
*Attorney, Agent, or Firm*—Pravel, Hewitt, Kimball & Krieger

[57] ABSTRACT

An apparatus supports the sharing of a resource among computer applications. The computer system has a processor which adapted for executing a first application in a first mode of operation and a second application in a second mode of operation. The computer system also has a communication port adapted to receive the resource. The communication port is normally allocated to receive accesses from the second application. The computer system also has a virtual port for emulating the communication port. The virtual port diverts accesses from the first application directed at the communication port and buffers the accesses in the virtual port. An arbitrator is connected to the processor, the communication port, and the virtual port. The arbitrator claims the communication port from the second application and forwards accesses received by the virtual port to the communication port if the first application is accessing the resource and if the communication port is idle. Further, the arbitrator reallocates the communication port back to the second application upon the termination of accesses to the resource by the first application.

59 Claims, 30 Drawing Sheets

MODEM SHARING

BACKGROUND OF THE INVENTION

1. Field of the Invention

The present invention relates to an apparatus for sharing a modem in a computer system, and more specifically, to an apparatus for sharing the modem between an operating system of the computer system and a remote console of the computer system.

2. Description of the Related Art

Remarkable improvements in computer hardware price/performance ratios during the last decade have caused a startling shift in both technical and office computing environments. As today's microprocessors can beat yesterday's mainframes and minicomputers in performance, a server computer based on a modern 32 or 64-bit microprocessor is capable of handling most computing requirements for an enterprise-wide computer network. Also, the need to share computer resources such as data files, printers and modems across offices of a company has further driven the development and improvement of computer networks, including a local area network (LAN). Recently, the development of larger networks such as wide area networks (WANs) which spread multiple printers, communication devices and databases across multiple servers has accentuated the need for greater management and error recovery capabilities necessary for microprocessor-based server computers to challenge minicomputers and mainframes in large scale applications.

During a normal computer boot-up, the operating system is loaded into the server computer memory before application software can be executed. When the server is unable to properly start up, a number of operations related to the management, maintenance and/or debug of the server computer system need to be performed. Traditionally, each server computer has a server console for displaying error messages and for communicating with an operator. As the server console is directly connected to the server computer and is thus accessible only at the site of the server computer, each server computer traditionally needs an on-site computer system administrator, a system supervisor, or an operator with considerable expertise in the isolation of and recovery from faults. Otherwise, whenever one of the server computers fails, trained field service personnel from the manufacturer of the server would have to be sent to the server computer system site in order to diagnose and repair problems.

In certain emergencies, an instant response at the console may be needed to prevent major system shutdown which is detrimental to the enterprise. As it is neither practical nor economical to dedicate one operator or technician to service the server twenty four hours a day, the more cost effective solution is to share the operator among multiple server computers. However, when failures occur at a local server site while the system operator or technician is at a remote location, the operator or technician has essentially three options. The first option is to travel to the server site to attend to the server. This option can be costly and presents logistical problems. The second option is to work over the phone with an individual at the server site by directing the individual to take appropriate remedial actions. This option is prone to miscommunications and requires redundant human resources. The third option is to ask an individual at the remote location to recable the server console such that the server console itself can communicate over the telephone lines with the system operator or technician. This option is also prone to miscommunication. Further, the option often worsens the problem through inadvertent displacement or damaging of network cables.

To solve this problem, the newer server computer typically provides a separate modem which is attached to a second computer, typically a single board microcomputer. The single board microcomputer and modem combination is dedicated to the remote observation and/or control of the server console from a console "client" at a remote location. The use of the dedicated computer and modem ensures that the remote console client can control the operation of the server, even if the operating system running on the server has crashed. Through the second computer, the operator at a remote console can restart the malfunctioning server computer by requesting that the server system reboot, or by executing certain diagnostic software. In this way, the server computer can be immediately diagnosed or restored to a good status without requiring the operator to be physically present at the server site twenty four hours a day.

However, the dedication of a separate microcomputer and modem solely for the remote observation and maintenance of the server computer adds additional costs to the system. Since the modem is commonly provided on the server computer to support various communications-related applications running on the operating system of the server computer, the modem can be used for both operating system software applications and for the remote console software applications. In the event that the server does not have a modem, an industry standard, low cost modem can be added which is less still expensive in comparison with the custom dedicated microcomputer/modem combination. Thus, the benefits associated with the remote console functions can be provided at a nominal cost. However, the use of a standard modem is problematic as the remote console application is not guaranteed access to the modem when the server computer is experiencing problems, as the operating system supporting the transmission between the modem and the application may have crashed. Under such circumstances, the remote console application would be unable to access the modem and the server computer cannot be remotely controlled.

SUMMARY OF THE INVENTION

The invention provides an apparatus which shares a resource, preferably a modem, between operation system software and remote console software to provide remote console capability at a low cost. The server computer has a processor which is adapted for executing a first application in a first mode of operation, preferably the operating system mode, and a second application executing in a second mode of operation, preferably the remote console mode. A virtual processor is provided to monitor and route data communication to and from the modem to either the operating system or the remote console application. The use of the virtual processor eliminates the risks caused by a crashed operating system.

The computer system has a communication port adapted to receive the modem resource. The communication port is normally allocated to receive accesses from the second application. The computer system also has a virtual port for emulating the communication port. The virtual communication port provides a set of shadow registers which emulate the registers of a Universal Asynchronous Receiver/Transmitter (UART) device. Accesses from the first application directed at the communication port are diverted and buffered in the virtual port.

An arbitrator is further connected to the processor, the communication port, and the virtual port. The arbitrator runs on a virtual processor under a system management interrupt mode (SMM) and claims the communication port from the second application. When this is done, the arbitrator forwards accesses received by the virtual port to the communication port if the first application is accessing the resource and if the communication port is idle. Upon the termination of accesses to the resource by the first application, the arbitrator reallocates the communication port back to the second application. In combination, the virtual communication port, the processor and the arbitrator transparently orchestrate accesses to a standard modem between the operating system software and the remote console software. In this way, only one of either the operating system software or the remote console software controls the modem at a time.

During the boot-up of the server, the operating system looks for the presence of a serial communication port, or COM port, by reading and writing to the register of the industry standard UART device. These accesses are intercepted by the present invention which responds to the register accesses by emulating the industry standard UART responses. Accordingly, the presence of the COM port is duly noted by the operating system as being available for accesses by the first application, even though the UART supporting the COM port is initially allocated to the second application which performs remote console functions.

When the server is running and the remote console software is not being executed, application software on the operating system is permitted to dial-out or to receive incoming communications using the modem resource. During a dial-out, the application software generates writes to the COM port which wakes up the arbitrator via a system management interrupt (SMI) interrupt. The arbitrator decides whether or not write operations from the first application should be forwarded to the modem, based on predetermined conditions. If the second application is not using the modem, the SMI software switches in the modem and allows the application software to directly access the modem. The SMI software stays resident in the background and "snoops" accesses to the modem to monitor modem usage. If the modem carrier drops or the modem carrier is not established within a predetermined time, the SMI-based arbitrator ejects the first application from ownership of the modem. This reclaims control of the modem and reallocates the modem resource back to the second application in anticipation of a new remote console session.

For dial-in accesses, the modem is configured to answer the incoming call. The arbitrator examines the first few characters received to determine the intended destination of the incoming call. If the initial few characters indicate that a remote console session is to be established, the arbitrator maintains ownership of the modem with the second application for performing remote console functions.

Alternatively, if the initial few characters received from the incoming call are inconsistent with the second application, such as a point-to-point packet (PPP) intended for the operating system, the apparatus of the present invention relinquishes the modem to the first application. In the preferred embodiment, the present invention buffers all characters received from the modem, such as the first few characters of a PPP packet, and upon determining that the call is not a second application call for the remote console, routes the buffered data stream to the first application running on the operating system after the destination has been analyzed. Thus, the remote terminal does not need to retransmit the first PPP packet. In another embodiment, the apparatus of the present invention simply gobbles the first PPP packet and expects the remote terminal to re-transmit the first PPP packet. Subsequently, the modem is directly connected to the operating system application software. Thus, incoming packets are properly routed to the application software from the modem.

The use of the virtual processor and the virtual communication port to control the standard modem ensures that the remote console client can control the operation of the server, even if the operating system of the server had crashed. The present invention taps into the processing power of the server CPU and the existing modem for applications in executing remote console operations when necessary. However, the present invention also permits control to be relinquished of the modem to applications on the operating system when remote console operations are no longer being performed. Thus, the present invention allows for the a modem to be shared between the operating system application and the remote console application. Hence, the overall cost of the server is reduced while the benefits and features associated with the remote console function are still provided.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

The following patents or patent applications are hereby incorporated by reference:

U.S. patent application Ser. No. 08/733,522, entitled "Transparent Keyboard Hot Plug," to Theodore F. Emerson, Jeoff M. Krontz, and Dayang Dai, and commonly assigned to the assignee of the present patent;

U.S. patent application Ser. No. 08/733,254, entitled "Video Eavesdropping and Reverse Assembly to Transmit Video Action to a Remote Console," to Theodore F. Emerson and Peter J. Michaels, and Jeoff M. Krontz, and commonly assigned to the assignee of the present patent.

Figure 1A:
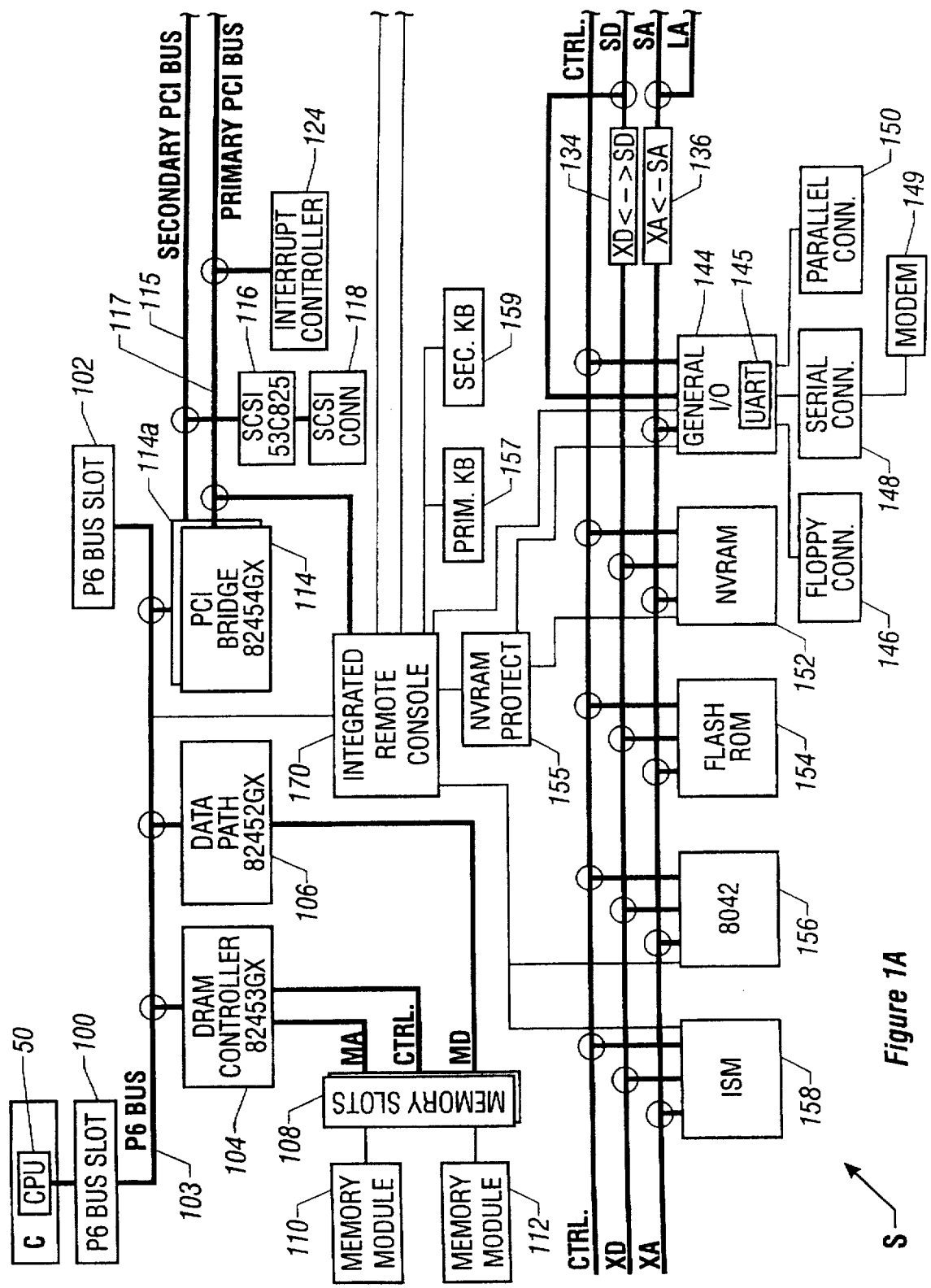
FIG. 1 is a block diagram of a computer system having an integrated remote console device in accordance with the present invention.
Figure 1B:
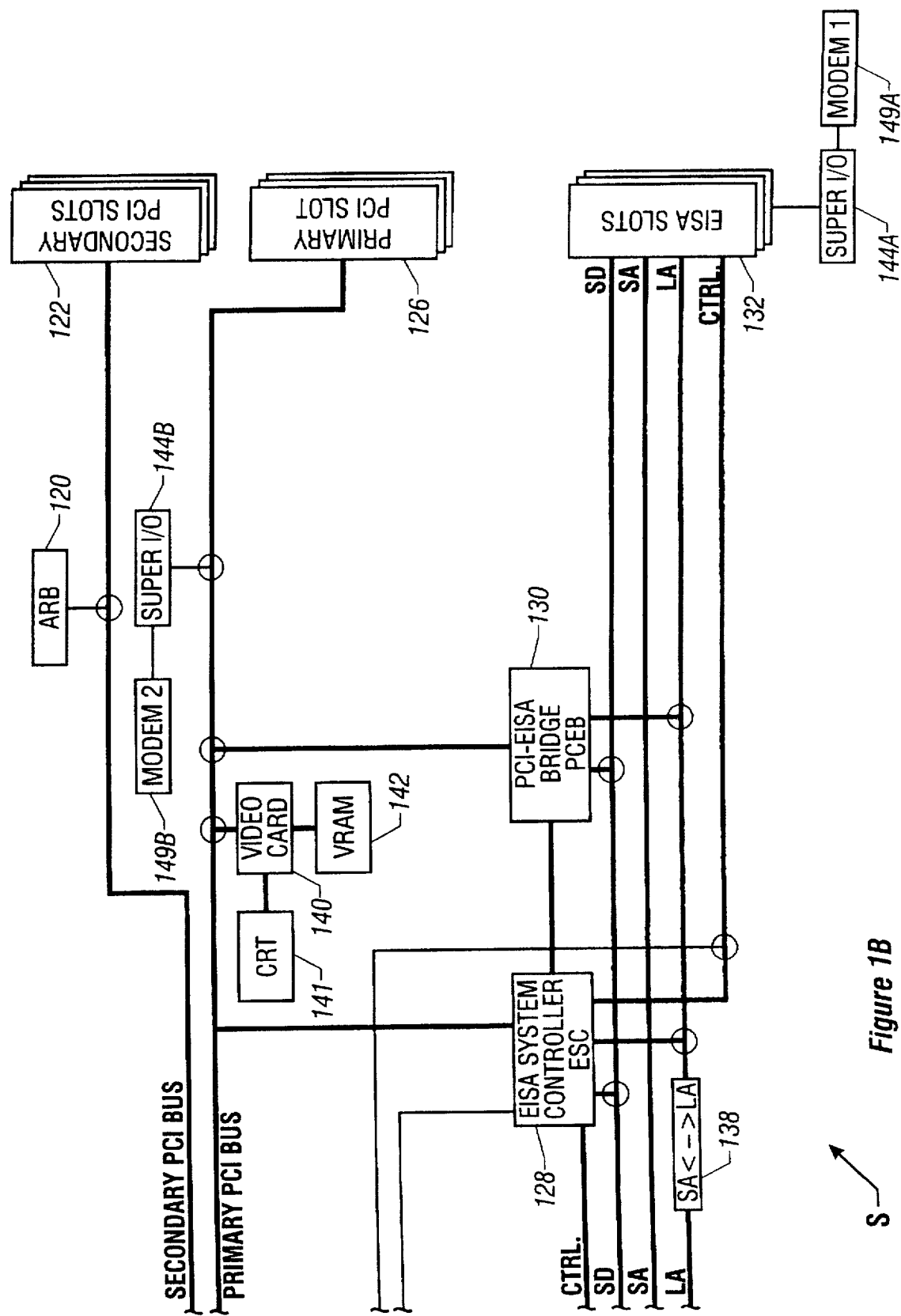

Turning now to FIG. 1, a server computer system S is disclosed. To provide sufficient processing capability for enterprise-class server applications, the server computer system S of FIG. 1 deploys one or more processors, preferably the Pentium Pro® processor 50 available from Intel Corporation located in Santa Clara, Calif. The Pentium Pro® (P6) processor 50 resides on a processor card C which is plugged into one of P6 slots 100–102. The P6 slots 100–102 are connected to a Pentium Pro® host bus called the P6 bus 103. The P6 bus 103 is a high performance bus which preferably supports two processor cards C mounted on slots 100–102. Preferably, each processor card C supports two Pentium Pro™ processors. Thus, the preferred embodiment supports up to four processors.

In addition to the processors, the P6 bus 103 is connected to a memory controller 104 and a data path device 106 which collectively form a DRAM control subsystem. Preferably, the DRAM controller is an 82453GX and the data path device 106 is an 82452GX, both available from Intel Corporation.

The DRAM controller 104 provides control and timing to the memory subsystem, while the data path device 106 interfaces the 72-bit P6 host bus to the memory array. The memory controller 104 and the data path 106 are capable of taking a memory request from the CPU 50, queuing it, and responding after the requested operation has completed. Additionally, the controller 104 provides memory error correction which is vital in server applications, including the capability of single-bit error correction and multi-bit error detection on the fly. The memory controller 104 can handle up to four gigabytes of page mode DRAM. Memory arrangements having non-interleaved, x2 and x4 interleaving configurations are supported by the memory control sub-system.

A plurality of memory modules 110–112 are connected to memory slots 108 to provide up to four gigabytes of memory. During operation, the actual performance of the memory subsystem will depend in part on the mix of read and write operations and the memory access patterns for a given application. The controller 104 minimizes the impact of the idle cycles by allowing read operations to bypass around the write operations and be completed first as long as the memory addresses for the read/write pair do not match.

In addition to the memory controllers, a robust input/output system is needed for the server S. The I/O subsystem designed for the server must be scalable while meeting the performance requirements for the four Pentium Pro™ processors. The PCI bus provides a combination of high performance and scalable I/O for the demanding environment faced in server applications. To provide PCI connections, one or more PCI bridges 114 and 114a are connected to the P6 bus 103. The peer-to-peer arrangement of the PCI bus eliminates one or more levels of arbitration present in the hierarchical arrangement, resulting in higher system performance.

Preferably, the PCI bridge 114 is an 82454GX PCI bridge (PB) from Intel which integrates the bus arbitration logic required to connect up to two 82454GX PB components without any external glue logic. In the preferred embodiment, one PCI bridge is configured to be the compatibility PCI bridge by strapping options at power-up. This PCI bridge provides the PC compatible path to the boot ROM and the EISA/ISA bus.

A second PCI bridge 114a, called an auxiliary bridge, is configured by strapping options to be the auxiliary PCI bridge. The auxiliary bridge 114a controlling the secondary PCI bus has an arbiter 120 which arbitrates accesses to the host after the compatibility bridge 114 has been serviced. Additionally, a system that requires more than two 82454GX PBs must provide an external arbiter.

Normally, the arbitration for the processor bus is controlled by the compatibility bridge, which has a higher priority than the auxiliary bridge to ensure a proper response time for ISA bus masters. The plurality of PCI bridges 114 provides a plurality of PCI buses, which because of their direct connections to the P6 bus 103, provides inherently faster arbitration response than the alternative of cascading PCI bridges together to provide for multiple PCI buses. This ability not only provides for design flexibility, but also for redundant I/O channels for server systems in which reliability is paramount.

As in the DRAM controller 104, the PCI bridge 114 supports a full 64-bit interface to the CPU bus, including support for all protocols as well as error correction. The PCI bridge 114 supports an 8-deep transaction in-order queue as well as separate 4-deep queues for both outbound (processor to PCI) and inbound (PCI to processor) transactions that are for the I/O bus agent. Also, like the DRAM controller 104, the PCI bridge 114 provides four 32-byte data buffers in both the inbound and outbound directions. The buffers decouple the host bus 103 from the PCI buses 115–117 and optimize performance by allowing the posting of data at full bus speeds in both directions. However, unlike the DRAM controller 104, the PCI bridge 114 supports up to two outstanding deferred-reply requests. This feature allows a bus transaction to be split and completed later, preventing the Pentium Pro™ P6 bus 103 from becoming blocked by long latency I/O operations. In this mode, the PCI bridge 114 would defer Pentium Pro™ memory reads, I/O reads, I/O writes, and interrupt acknowledge transactions. However, memory write transactions are not deferred since they are better optimized through posting.

Attached to the secondary PCI bus 115 is a SCSI disk controller 116. The SCSI controller 116 provides the capability of handling simultaneous disk commands which is necessary in a multi-threaded, multi-tasking operating system. Preferably, the SCSI controller 116 is a 53C825 available from NCR Corporation. Attached to the 53C825 is one or more SCSI connectors 118 which drives a plurality of disk drives adapted to support the host system's simultaneous issuance of multiple commands to one or more SCSI devices. The disk drives can be one or more high capacity disk drives or the disk drives can be a Redundant Array of Inexpensive Disks (RAID) data storage device. The ability to overlap commands and queue the commands to one or more data storage devices can significantly boost performance in environments such as Windows 95™, Windows NT™, and Netware. In addition to the SCSI controller 116, a plurality of devices may be plugged into the secondary PCI bus 115 over a plurality of secondary PCI slots 122.

On the primary PCI bus 117, an interrupt controller 124 handles interrupt requests coming into the PCI bridge 114 for eventual transmission to one of the processors 50 in slots 100–102. The interrupt controller 124 routes interrupt requests from devices located on PCI buses 115–117 to the processors 50 on slots 100–102 during multiprocessor operation. Additionally, a number of PCI peripherals may be plugged into a plurality of primary PCI slots 126.

An EISA system controller (ESC) 128, preferably the Intel 82374EB device, and a PCI-EISA bridge (PCEB) 130, preferably the Intel 82375EB, are also connected to the primary PCI bus 117. The ESC 128 and the PCEB 130 must be connected to the primary PCI bus 117, as the auxiliary bus controller must request arbitration from the compatibility bus controller 114 on some operations. That added latency means that the auxiliary bus or secondary PCI bus 115 cannot meet PCI version 2.1 latency specifications, and that EISA and ISA bus bridges have to be on the compatibility bus or primary PCI bus 117.

The ESC 128 and the PCEB 130 work in tandem to provide an EISA I/O subsystem interface for the computer system S. The combination of the ESC 128 and the PCEB 130 provides an I/O subsystem capable of taking advantage of the power of the PCI bus architecture while maintaining access to a large base of EISA and ISA expansion cards, and the corresponding software applications.

With the inclusion of the ESC 128 and the PCEB 130, the system S now contains three levels of buses structured in the following hierarchy: P6 bus 103 as the execution bus; an expansion bus system having a primary and secondary PCI bus 115–117; and EISA bus as a secondary I/O bus. This bus hierarchy allows concurrency for simultaneous operation on all three bus environments. Data buffering permits concurrency for operations that cross over into another bus environment. The ESC 128 implements system functions such as timer/counter, DMA, interrupt controller, and EISA subsystem control functions such as EISA bus controller and EISA bus arbiter. The PCEB 130 provides the interface to the bridge between the PCI and EISA buses by translating bus protocols in both directions. It uses extensive buffering on both the PCI and EISA interfaces to allow concurrent bus operations.

The ESC 128 and the PCEB 130 are connected to a plurality of EISA slots 132. Additionally, the ESC 128 also generates chip selects for certain functions that typically reside on an X-bus. The ESC 128 generates chip select signals for an integrated system management unit (ISM) 158, a keyboard controller 156, a flash ROM 154, a non-volatile RAM 152, and a general purpose I/O device 144 which supports floppy drives over floppy connectors 146, serial ports, and parallel ports over serial connectors 148 and parallel connectors 150. The general I/O device contains a UART 145 which provides a communication port accessible via the one of the serial connectors 148. An industry standard modem 149, preferably a Hays-compatible modem, is connected to the serial connectors 148. Alternatively, a modem 149A, attached to an EISA super I/O device 144A, could be mounted on an expansion card which is plugged into one of the EISA slots 132. In yet another embodiment, a PCI-based modem 149B can be connected to a PCI super I/O device 144B which is connected to one of the PCI buses 115 or 117. In these embodiments, the modem 149, 149A or 149B transmits data to the UART in the super I/O devices 144, 144A or 144B, which in turn converts the serial data into parallel data and forwards the data to the processor 50 via bridges 130 and 114.

Referring once more to the EISA slots 132, system data lines are connected to the data bus of the X-bus via a buffer 134 which provides accesses to I/O devices as well as the system BIOS in the flash ROM 154. Further, the EISA slots 132 have system address lines that are connected to the address lines of the X bus via buffer 136. The EISA slots 132 have latched address lines which are connected to the system address lines via buffer 138.

A video controller card 140 is connected to the primary PCI bus 117. Preferably, the video controller card 140 is based on a Cirrus Logic 5424 VGA controller. The video controller 140 is connected to a video RAM 142 which is preferably 512 kilobytes in size. The video controller 140 in turn drives a CRT display 141.

Also connected to the P6 bus 103 and the primary PCI bus 117 is an integrated remote console device (IRC) 170 of the present invention. The integrated remote console device 170 is further connected to the ESC device 128, the control portion of the EISA slots 132, the general I/O device 144, the 8042 keyboard controller 156, and the ISM device 158. The integrated remote console device 170 is additionally connected to a primary keyboard 157 and a secondary keyboard 159 to receive keyboard inputs from the user. The primary keyboard 157 can be mounted on the rear of the server enclosure while the secondary keyboard 157 can be mounted on the front of the server enclosure. The integrated remote console 170 is also connected to a security device 155, which is in turn connected to the NVRAM 152 and the general I/O device 144, to protect the NVRAM 152 from unauthorized accesses.

As discussed below, the IRC 170 is an operating system independent device which offers at a low cost remote console functions via a combination of hardware and SMI system software. As discussed below, the IRC device 170 performs all timing critical operations such as video compression, keyboard scan code generation, and virtual communication, among others. In the preferred embodiment, the IRC device 170 performs a video encode function where the IRC device 170 snoops accesses to the video memory 142, identifies the operation being performed by the processor 50, encodes and presents data to be stored in the memory modules 110 and 112 for ultimate transmission to the remote console, using the shared modem of the present invention. The IRC device 170 also performs keyboard scan code generations where scan codes are clocked in and out of the 8042 keyboard controller 156 is present.

Figure 2:
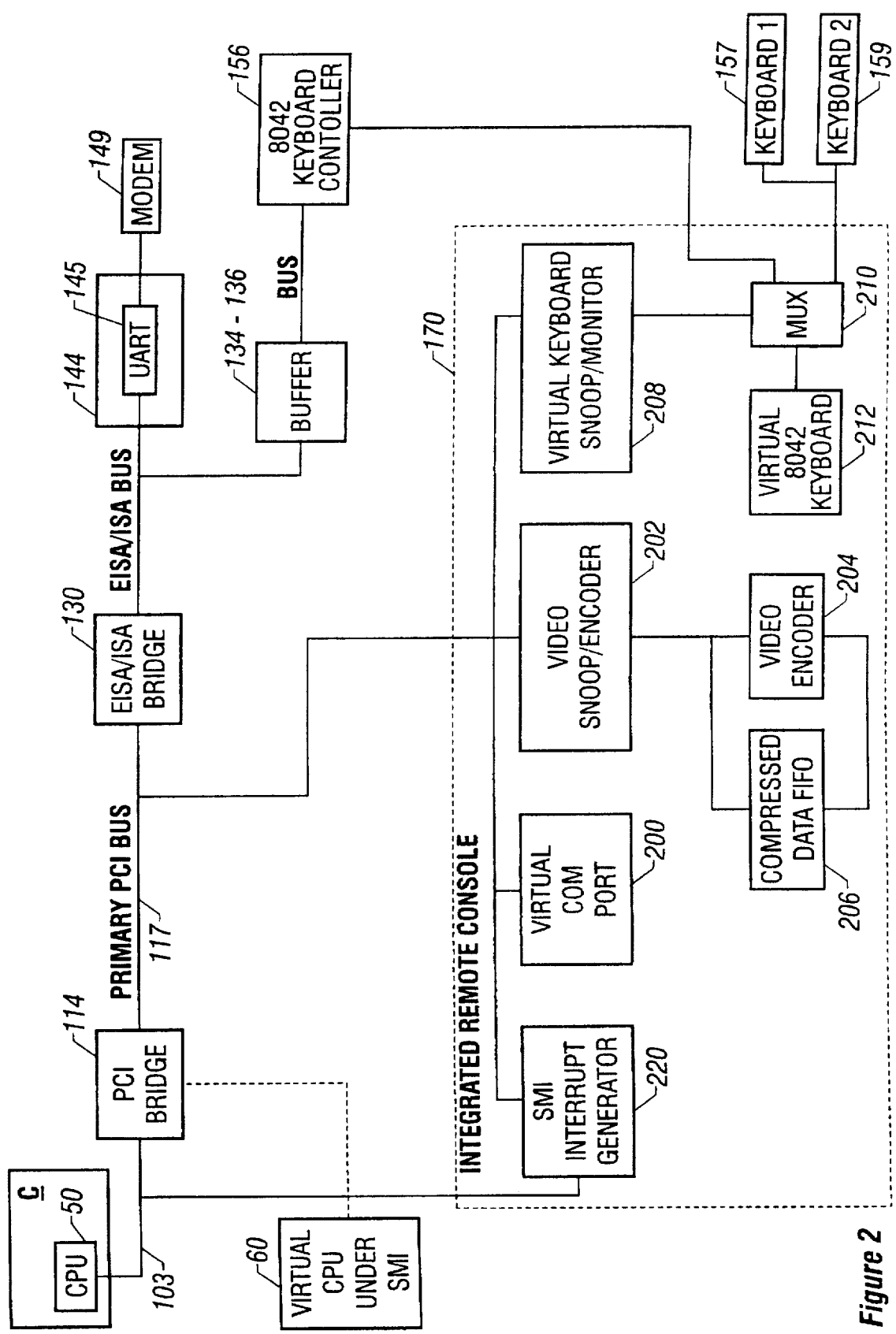
FIG. 2 is a block diagram showing in more detail the integrated remote console device in the computer system of FIG. 1.

Turning to FIG. 2, a block diagram illustrating the major components of the IRC device 170 and the relationship of the IRC device 170 to the remaining components of the server computer system S is shown. In FIG. 2, the IRC device 170 is connected to the CPU 50 on card C via the primary PCI bus 117 and the P6 bus 103.

To keep cost low, the system software handles all high level functions via specialized interrupt handlers which are invoked when the processor 50 enters a special interrupt mode called a System Management Mode (SMM) mode which is available on the Intel 486™, Pentium® and Pentium Pro® processors and traditionally used to perform various power management functions. A virtual CPU 60 is provided using SMM. The virtual CPU 60 is shown in FIG. 2 as being connected to the PCI bridge 114 to handle SMI related functions. The virtual processor 60 monitors and routes data communication to and from the modem to either the operating system or the remote console application. Even if the operating system has crashed, an incoming call is still answered by the present invention using the virtual processor 60. Thus, the use of the virtual processor 60 eliminates the risks associated with blocking modem communications due to a crashed operating system.

In the present invention, SMI handlers are provided to communicate with the IRC device 170 through various registers to monitor data received by a virtual keyboard snoop/monitor 208, provide data to a virtual keyboard snoop/monitor 208, communicate with the modem 149, and perform video encoding and compression via a video snoop/encoder 202. The SMM mode is activated by triggering a system management interrupt (SMI) to the processor 50 using an SMI generator 220 in the IRC device 170. The SMI handler software is stored in the system flash ROM 154 which can be extended or updated via flash updating.

The IRC device 170 is also connected to the 8042 keyboard controller 156. The keyboard controller 156 is connected to the EISA/ISA bus via X-bus buffers 134 and 136. Also attached to the EISA/ISA bus is a resource device, which in the preferred embodiment is the low cost, industry standard modem 149. Preferably, the industry standard modem 149 is a Hayes compatible modem. The modem 149, in the form of a modem card in the EISA/ISA slot or a UART device, receives serial data from a remote computer and communicates the serial data to the UART 145 of the general I/O device 144.

Within the IRC device 170, the virtual communication port 200, the video snoop/encoder 202, and the virtual keyboard snoop/monitor device 208 are connected to the primary PCI bus 117. The virtual keyboard snoop/monitor device 208 is connected to a multiplexer 210. Attached to the multiplexer 210 is a virtual 8042 keyboard controller 212, the 8042 keyboard controller 156, and one or more keyboards 157 and 159. The virtual keyboard snoop/monitor device 208 provides hot pluggability for keyboards so that they can be plugged or unplugged without affecting or interrupting the operation of the computer system S.

The video snoop/encoder 202 is connected to a video encoder 204 for compressing the video data. The output of the video encoder 204 is provided to a data FIFO 206 for storing the compressed video data. The output of the compressed data FIFO 206 is returned to the video snoop/encoder 202. Essentially, the video snoop/encoder device 202 monitors or snoops, PCI cycles to VGA address ranges of the video controller 140 located either on the EISA/ISA bus or on the PCI bus. From the snooped cycle stream, the encoder device 204 determines the high level video operation the CPU 50 is performing. Operations that the IRC could identify include scroll, where repetitive move operations from video to video are executed, the print command where sequential character data are written, and store command, where sequential data/attribute pairs are written. Next, the video encoder device 204 compresses incoming cycles into high level primitives and the compressed data is stored into the data first-in first-out (FIFO) 206. Once the data FIFO 206 is full, or stale, an SMI signal is generated by the generator 220 to the CPU 50. Upon being serviced by a SMI handler, the CPU 50 stores the data into main memory or, alternatively, prepares the compressed video data for transmission to the remote console via the modem 149.

The virtual communication device provides a mechanism for sharing a modem between the operation system applications and the remote console applications. The virtual communication device 200 positively decodes accesses to the communication port or UART 145 and prevents the I/O cycle from reaching the EISA bus. Thus, the IRC device 170 essentially redirects accesses from operating system applications intended for the communication port 145 to the virtual communication port 200.

Within the virtual communication port 200, reads and writes of the communication device are performed to emulation registers inside the IRC device 170. Further, a write to the transmitter data buffer causes a system management interrupt to occur. An arbitrator, provided in the preferred embodiment as an SMI handler executing on the virtual CPU 60, supervises the sharing of the modem such that applications executing in the operating system mode is prevented from interfering with the remote console's exclusive use of the modem when the server computer is operating in a remote console mode.

The virtual communication port 200, along with the SMI arbitration software disclosed below, enables the modem 149 to be shared by applications on both the operating system and the remote console software. The hardware of the virtual communication port 200 emulates the registers of a Universal Asynchronous Receiver/Transmitter (UART) located within the general I/O device 144 or within an EISA/ISA slot, while the SMI handler for the virtual communication port 200 acts as an arbitrator to decide when accesses to the virtual communication port 200 should be forwarded to the UART device 145 in the general I/O device 144 or within an EISA/ISA slot. The UART bridges the data transmission between the modem 149 and the processor 50. Originally designed as an intelligent device for serial interfacing, the UART transmits serialized data over a serial bus such as an RS-232 communications link. The UART also receives serial data, converts it to parallel form, and sends the parallel data to the processor 50. Access to the UART is typically gained through a personal computer system's I/O ports, typically ports COM1, COM2, COM3 and COM4.

In an IBM compatible personal computer, during the operating system boot-up, the operating system queries the possible I/O ports such as ports COM1 through COM4. If the ports respond actively, the availability of such port is noted by the operating system as an available resource to the application software. Thus, to remain compatible with the vast base of IBM compatible software, the virtual communication device 200 needs to emulate the register set of an industry standard UART. Typical industry standard UART devices include the NS8250, NS16450 and NS16550 UARTs, available from National Semiconductor Corp. located in Santa Clara, Calif. The standard register ports in such UARTs are:

| Register | Offset | DLAB |
|---|---|---|
| Receiver Buffer Register (RB) | 00h | 0 |
| Transmmitter Hold Register (TB) | 00h | 0 |
| Interrupt Enable Register (IER) | 01h | — |
| Interrupt Identification Register (IIR) | 02h | — |
| Data Format Register (Line Control Register) (LCR) | 03h | — |
| Modem Control Register (MCR) | 04h | — |
| Serialization Status Register (Line Status Register) (LSR) | 05h | — |
| Modem Status Register (MSR) | 06h | — |
| Scratchpad Register (PSR) | 07h | — |
| Divisor Latch Register, Low Byte (BRDL) | 00h | 1 |
| Divisor Latch Register, High Byte (BRDH) | 01h | 1 |

DLAB = Divisor Latch Access Bit (Found in LCR)

Data written to or read from each of these registers has a standard meaning, which is well known to the art. During boot up, the operating system looks for the presence of a serial communication port, or COM port, by reading and writing to the register of the industry standard UART device 145. To ensure that the modem is shared in a transparent manner between the operating system software and the remote console software, the virtual communication port 200 intercepts I/O accesses on the PCI bus directed at the UART on the general I/O device 144 or within an EISA/ISA slot. The virtual communication port 200 then performs a low-level emulation of the registers of the UART device 145 and under certain conditions, requests the assistance of the SMI virtual communication port handler through a system management interrupt. As discussed below, the combination of the virtual communication device 200 and the SMI software provides a robust and transparent modem sharing between operating system software applications and the remote console software.

The virtual communication port 200 provides sufficient functionality for the operating system to note that the communication port 145 exists during the boot process. When the server computer system S boots up normally, application software running on the operating system mode generates accesses directed at the communication port 145. These accesses are diverted and buffered in the virtual port.

The arbitrator then claims the communication port 145 from the remote console application and forwards accesses received by the virtual port to the communication port 145 provided certain conditions are present. These are: if the operating system application is accessing the modem resource and if the communication port, or UART 145, is idle, indicating that the remote console application is not using the communication port, or UART 145. Next, the arbitrator copies the contents of the emulation registers inside the virtual communication device 200 to the actual communication port or UART 145. Finally, the arbitrator reallocates the communication port, or UART 145, back to the second application upon the termination of accesses to the resource by the first application.

If the second application is not using the modem, the SMI software switches in the modem and allows the application software to directly access the modem. At this point, the IRC device 170 stops the positive decoding process. Thus, accesses from the application proceeds directly to the modem 149 via the UART communication port 145. Nonetheless, the SMI software stays resident in the background and snoops accesses to the modem to monitor modem usage. As is known to those skilled in the art, a snoop operation passively monitors accesses over the PCI bus directed at particular addresses and retrieves the data associated with the access operation for analysis. If the modem carrier drops or the modem carrier is not established within a predetermined time, the SMI software ejects the first application from ownership of the modem, reclaims control of the modem, and reallocates the modem source back to the second application in anticipation of remote console sessions.

For dial-in accesses, the modem is configured to answer incoming calls. The arbitrator examines the first few characters received to determine the intended destination of the incoming call. If the initial few characters indicate that a remote console session is to be established, the arbitrator maintains ownership of the modem with the second application for performing remote console functions. Upon receipt of ASCII characters from the modem when the remote console mode is invoked, the SMI firmware converts the ASCII character into scan codes and presents the scan codes to the 8042 keyboard controller 156 using the virtual keyboard 208 inside the IRC device 170. The scan codes generated by the IRC device 170 emulate the keyboard output. The fidelity of the emulation is such that the keyboard controller 156 believes that the local keyboard is actually being depressed, even though the keyboard of the remote computer is actually being pressed. Thus, operator positioned at the remote computer can act as though he or she is entering commands locally at the console of the server computer S.

Additionally, when the server computer system S is in the remote console mode and in the event that an operator at the site of the server wishes to eject an operator logging in from a remote console, the operator at the local site only needs to press an escape key or escape sequence to regain control of the server locally. Upon detection of the escape sequence, the SMI firmware breaks the remote console session and reconnects either the keyboard 157 or 159 to the system by switching the multiplexer 210 in the IRC device 170. In this manner, the local operator has authority to override the operator at the remote console.

In the present invention, if the initial few characters received are inconsistent with the remote console invocation, the apparatus of the present invention relinquishes the modem to the first application. In the preferred embodiment, the apparatus of the present invention saves the initial few characters and redirects them to the operating system for proper handling. However, for certain protocols, a second embodiment of the invention simply disposes or gobbles the initial few characters after it completes the analysis on the destination of the packet. When the remote computer senses that it has not established a connection with the operating system application, the remote computer simply retransmits the initial few characters. Thus, the gobbling of the few characters does not disturb the data communication to a significant degree.

Figure 3:
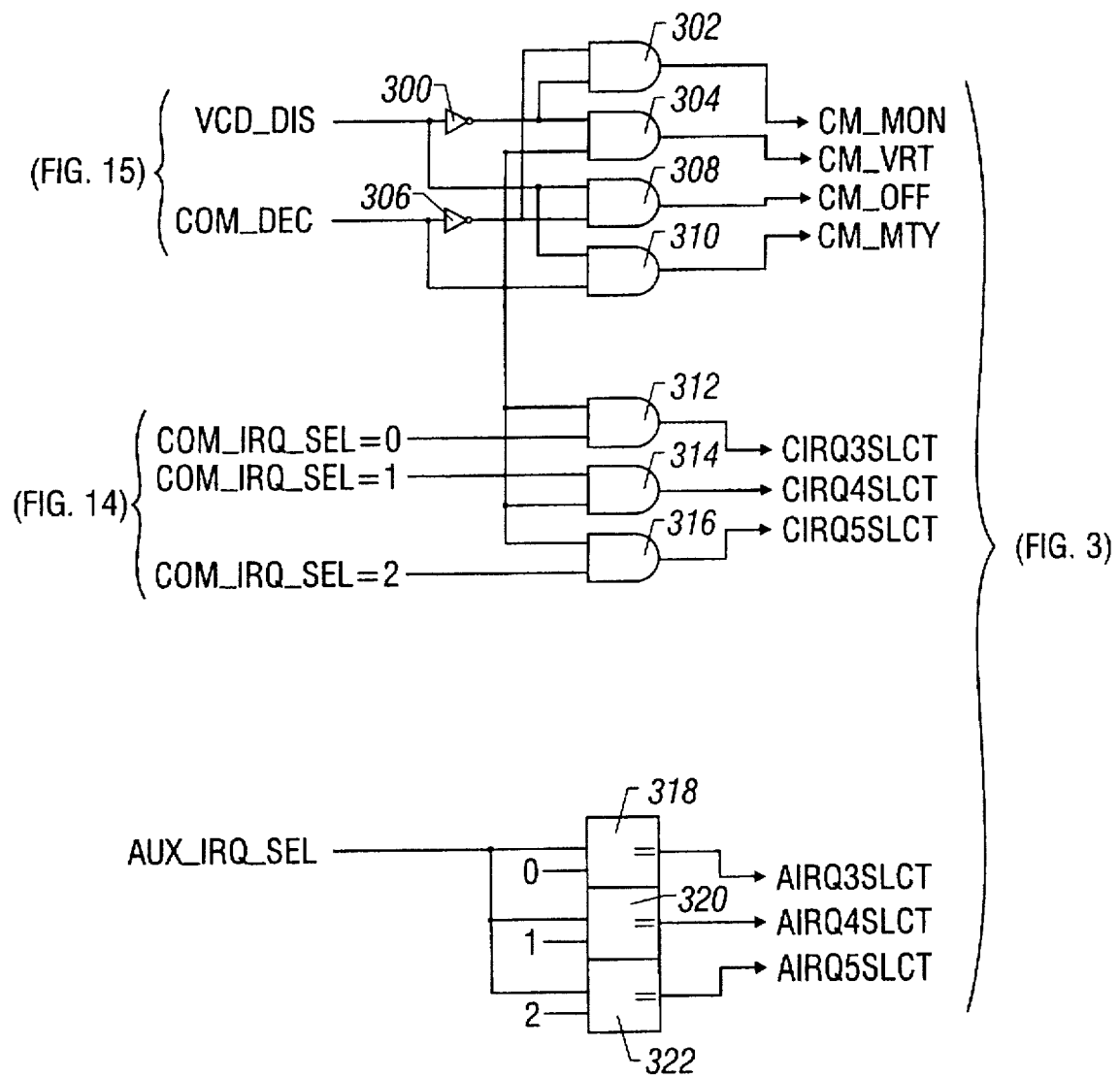
FIG. 3 is a schematic diagram of a circuit for selecting interrupt request signals in the device of FIG. 2.

FIGS. 3–16 show in more detail the hardware aspects of the virtual communication device 200. In FIG. 3, the circuits for detecting various communication port modes and interrupt selections are disclosed. In FIG. 3, a virtual communication device disable signal VCD_DIS is provided to an inverter 300. Similarly, a communication port decode signal COM_DEC is provided to the input of an inverter 306. VCD_DIS and COM_DEC are programmable bits in a register called the virtual communication port configuration register (VCR).

The outputs of the inverters 300 and 306 are provided to the inputs of an AND gate 302 to generate CM_MON, a signal indicating that the virtual communication device 200 is in a monitor mode, or snoop mode, on communications between the processor 50 and the UART 145. The monitor mode is the mode 149 intended to be used by the SMI firmware after control of the modem has been relinquished to the operating system. At this stage, the virtual port 200 is no longer positively decoding I/O accesses to the selected COM port, certain events are still passively monitored and can cause SMI events, including lost carrier, among others. The output of the inverter 300, along with COM_DEC, is provided to the inputs of an AND gate 304 to generate CM_VRT. CM_VRT is a signal indicating that the virtual communication port 200 is in a virtual mode where accesses to the communication port 145 is intercepted and directed to the virtual port 200. In this state, the operating system application can identify the existence of the COM port, but will be prevented from changing the state of the continuation port 145 on the EISA bus.

VCD_DIS and the output of the inverter 306 are provided to the inputs of an AND gate 308 to generate CM_OFF. In this mode, the virtual communication port 200 is disabled and all accesses to the COM port will go directly to the real COM port. Finally, VCD_DIS and COM_DEC are provided to the inputs of an AND gate 310 to generate CM_MTY, a signal indicating that no COM port is present or problems may exist which prevent the operating system from detecting the communication port. In this mode, accesses to the selected COM port will be intercepted and directed to the virtual communication port 200. Further, software will be prevented from changing the state of the real COM port on the EISA bus. All reads to the selected COM port will return FFh, signifying the absence of the selected COM port.

Figure 4:
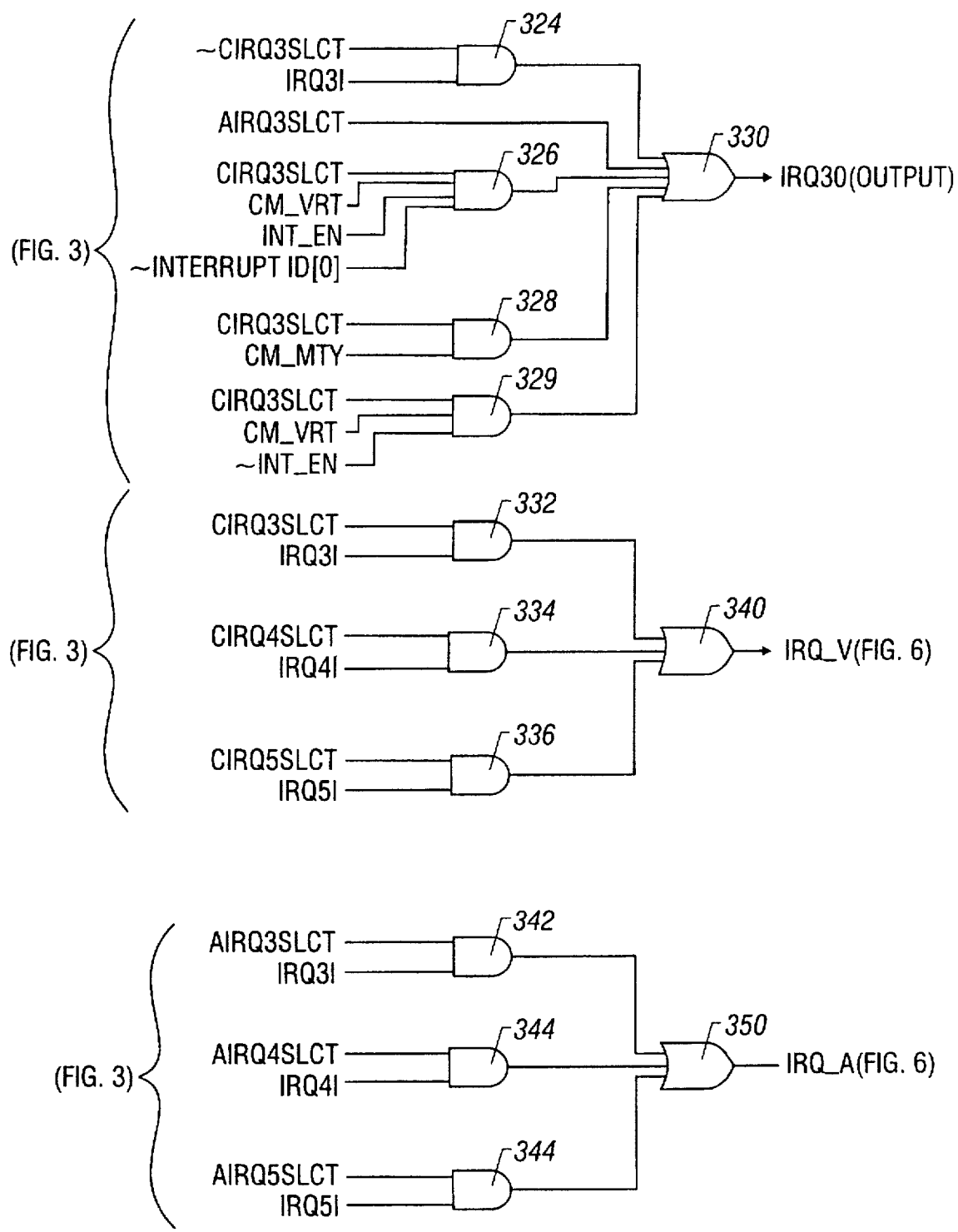
FIG. 4 is a schematic diagram of a circuit for generating interrupt request signals of the device of FIG. 2.

The communication port decode signal COM_DEC is also provided to AND gates 312, 314, and 316. The remaining input of the AND gates 312, 314, and 316 are connected to various decodes of communication port interrupt select signals COM_IRQ_SEL. Thus, when COM_IRQ_SEL= 0, indicating that IRQ 3 is being used for the remote console modem, the AND gate 312 asserts the COM port IRQ 3 select signal, CIRQ3SLCT. Similarly, when COM_IRQ_SEL=1, the AND gate 314 asserts CIRQ4SLCT. Further, when COM_IRQ_SEL=2, the AND gate 316 asserts CIRQ5SLCT. As shown in FIG. 4, when CIRQ3SLCT, CIRQ4SLCT, or CIRQ5SLCT is asserted, the selected interrupt request is rerouted to be an SMI request so that the SMI handler can process the request.

Turning now to the bottom of FIG. 3, the auxiliary IRQ select signal AUX_IRQ_SEL is provided to one input in each of comparators 318, 320, and 322. The remaining input of comparators 318, 320, and 322 are connected to 0, 1, and 2, respectively, to generate respectively AIRQ3SLCT, AIRQ4SLCT, and AIRQ5SLCT. Thus, in the event that AUX_IRQ_SEL=0, the auxiliary IRQ select signal AIRQ3SLCT is asserted. Similarly, when AUX_IRQ SEL= 1, AIRQ4SLCT is asserted. Additionally, when AUX_IRQ_SEL=2, AIRQ5SLCT is asserted, the auxiliary interrupt request select signal provides additional flexibility to the IRC device 170 in that it can take another interrupt signal which is not being used and generate an SMI interrupt via the IRC device 170 if necessary.

Turning to FIG. 4, the circuit for performing interrupt redirection is shown. Turning to the top of FIG. 4, the circuit to generate the interrupt output IRQ30 is disclosed. As the circuit to generate the remaining interrupt request outputs IRQ40 and IRQ50 are similar, with the exception of the changing of the respective COM port interrupt select signal, the description of IRQ30 applies to the interrupt output signals IRQ40 and IRQ50.

In FIG. 4, ~CIRQ3SLCT and IRQ3I (both from FIG. 3) are provided to an AND gate 324. The AND gate 324 performs a pass through mode when the interrupt IRQ3 is not selected as the virtual communication device. In such case, the IRQ3 input from the EISA bus is passed on to the output IRQ30. The output of the AND gate 324 is provided to an input of an OR gate 330 which generates the interrupt 3 output signal IRQ3 0. The OR gate 330 also receives the auxiliary interrupt signal AIRQ3SLCT and the outputs of AND gates 326, 328, and 329.

The AND gate 326 receives CIRQ3SLCT, CM_VRT, INT_EN, and ~INTERRUPT_ID[0]. The AND gate 326 detects the condition that the COM port interrupt 3 has been selected, the virtual mode has been selected, the interrupt has been enabled, and the appropriate interrupt event is occurring. The AND gate 328 receives CIRQ3SLCT and CM_MTY to handle the condition where the COM port interrupt is to be masked. In this way, the interrupt controller assumes that this interrupt is not driven by the COM port and will therefore float high as it is pulled up on the EISA bus.

Further, the AND gate 329 receives CIRQ3SLCT, CM_VRT, and ~INT_EN. The AND gate 329 detects the condition where the virtual mode has been selected but the interrupt output of the virtual UART has been disabled. In this case, the IRQ30 is asserted to emulate the pulled up behavior of an undriven interrupt on the EISA bus.

Next, the circuit to provide IRQ_V, a signal to generate SMI from an external interrupt source, is disclosed. An AND gate 332 receives the COM port IRQ select signal CIRQ3SLCT and the external interrupt request signal IRQ3I. Similarly, AND gates 334 and 336 receive the same type of signal for interrupt requests 4 and 5, respectively. The outputs of the AND gates 332, 334, and 336 are provided to an OR gate 340 to generate the IRQ_V signal.

Turning to the bottom of FIG. 4, the circuit to produce IRQ_A, an interrupt request from the auxiliary port is shown. An OR gate 342 receives the auxiliary interrupt request signal AIRQ3SLCT and IRQ3I. Similarly, AND gates 344 and 346 handle the auxiliary signal for interrupt request 4 and 5, respectively. The output of the AND gates 342, 344, and 346 are provided to an OR gate 350 which generates IRQ_A. The OR gate 350 provides the ability for an auxiliary interrupt source to have the IRC device 170 generate SMI-interrupts.

Figure 5:
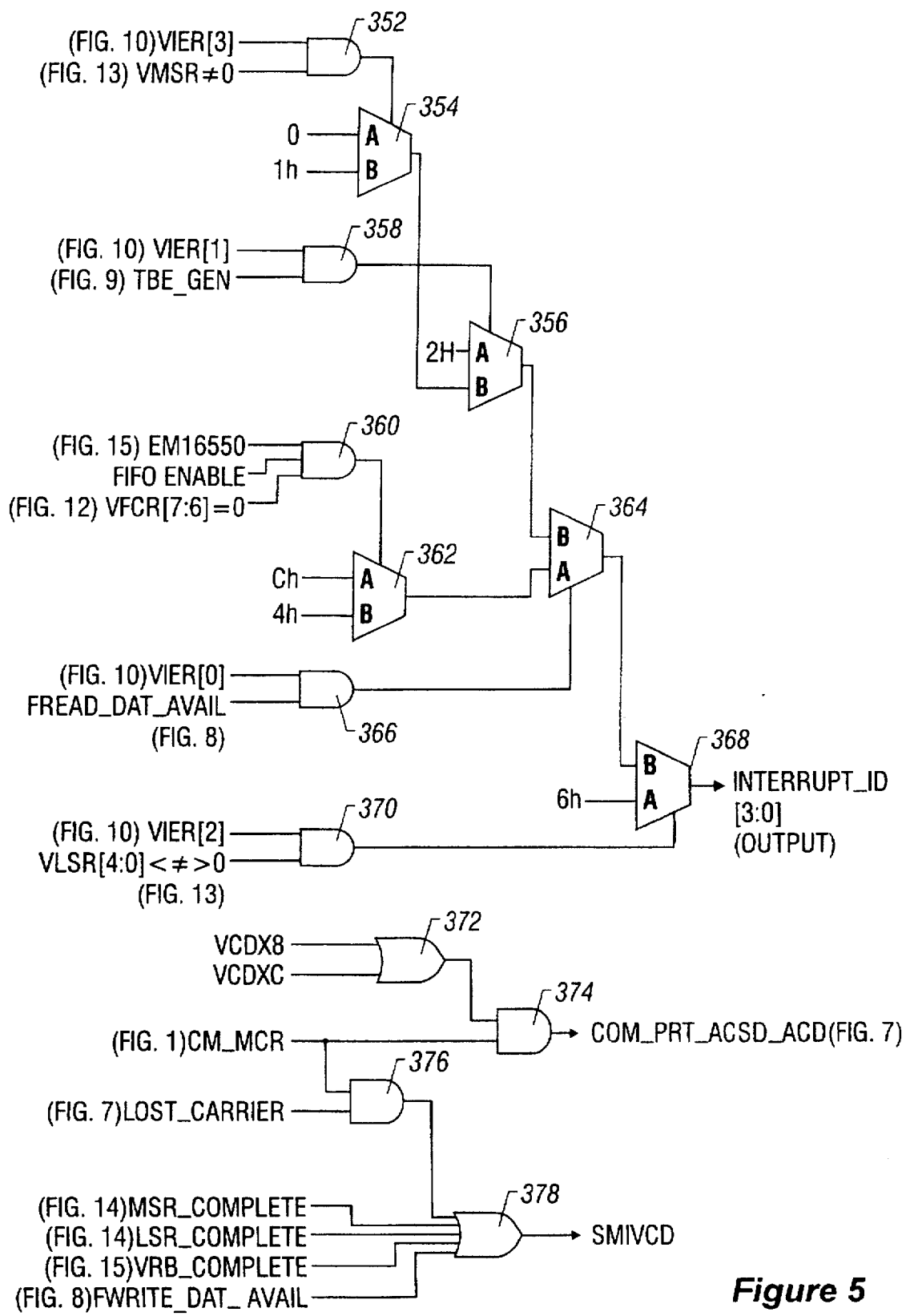
FIG. 5 is a schematic diagram of a circuit for generating interrupt identifications in the device of FIG. 2.

Turning to FIG. 5, the circuits to generate the interrupt priority identification, the COM port access decode, and the SMI for the virtual COM port are shown. In FIG. 5, the generation of INTERRUPT_ID[3:0], a signal indicating the identity of the virtual interrupt, is shown. INTERRUPT_ID is a signal which identifies which of several prioritized interrupt conditions is present. Software communicating with the virtual COM device will expect interrupts to be generated under certain conditions. In addition, the logic facilitates the generation of virtual interrupt events by the SMI firmware. The four levels of interrupt conditions, in order of priority, are receiver line status, received data ready, transmitter holding register empty, and modem status, as shown in Table 1:

TABLE 1

| FIFO Mode Only Bit 3 | Interrupt Identification Register Bit 2 | Bit 1 | Bit 0 | Priority Level | Interrupt Type | Interrupt Source | Interrupt Reset Control |
|---|---|---|---|---|---|---|---|
| 0 | 0 | 0 | 1 | — | None | None | — |
| 0 | 1 | 1 | 0 | Highest | Receiver Line Status | Overrun Error or Parity Error or Framing Error or Break Interrupt | Reading the Line Status Register |
| 0 | 1 | 0 | 0 | Second | Received Data Available | Receiver Data Available or Trigger Level Reached | Reading the Receiver Buffer Register or the FIFO Drops Below the Trigger Level |
| 1 | 1 | 0 | 0 | Second | Character Timeout Indication | No Characters Have Been Removed From or Input to the RCVR FIFO During the Last 4 Char. Times and There is at Least 1 Char. in It During This Time | Reading the Receiver Buffer Register |
| 0 | 0 | 1 | 0 | Third | Transmitter Holding Register Empty | Transmitter Holding Register Empty | Reading the IR Register (if source or interrupt) or Writing into the Transmitter Holding Register |
| 0 | 0 | 0 | 0 | Fourth | MODEM Status | Clear to Send or Data Set Ready or Ring Indicator or Data Carrier Detect | Reading the MODEM Status Register |

In FIG. 5, Bit 3 of the virtual interrupt enable register VIER[3], which enables the modem status interrupt when set, is provided to one input of an AND gate 352. The other input of the AND gate 352 is connected to VMSR≠0, a signal indicating that the virtual modem status register does not equal zero. The output of the AND gate 352, reflecting whether a virtual modem status change had occurred, is provided to the select input of the multiplexer 354. The A input of the multiplexer 354 is connected to zero, indicating that a modem status interrupt is pending. The B input of the multiplexer 354 is connected to 1h, indicating that no interrupt is pending. The output of the multiplexer 354 is connected to the B input of a multiplexer 356, while the A input of the multiplexer 356 is connected to 2h, indicating that the transmitter holding register is empty. The select input of the multiplexer 356 is connected to an AND gate 358. The inputs of the AND gate 358 are connected to VIER[1], indicating that the interrupt is enabled with the transmitter holding register is empty interrupt is enabled. The other input of the AND gate 358 is connected to TBE_GEN, a signal indicating that a transmitter buffer empty signal is to be generated. The output of the AND gate 358 reflects whether the virtual transmit buffer is empty.

The A input of the multiplexer 364 is connected to the output of a multiplexer 362. The A input of the multiplexer 362 is connected to Ch, providing the character timeout indication. The B input of the multiplexer 362 is connected to 4h, providing the received data available interrupt. The select input of the multiplexer 362 is connected to an AND gate 360. The inputs of the AND gate 360 are EM16550, a signal indicating that the industry standard 16550 compatible UART mode is being emulated, FIFO ENABLE, a signal indicating that the FIFO is enabled, and VFCR[7:6] ≠0, a signal indicating that bits 6 and 7 of the virtual FIFO control register or VFCR, are not equal to zero. When bits 6 and 7 of VFCR equal zero, the receiver FIFO trigger level is set to one byte. The AND gate 360 is used to emulate the condition where data is available in the virtual receiver FIFO, but has not yet reached the programmed trigger level. In this case, an industry standard 16550 compatible UART would generate the character time-out condition. For all other cases when read data is available, a "received data available" condition is present.

The select input of the multiplexer 364 is driven by an AND gate 366, whose inputs include VIER[0], a bit in the virtual interrupt enable register to enable the received data available interrupt and timeout interrupts in the FIFO mode. The other input of the AND gate 366 is connected to FREAD_DAT_AVAIL, a flag indicating that read data is available. The AND gate 366 thus relates to the virtual receiver interrupt signal. The output of the multiplexer 364 is connected to the B input of a multiplexer 368. The A input of the multiplexer 368 is connected to 6h, a signal indicating that the interrupt type is the receiver line status type, or the highest priority level. The select input of the multiplexer 368 is connected to an AND gate 370, whose inputs include VIER[2], a bit in the virtual interrupt enable register indicating that the receiver line status interrupt has been enabled. The AND gate 370, which reflects the virtual line status interrupt signal—the highest priority interrupt signal, is also connected to a VLSR[4:0]≠0 signal indicating that bits 4-0 of the virtual line status register are not equal to zero. The output of the multiplexer 368 is INTERRUPT_ID[3:0].

Thus, the virtual device can provide a prioritized interrupt level, with the highest level being the receiver line status interrupt and the lowest priority level being the modem status interrupt. The INT_ID constitutes the bottom four bits of the interrupt identification register VIIR so that when the CPU 50 accesses the virtual interrupt identification register, the highest priority pending interrupt can be provided to the CPU 50. Further, when accesses are occurring, the virtual COM device records new interrupts but does not change its current indication until the access is complete.

The circuit of FIG. 5 also generates COM_PRT_ACSD_ACD, a signal indicating that the virtual communication port has been accessed. COM_PRT_ACSD_ACD is generated at the output of an AND gate 374 which receives as one of its inputs CM_MON (FIG. 3). The second input of the AND gate 374 is connected to an OR gate 372, whose inputs are VCDX8 and VCDXC. The OR gate 372 relates to the event where an I/O cycle is being performed to the selected COM port address range. VCDX8 is a decoded signal indicating that an I/O access is being performed to the lower four bytes (bytes 0, 1, 2, or 3) of the COM port I/O space has occurred. VCDXC is also a decoded signal which indicates that the upper four bytes of the COM port address space (bytes 4, 5, 6, and 7), are being accessed. For the COM_1 address range ($3F8h–$3ffh), VCDX8 corresponds to an I/O access to $3F8h–$3FBh. Similarly, VCDXC corresponds to an I/O access to the I/O range of $3FCh–$3FFh. Thus, COM_PRT_ACSD_DCD indicates that any of the registers from 0 to 7 has been accessed when the virtual COM port is in the monitor mode.

At the bottom of FIG. 5, the circuit to generate SMIVCD, a signal indicating that an SMI interrupt is to be generated as a result of a virtual COM port event, is shown. In FIG. 5, CM_MON and LOST_CARRIER are provided to an AND gate 376. The output of the AND gate 376 is provided to one input of an OR gate 378. The OR gate 378 is also connected to MSRCOMPLETE, a signal which is set when the operating system has acted upon a synthesized modem status change event; LSRCOMPLETE, a signal which is set when the operating system has acted upon a line status change; VRB_COMPLETE, a signal indicating that character has been passed to the operating system; and FWRITE_DAT_AVAIL, a flag indicating that the operating system is trying to transmit to the modem 169. The output of the OR gate 378 is SMIVCD. When the virtual COM port is in the monitor mode and the carrier has been dropped, an SMI is generated to handle the loss carrier condition.

Figure 6:
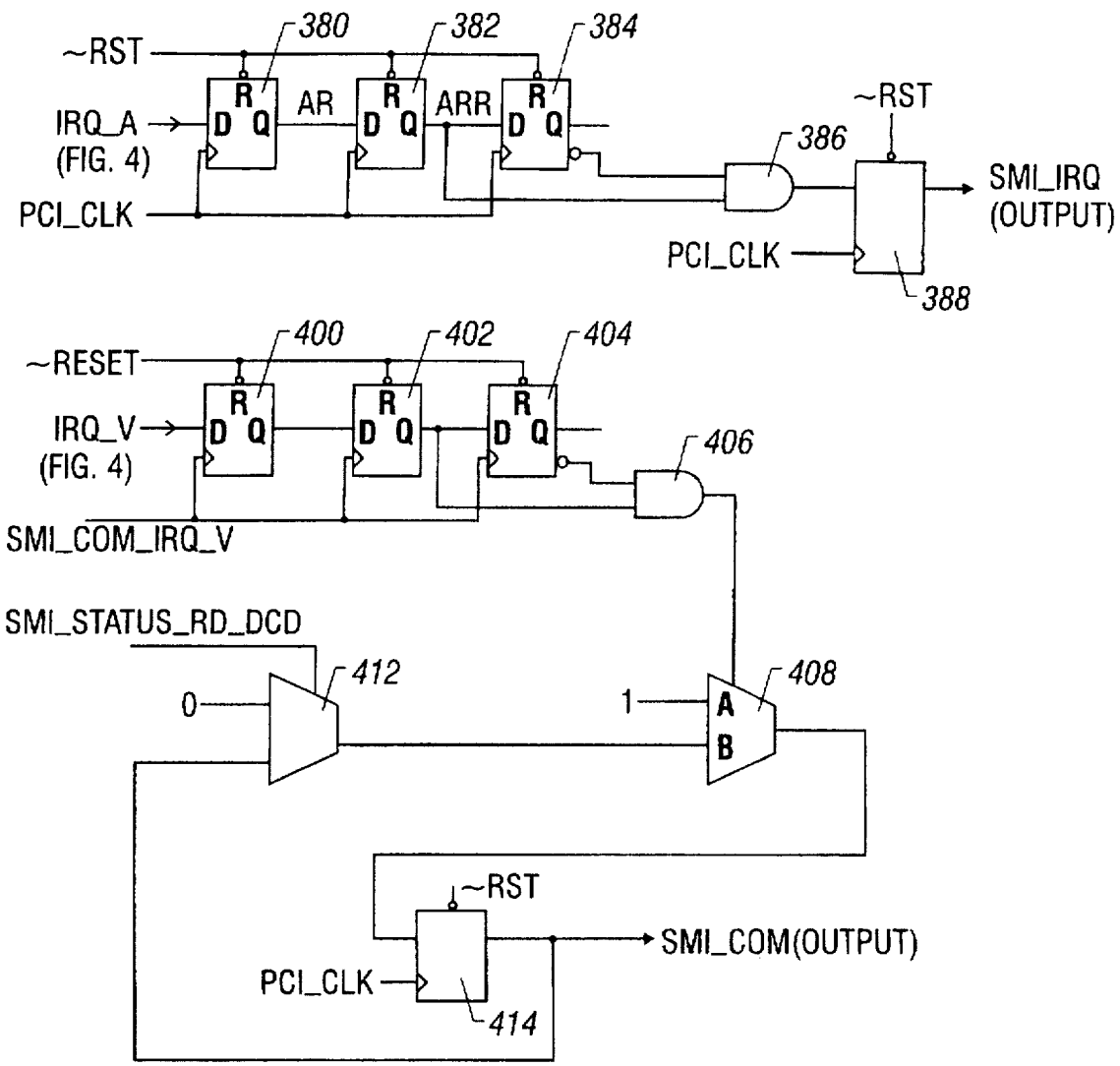
FIG. 6 is a schematic diagram of a circuit for generating system management interrupts in the device of FIG. 2.

Turning to FIG. 6, the circuit to generate SMI signals for interrupt requests and virtual communication port accesses are shown. In FIG. 6, IRQ_A (FIG. 3) is provided to the D input of a flip-flop 380. The output of the flip-flop 380 is provided to the D input of the flip-flop 382. In combination, flip-flops 380 and 382 ensure that the interrupt signal from the EISA bus is synchronized with the PCI clock to prevent errors associated with metastable error conditions. The output of the flip-flop 382 is connected to the D input of a flip-flop 384 and one input of an AND gate 386. The other input of the AND gate 386 is connected to the negated output of the flip-flop 384. Flip-flops 380, 382, 384, and 388 are commonly clocked by PCI_CLK, the clock input for the PCI bus. Further, the reset input of the flip-flops 380, 382, 384, and 388 are tied to ~RST, a reset signal. In combination, the flip-flop 384 and the AND gate 386 generate a pulse for the duration of one clock period. The output of the AND gate 386 is provided to the input of a flip-flop 388 which generates SMI_IRQ, the synchronized SMI interrupt request for the auxiliary interrupt request IRQ_A.

In the circuit to generate SMI_COM, IRQ_V is provided to the input of a flip-flop 400. The output of the flip-flop 400 is provided to the input of a flip-flop 402. The output of the flip-flop 402 is in turn provided to the input of a flip-flop 404 and also to the input of an AND gate 406. The second input of the AND gate 406 is connected to the inverted output of the flip-flop 404. Similar to the arrangement in generating SMI_IRQ, the AND gate 406 generates is a synchronized, single clock pulse output SMI_COM which reflects that a virtual interrupt has been requested. The output of the AND gate 406 is provided to the select input of a multiplexer 408. The A input of the multiplexer 408 is connected to 1, while the B input of the multiplexer 408 is connected to the output of a multiplexer 412. The output of the multiplexer 408 is connected to the D input of a flip-flop 414. The output of the flip-flop 414 is connected to the B input of the multiplexer 412, while the A input of the multiplexer 412 is connected to zero. The select input of the multiplexer 412 is SMI_STATUS_RD_DCD, a signal indicating that a read from the IRC's SMI status register has been performed to identify the source of the SMI event. SMI_COM indicates that the system board has asserted an SMI in response to an interrupt request. Further, upon a read of the status register, SMI_COM is cleared.

Figure 7:
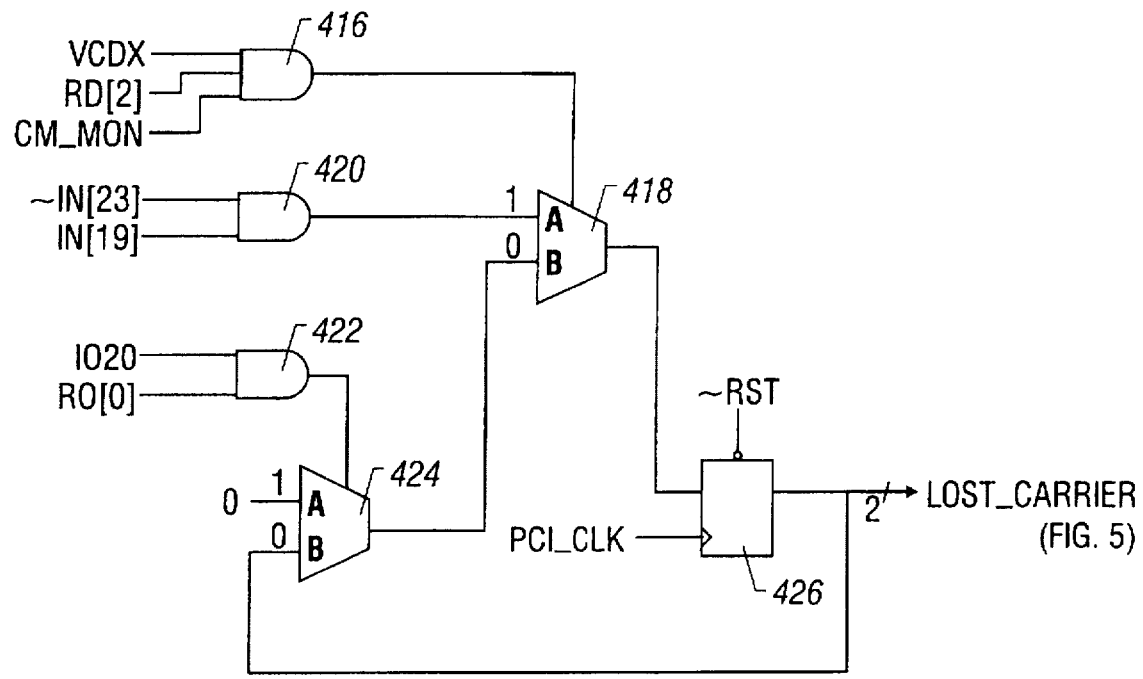
FIG. 7 is a schematic diagram of circuits for detecting a lost carrier and communication port accesses in the device of FIG. 2.
Figure 7:
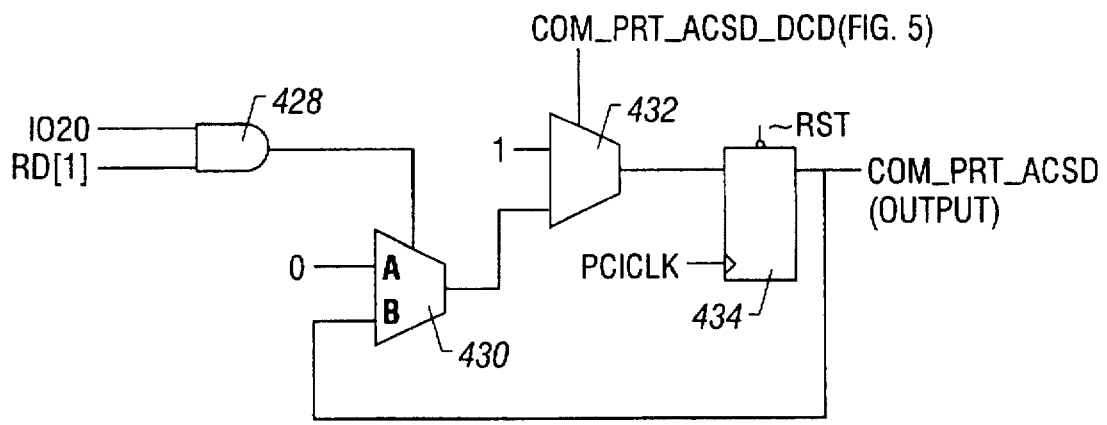

Turning to FIG. 7, the circuit to generate LOST_CARRIER, a signal indicating that the carrier has been lost and COM_PRT_ASCD, a signal indicating that the COM port has been accessed, are shown. In FIG. 7, an AND gate 416 receives VCDX, RD[2] and CM_MON, signals indicating that the modem status register is being read while the VCD is in the "monitor" mode. The output of the AND gate 416 is provided to the select input of the multiplexer 418. The A input of the multiplexer 418 is connected to the output of an AND gate 420, whose inputs are ~IN[23] and IN[19], both from the snooped input data bus. IN[23] is a signal which is the complement of the data carrier detect (DCD) input, while IN[19] is the delta data carrier detect (DDCD) indicator. The output of the AND gate 420 indicates that a currently snooped read indicates that the carrier has changed and is no longer present. As the AND gate 420 detects the condition where the carrier is previously not zero, and now has changed to zero, the output of the AND gate 420 is indicative of a lost carrier.

The output of the multiplexer 418 is connected to the D input of a flip-flop 426. The output of the flip-flop 426, LOST_CARRIER, is provided to the B input of a multiplexer 424. The output of the multiplexer 424 is connected to the B input of the multiplexer 418. Further, the A input of the multiplexer 424 is grounded. The select input of the multiplexer 424 is driven by an AND gate 422, whose inputs include IO20 and RD[0], indicating a read of the VCD status register. Thus, LOST_CARRIER is set if, when in the monitor mode, the carrier bit is previously non-zero, and is now zero. Further, LOST_CARRIER is automatically cleared by a read to this register.

At the bottom of FIG. 7, the circuit to generate COM_PRT_ACSD is shown. In FIG. 7, IO20 and RD[1] are provided to an AND gate 428. The output of the AND gate 428 thus indicates that the system is currently reading a status register which has returned the satae of COM_PRT_ACSD_DCD. The output of the AND gate 428 is provided to the select input of a multiplexer 430. The A input of the multiplexer 430 is grounded. The output of the multiplexer 430 is connected to the B input of a multiplexer 432. The A input of the multiplexer 432 is connected to a logic high level. Further, the select input of the multiplexer 432 is connected to COM_PRT_ACSD_DCD (FIG. 5). The output of the multiplexer 432 is provided to the input of a flip-flop 434. The output of the flip-flop 434 is COM_PRT_ACSD. The output of the flip-flop 434 is also provided to the B input of the multiplexer 430. During operation, when a cycle is provided to the COM port, COM_PRT_ACSD is set. Further, when a read to I/O port 21, as detected by the AND gate 428, COM_PRT_ACSD is automatically cleared. Thus, COM_PRT_ACSD enables the detection of modem activity based on the deassertion or assertion of COM_PRT_ACSD during a certain time interval. If the operating system software is not using the modem, the SMI code for the virtual port retrieves the modem and reassigns the modem from the operating system software.

Figure 8A:
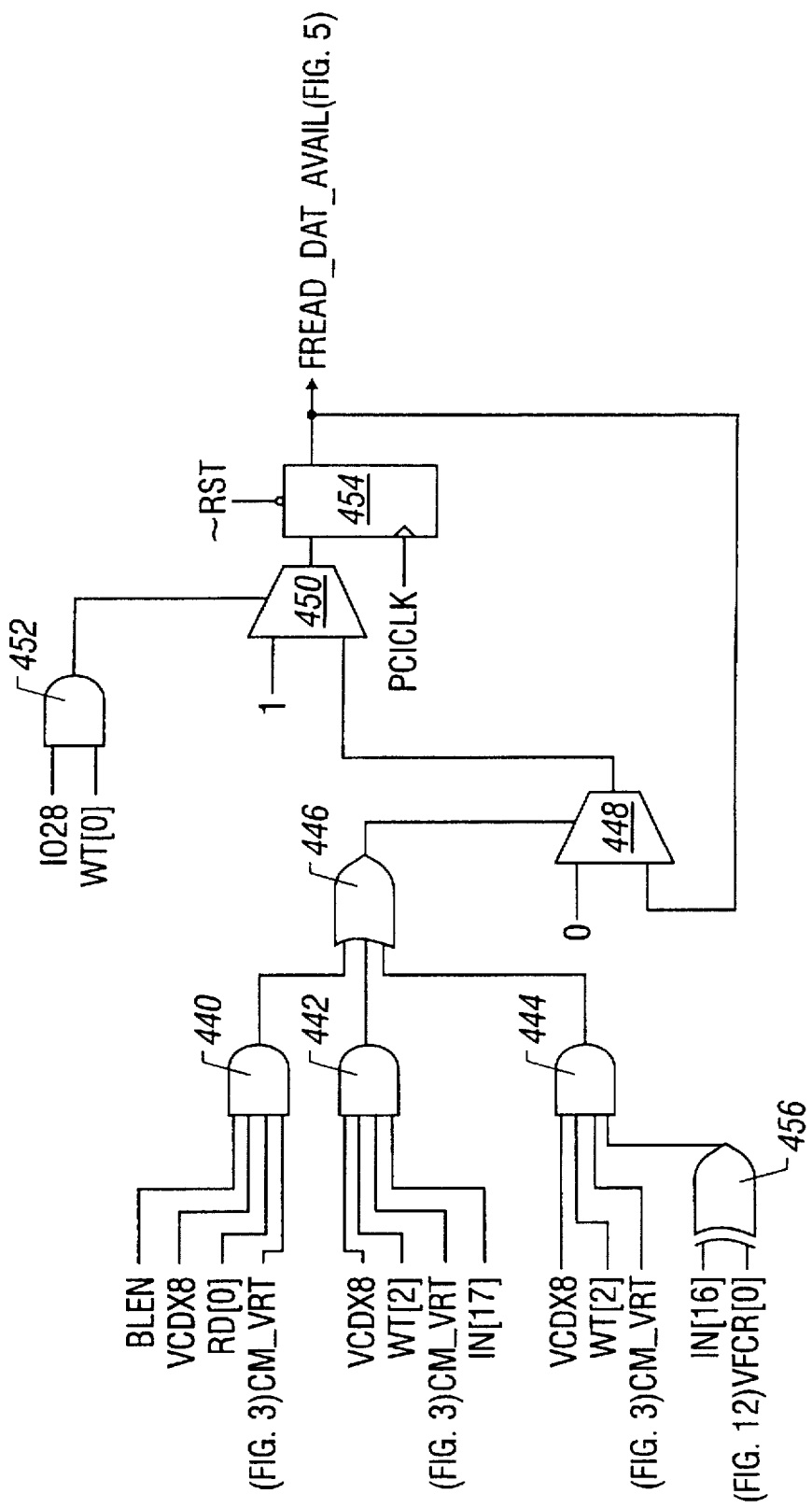
FIG. 8 is a schematic diagram of circuits for a read available flag and a write available flag in the device of FIG. 2.
Figure 8B:
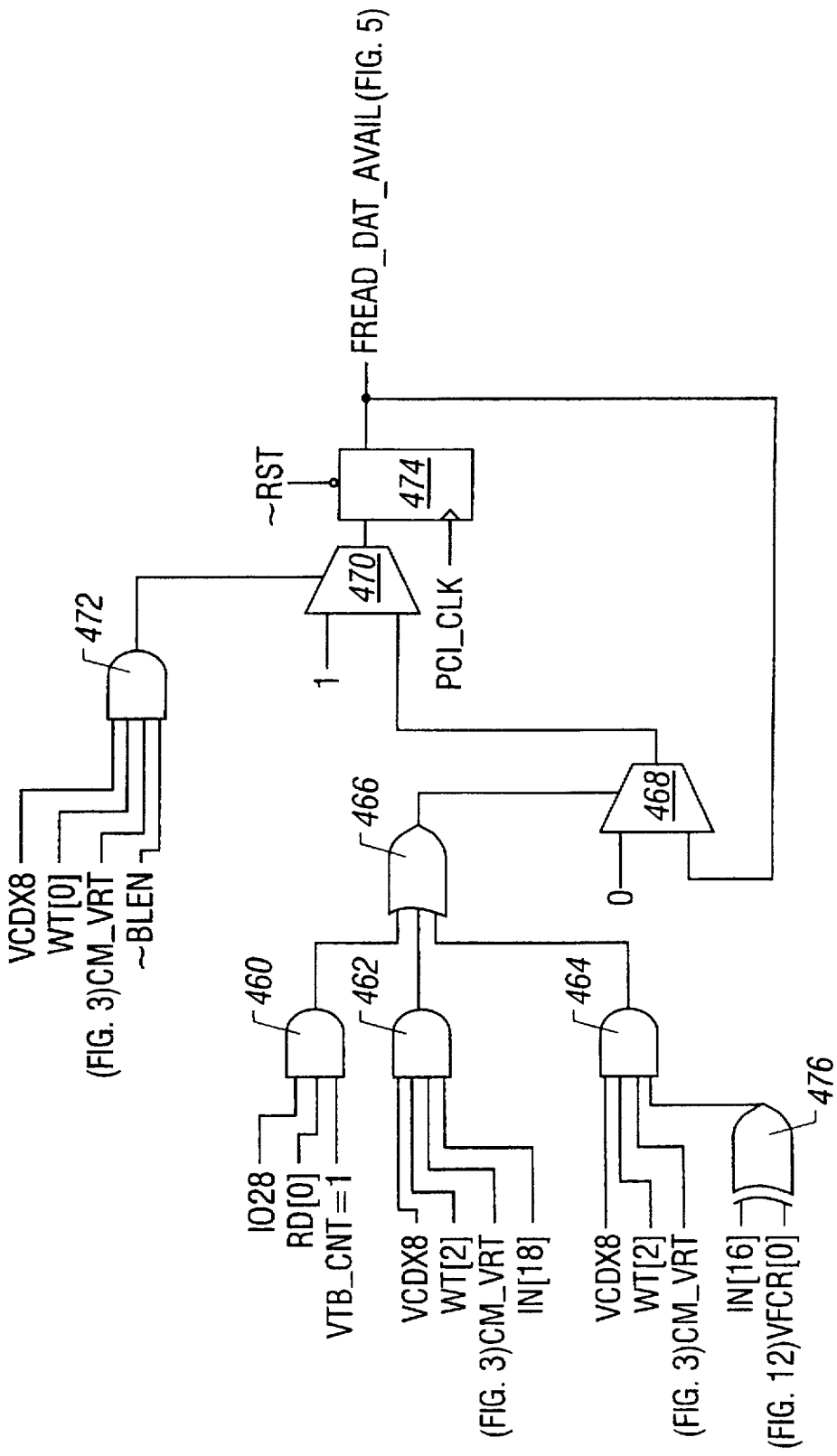

Turning to FIG. 8, the circuits to generate the flags FREAD_DAT_AVAIL and FWRITE_DAT_AVAIL are shown. In FIG. 8, an AND gate 440 receives VCDX8, RD[0], CM_VRT and BLEN. The AND gate 440 detects the condition that the receive buffer register is being read while the virtual port is in the virtual mode. In this case, the OS software is reading the receive buffer. Further, an AND gate 442 receives VCDX8, WT[2], CM_VRT, and IN[17]. The output of the AND gate 442 detects the condition when the receive FIFO has been reset when the OS software is clearing the receive FIFO. An AND gate 444 also receives VCDX8, WT[2], and CM_VRT. Further, the AND gate 444 receives the output of an exclusive OR gate 456. The input of the exclusive OR gate 456 are IN[16] and VFCR[0] which is, bit zero of the virtual FIFO control register. The output of the AND gate 444 indicates whether or not the FIFO mode has changed.

The outputs of the AND gates 440, 442, and 444 are provided to the inputs of an OR gate 444. The output of the OR gate 444 is provided to the select input of a multiplexer 448. The A input of the multiplexer 448 is zero, while the B input of the multiplexer 448 is connected to FREAD_DAT_AVAIL. Further, the output of the multiplexer 448 is connected to the B input of a multiplexer 450, while the A input of the multiplexer 450 is connected to one. The select input of the multiplexer 450 is connected to the output of an AND gate 452. The input of the AND gate 452 is connected to IO28 and WT[0]. The output of the multiplexer 450 is provided to the input of a flip-flop 454 which generates at the output FREAD_DAT_AVAIL. The thus disclosed circuit for FREAD_DAT_AVAIL provides a flag indicating that read data is available, as caused by a write to the virtual receive buffer of the IRC device 170. Further, FREAD_DAT_AVAIL is automatically cleared when the OS reads the receive buffer (RB).

As shown in the circuit to generate FWRITE_DAT_AVAIL, an AND gate 460 receives IO28, RD[0], and VTB_CNT=1, a signal indicating that the virtual transmitter buffer count is one. Together, these signals indicate the condition where the virtual transmit FIFO contains one character which is currently being read. Thus, the output of the AND gate 460 indicates that the system is reading the last byte from the virtual transmit FIFO. Additionally, an AND gate 462 receives VCDX8, WT[2], CM_VRT, and IN[18]. The output of the AND gate 464 indicates the condition where the transmitter FIFO is being reset by the operating system. Further, an AND gate 464 receives VCDX8, WT[2], and CM_VRT. Further, the AND gate 464 receives an output from an exclusive OR gate 476. The exclusive OR gate 476 in turn receives IN[16], and VFCR[0]. The output of the AND gate 464 indicates the condition where the FIFO mode has changed. The output of the AND gates 460, 462, and 464 are provided to an OR gate 466. The output of the OR gate 466 is provided to the select input of a multiplexer 468. The output of the multiplexer 468 is in turn provided to the B input of a multiplexer 470. The A input of the multiplexer 470 is connected to one. Further, the select input of the multiplexer 470 is connected to the output of an AND gate 472, whose inputs are connected to VCDX8, WT[0], CM_VRT, and ~BLEN, the baud rate latch enable signal. The output of the multiplexer 470 is provided to the input of a flip-flop 474 which generates FWRITE_DAT_AVAIL at the output. The output of the flip-flop 474 is connected to the B input of the multiplexer 468, while the A input of the multiplexer 468 is grounded. As shown in FIG. 8, FWRITE_DAT_AVAIL is a flag indicating that write data is available. This flag is set when a write operation is performed to the transmit buffer in the virtual mode and that the write is not directed at a baud rate operation. Further, FWRITE_DAT_AVAIL is cleared when the status register is read.

Figure 9:
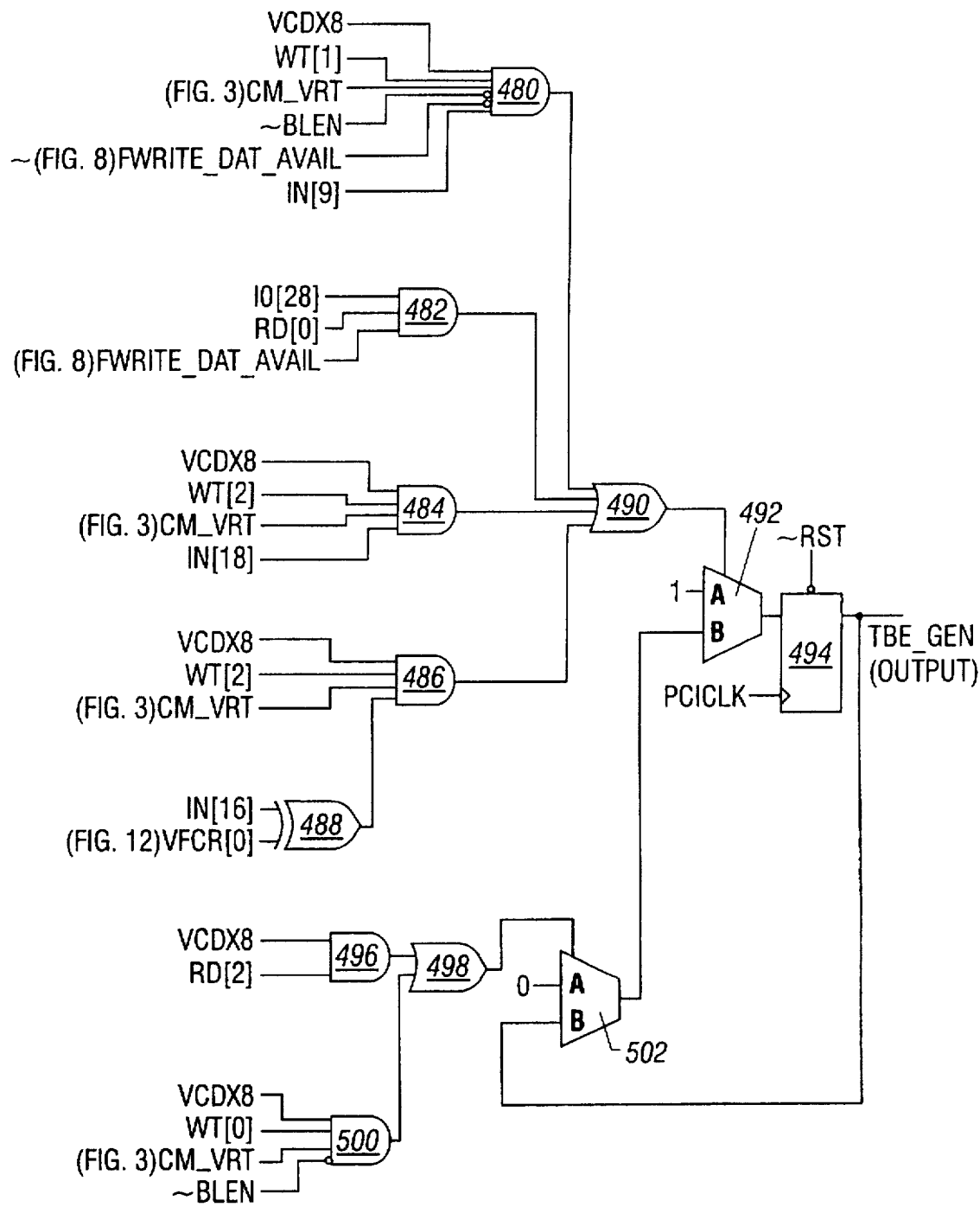
FIG. 9 is a schematic diagram of a circuit for generating a transmitter buffer enable signal in the device of FIG. 2.

Turning to FIG. 9, the circuit to generate TBE_GEN, the signal for transmitter buffer empty interrupt generation is shown. In FIG. 9, an AND gate 480 receives VCDX8, WT[1], CM_VRT, ~BLEN, ~FWRITE_DAT_AVAIL, and IN[9]. The output of AND gate 480 indicates that bit 1 of the IER is being set and data is not available in the transmit FIFO. The output of the AND gate 480 is connected to one input of an OR gate 490. Also connected to the input of the AND gate 490 is an AND gate 482. The AND gate 482 receives IO[28], RD[0], and FWRITE_DAT_AVAIL. The output of the AND gate 482 indicates that data in the virtual transmit FIFO is being read and the transmit buffer is emptying. Additionally, the output of an AND gate 484 is connected to the input of an OR gate 490. The AND gate 484 receives VCDX8, WT[2], CM_VRT, and IN[18]. Together, the output of the AND gate 486 indicates a clear transmit buffer condition.

Finally, an AND gate 486 is connected to the input of the OR gate 490. The AND gate 486 receives VCDX8, WT[2], and CM_VRT. The AND gate 486 also receives the output of an exclusive OR gate 488, whose inputs are IN[16] and VFCR[0]. Together, the output of the AND gate 486 signals the condition where the FIFO has changed.

The output of the OR gate 490, indicating that a virtual transmit buffer interrupt is to be generated, is provided to the select input of a multiplexer 492. The A input of the multiplexer 492 is connected to one. The output of the multiplexer 492 is connected to the input of a flip-flop 494. The output of the flip-flop 494 is TBE_GEN, is provided to the B input of a multiplexer 502. The A input of the multiplexer 502 is grounded, while the output of the multiplexer 502 is connected to the B input of the multiplexer 492. Further, the select input of the multiplexer 502 is connected to the output of an OR gate 498. The OR gate 498 in turn receives outputs from an AND gate 496 and an AND gate 500. The AND gate 496 accepts VCDX8 and RD[2] as inputs. The AND gate 496 detects the condition where the operating system software has read the UART's IER. The AND gate 500 receives VCDX8, WT[0], CM_VRT, and ~BLEN. The AND gate 500 detects the condition where the operating sytem has written to the transmit buffer of the UART. The output TBEGEN inidcates that a transmit buffer empty interrupt is to be generated.

Figure 10:
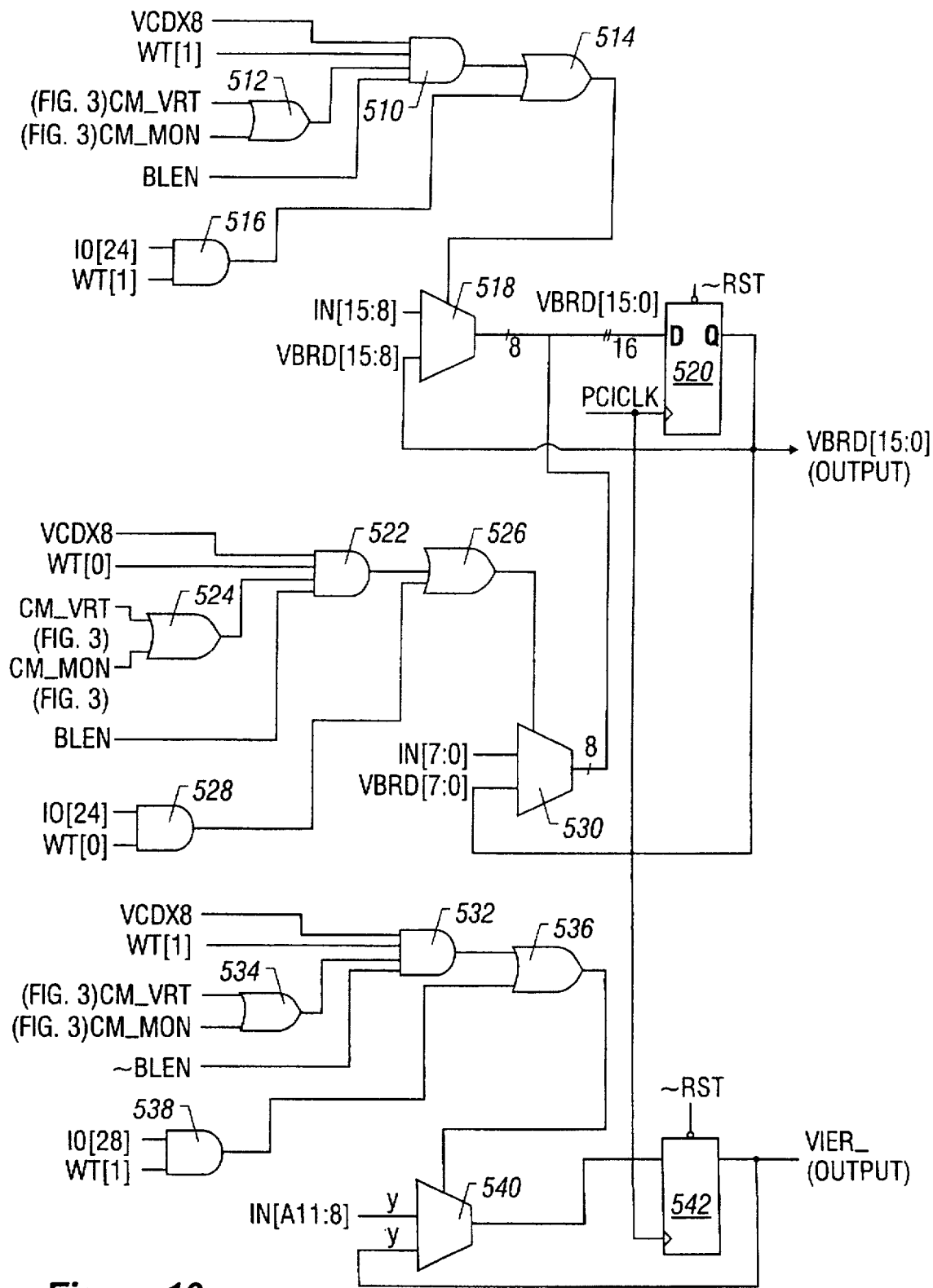
FIG. 10 is a schematic diagram of circuits for a virtual buffer read data register and a virtual interrupt enable register in the device of FIG. 2 in the device of FIG. 2.

In FIG. 10, the circuit to generate the virtual buffer read data register VBRD and the virtual interrupt enable register VIER is shown. In FIG. 10, an AND gate 510 receives VCDX8, WT[1] and BLEN as inputs and generates an output indicating that the OS is writing to the upper 8-bits of the Baud Rate Divisor latch. Further, the AND gate 510 is connected to output of an OR gate 512. The OR gate 512 is connected to CM_VRT and CM_MON (FIG. 3). The AND gate 516 receives IO[24] and WT[1], indicating that a write operation is to be performed to register 25. The output of the AND gate 510 is connected to one input of an OR gate 514. The other input to the OR gate 514 is connected to the output of the AND gate 516 which indicates that the SMI firmware is writing to the Virtual Baud Rate Divisor latch. The output of the OR gate 514 is then connected to the select input of a multiplexer 518. The A input of the multiplexer 518 is connected to the IN bus IN[15:8]. Further, the B input of the multiplexer 518 is connected to the upper byte of VBRD [15:8]. The output of the multiplexer 518 is provided to a 16-bit register 520. The output of the register 520 is the full (16-bit) version of the virtual buffer divisor latch, VBRD [15:0].

The low byte of VBRD is provided to the B input of a multiplexer 530. Further, the low byte of the IN bus IN[7:0]

is provided to the A input of the multiplexer 530. The select input of the multiplexer 530 is controlled by gates 522, 524, 526 and 528. The inputs to an AND gate 522 are VCDX8, WT[0], BLEN and the output of an OR gate 524. The output of the AND gate 522 indicates that the OS is writing to the lower 8-bits of the Baud Rate Divisor latch. The inputs of the OR gate 524 are CM_VRT and CM_MON. Further, the other input of the OR gate 526 is driven by an AND gate 528 whose inputs are IO[24] and WT[0] and whose output indicates that the SMI firmware is writing to the Virtual Baud Rate Divisor latch. The select input of the multiplexer 530 is driven by the output of the OR gate 526. As shown, the circuit to generate VBRD generates both the upper and lower bytes of the divisor latch, whose definition is contained in the summary of register definitions below:

TABLE 2

| | | | | | Register Address | | | | | | | |
|---|---|---|---|---|---|---|---|---|---|---|---|---|
| | ODLAB = 0 | ODLAB = 0 | 1DLAB = 0 | 2 Virtual Interrupt | 2 Virtual FIFO | 3 | 4 | 5 | 6 | | VBRD | |
| Bit No. | Virtual Receiver Buffer Register VRB | Transmitter Holding Register VTB | Virtual Interrupt Enable Register VIER | Ident. Register (Read Only) VIIR | Control Register (Write Only) VFCR | Virtual Line Control Register VLCR | Virtual MODEM Control Register VMCR | Virtual Line Status Register VLSR | Virtual MODEM Status Register VSMR | 7 Virtual Scratch Register VSCR | Divisor Latch (LS) VBRD [7:0] | Divisor Latch (MS) VBRD [15:7] |
| 0 | Data Bit 0 (Note 1) | Data Bit 0 | Enable Received Data Available Interrupt (EBRF) | "0" if Interrupt Pending | FIFO Enable | Word Length Select Bit 0 (WLS0) | Data Terminal Ready (DTR) | Data Ready (DR) | Delta Clear to Send (DCTS) | Bit 0 | Bit 0 | Bit 8 |
| 1 | Data Bit 1 | Data Bit 1 | Enable Transmitter Holding Register Empty Interrupt (ETBEI) | Interrupt ID Bit (0) | RCVR FIFO Reset | Word Length Select Bit 1 (WLSI) | Request to Send (RTS) | Overrun Error (OE) | Delta Data Set Ready (DDSR) | Bit 1 | Bit 1 | Bit 9 |
| 2 | Data Bit 2 | Data Bit 2 | Enable Receiver Line Status Interrupt (ELSI) | Interrupt ID Bit (1) | XMIT FIFO Reset | Number of Stop Bits (STB) | Out 1 | Parity Error (PE) | Trailing Edge Ring Indicator (TERI) | Bit 2 | Bit 2 | Bit 10 |
| 3 | Data Bit 3 | Data Bit 3 | Enable MODEM Status Interrupt (EDSSI) | Interrupt ID Bit (2) | DMA Mode Select | Parity Enable (PEN) | Out 2 | Framing Error (FE) | Delta Data Carrier Detect (DDCD) | Bit 3 | Bit 3 | Bit 11 |
| 4 | Data Bit 4 | Data Bit 4 | 0 | 0 | Reserved | Even Parity Select (EPS) | Loop | Break Interrupt (BI) | Clear to Send (CTS) | Bit 4 | Bit 4 | Bit 12 |
| 5 | Data Bit 5 | Data Bit 5 | 0 | 0 | Reserved | Stick Parity | 0 | Transmitter Holding Register (THRE) | Data Set Ready(DSR) | Bit 5 | Bit 5 | Bit 13 |
| 6 | Data Bit 6 | Data Bit 6 | 0 | FIFOs Enabled | RCVR Trigger (LSB) | Set Break | 0 | Transmitter Empty (TEMT) | Ring Indicator (RI) | Bit 6 | Bit 6 | Bit 14 |
| 7 | Data Bit 7 | Data Bit 7 | 0 | FIFOs Enabled | RCVR Trigger (MSB) | Divisor Latch Access bit (DLAB) | 0 | Error in RCVR FIFO | Data Carrier Detect (DCD) | Bit 7 | Bit 7 | Bit 15 |

Turning to the lower portion of FIG. 10, the circuit to generate the virtual interrupt enable register is shown. In FIG. 10, an AND gate 532 receives VCXD8, WT[1], ~BLEN and the output of an OR gate 534. The AND gate 532 indicates that the OS software is writing to the interrupt enable register (IER). The OR gate 534 receives CM_VRT and CM_MON from FIG. 3. Further, the OR gate 536 receives an output from an AND gate 538. The AND gate 538 receives IO[28] and WT[1] and outputs a signal indicating that the SMI firmware is writing to the Virtual IER. The output of the OR gate 536 is provided to the select input of a multiplexer 540. The A input of the multiplexer 540 is connected to IN[A11:8]. The B input of the multiplexer 540 is connected to VIER. The output of the multiplexer 540 is connected to a register 542 to store the values for the virtual enable register. This register thus enables the five types of interrupts to the virtual COM device. Each interrupt source, if enabled in this register, can individually activate the interrupt output signal to the processor 50, as shown in Table 2.

Figure 11:
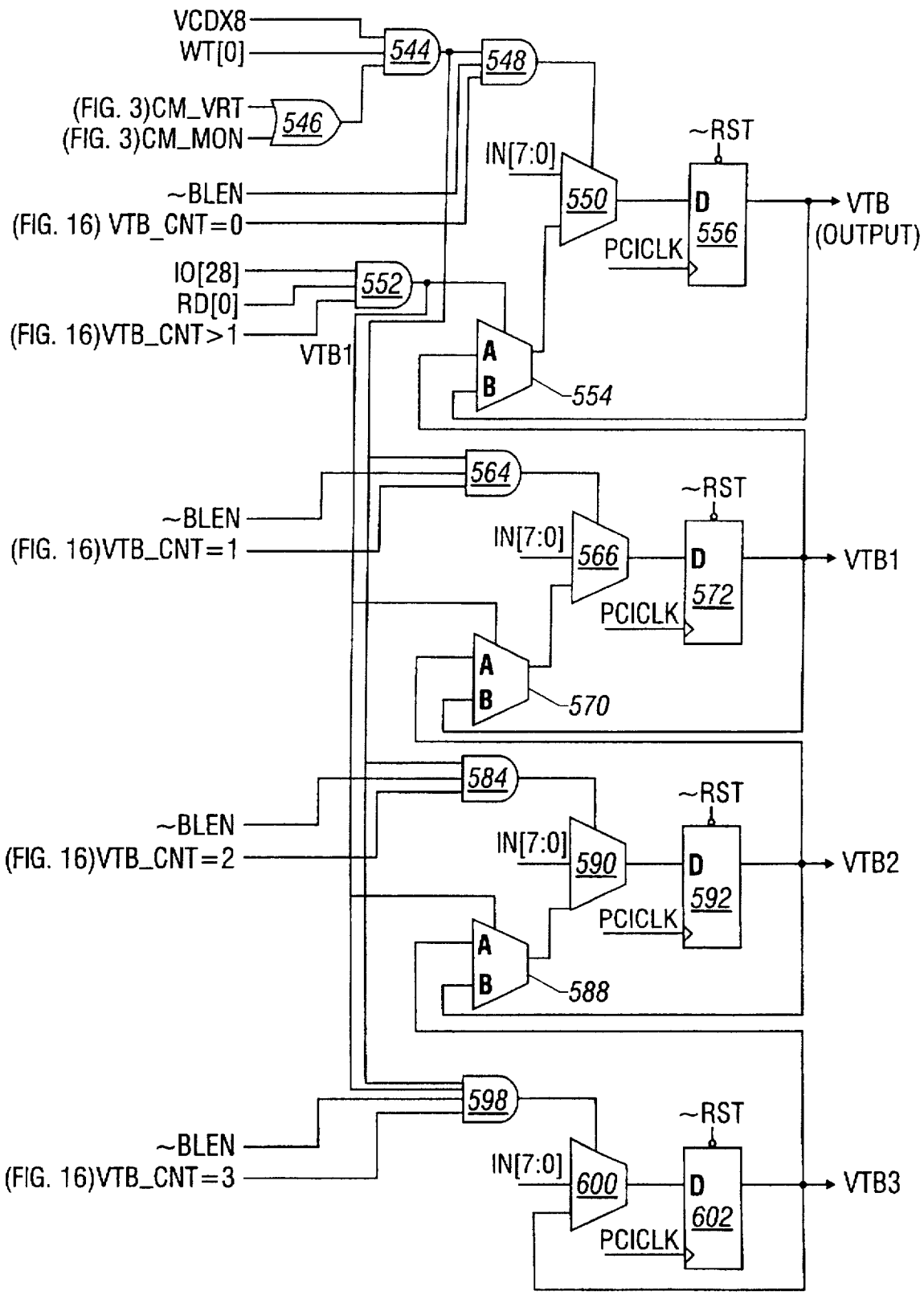
FIG. 11 is a schematic diagram of a circuit for a virtual transmitter buffer register in the device of FIG. 2.

The circuit of FIG. 11 generates the virtual transmitter holding register VTB. Four 8-bit registers are connected to form a pseudo-FIFO to absorb continuous writes from the operating system software to the virtual transmit FIFO. This is necessary to absorb writes which may be posted in the host to PCI bridge before an SMI# can be acknowledged. This register contains the latest value written to the transmitter holding register of the virtual COM port. Turning to the top of FIG. 11, an AND gate 544 receives VCDX8 WT[0], and an output from an OR gate 546. The OR gate 546 receives CM_VRT and CM_MON. The output of the AND gate 544 is provided to the input of an AND gate 548, which receives ~BLEN as one input and VTB_CNT=0, a signal indicating that nothing exists in the virtual transmitter buffer. The output of the AND gate 548, which indicates a write to the transmit buffer in either the virtual or the monitor mode and that the FIFO is empty, is connected to the select input of a multiplexer 550. The A input of the multiplexer 550 is connected to IN[7:0]. The output of the multiplexer 550 is connected to the D input of a register 556, VTB, is provided to the B input of a multiplexer 554. The output of the multiplexer 554 is connected to the B input of the multiplexer 550. The A input of the multiplexer 554 is connected to VTB1, which is discussed below. The select input of the multiplexer 554 is connected to the output of an AND gate 552. The AND gate 552 evaluates IO[28], RD[0], and VTB_CNT>1, a signal indicating that the date to be transmitted in the virtual transmitter buffer is greater than one. The output of the AND gate 552 indicates that the SMI firmware is reading from the virtual transmit FIFO and more than one character is present, indicating the need to shift the additional data down.

In generating VTB1, an AND gate 564 receives the output from the AND gate 554, ~BLEN, and VTB_CNT=1, a signal indicating that the virtual transmitter buffer count is one. The output of the AND gate 564 is connected to the select input of the multiplexer 566 and indicates that the OS is writing to the transmit buffer and the FIFO already contains a character. The A input of the multiplexer 566 is connected to IN[7:0]. The output of the multiplexer 566 is connected to the input of the register 572 which generates VTB1. VTB1 is also presented to the B input of a multiplexer 570, while the A input of the multiplexer 570 is connected to VTB2, which is discussed below. The select input of the multiplexer 570 is connected to the output of the AND gate 552.

Turning to the generation of VTB2, an AND gate 584 receives as inputs the output from the AND gate 544, ~BLEN, and VTB_CNT=2, a signal indicating that the virtual transmitter buffer count is 2. The output of the AND gate 584 is connected to the select input of a multiplexer 590 and indicates that the OS is writing to the transmit buffer and the FIFO contains one or more characters. The output of the multiplexer 590 is connected to the input of the register 592 to generate VTB2. The A input of the multiplexer 590 is IN[7:0]. VTB2 is provided to the B input of a multiplexer 588, while the A input of the multiplexer 588 is connected to VTB3. The select input of the multiplexer 588 is connected to the output of the AND gate 522, while the output of the multiplexer 588 is connected to the B input of the multiplexer 590.

In generating VTB3, an AND gate 598 receives the output of the AND gate 544, ~BLEN, and VTB_CNT=3, a signal indicating that the virtual transmitter buffer count is equal to three. The output of the AND gate 598, which indicates that the OS is writing to the transmit buffer and the FIFO contains one or more characters, is provided to the select input of a multiplexer 600. The A input of the multiplexer 600 is connected to IN[7:0]. The output of the multiplexer 600 is connected to the input of a register 602 which stores VTB3. VTB3 is also provided to the B input of the multiplexer 600.

Figure 12:
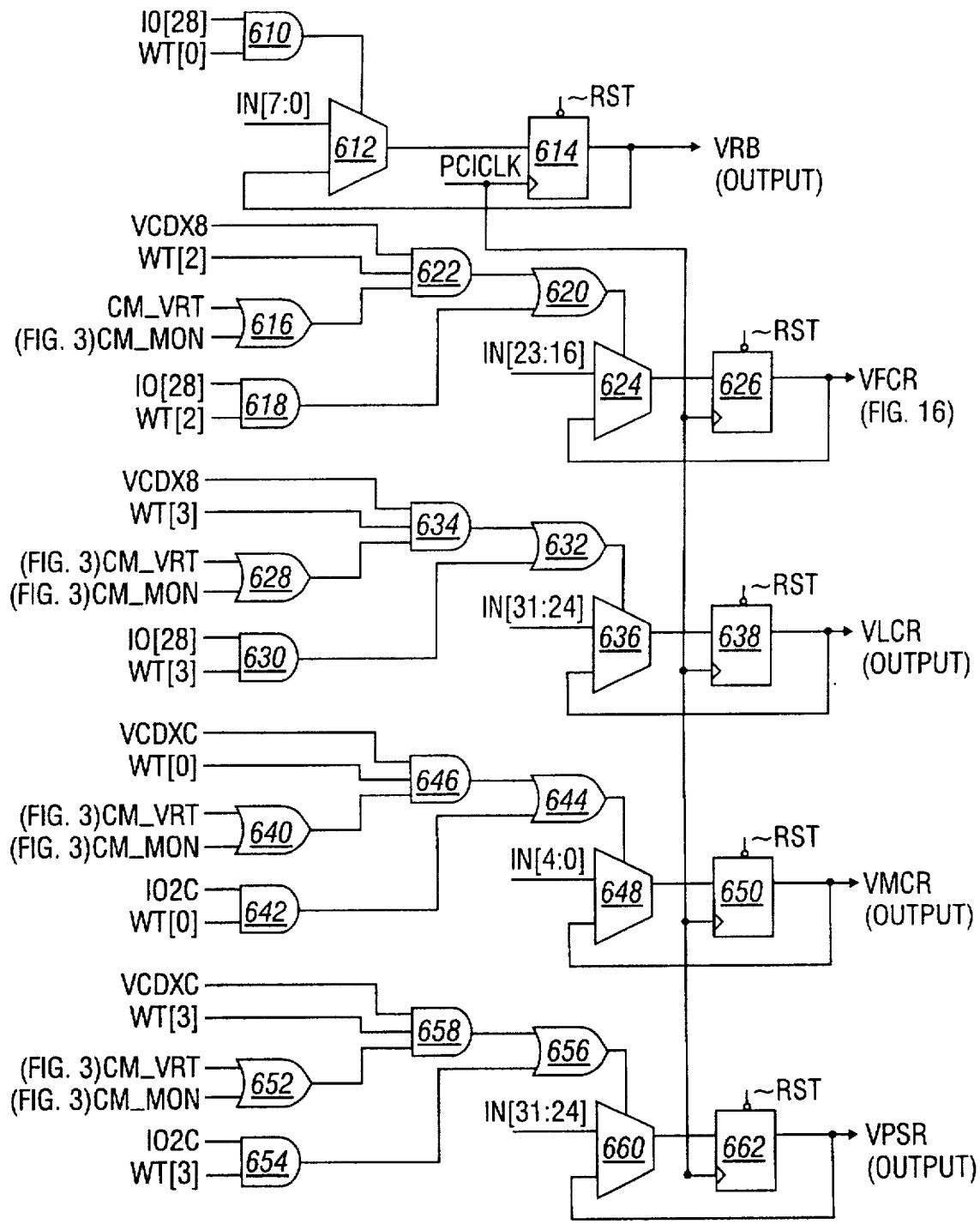
FIG. 12 is a schematic diagram of circuits for a virtual receive buffer register, a virtual FIFO control register, a virtual line control register, and a virtual programmer scratch register in the device of FIG. 2.

FIG. 12 shows the circuits for generating the virtual receive buffer register VRB, the virtual FIFO control register VCFR, the virtual line control register VLCR, and the virtual programmer scratch register VPSR. In FIG. 12, an AND gate 610 receives IO28 and WT[0]. The output of the AND gate 610, which indicates that the SMI firmware is writing to the virtual receive buffer, is provided to the select input of a multiplexer 612. The multiplexer 612 receives the A input IN[7:0] and at the B input VRB. The output of the multiplexer 612 is provided to a register 614 which stores the current VRB value. This value is what the operating system software will receive when it reads the FIFO's receive buffer.

Turning to the circuit for generating the virtual FIFO control register VFCR, an AND gate 622 detects accesses to VFCR. The AND gate 622 receives VCDX8, WT[2], and the output of an OR gate 616, and generates an output indicating that the OS is modifying the FIFO control register. The OR gate 616 in turn receives CM_VRT and CM_MON. Further, an AND gate 618 receives IO28 and WT[2] and decodes the condition where the SMI firmware is writing to the VFCR. An OR gate 620 receives the outputs of the AND gates 618 and 622. Upon detecting that a write operation is being directed to VFCR, the OR gate 620 drives the select input of a multiplexer 624. The A input of the multiplexer 624 is connected to IN[23:16], while the B input of the multiplexer 624 is connected to VFCR. The output of the multiplexer 624 is connected to the input of a register 626 for storing the current value of VFCR.

In the circuit for storing the value of the virtual line control register VLCR, an AND gate 634 receives VCDX8, WT[3], and the output of an OR gate 628. The AND gate 634 indicates whether the OS is modifying the line control register. The OR gate 628 receives as inputs CM_VRT and CM_MON. Further, an AND gate 630 receives as inputs IO28 and WT[3] to detect whether or not an access to VLCR is being performed by the SMI firmware. The output of the AND gates 630 and 634 are provided to an OR gate 632, whose output drives the select input of a multiplexer 636. IN[31:24] is provided to the A input of the multiplexer 636, while the B input of the multiplexer 636 is connected to the current value of VLCR. The output of the multiplexer 636 is provided to the input of the register 638 for storing the value of VLCR when it is being written to.

Turning to the circuit for storing the value of the virtual modem control register VMCR, an AND gate 646 receives VCDXC, WT[0], and the output of an OR gate 640. The AND gate 646's output indicates whether the OS has modified the modem control register. The OR gate 640 in turn receives signals CM_VRT and CM_MON. The AND gate 642 receives as inputs IO2C and WT[0] and generates a signal indicating whether the SMI firmware is writing to the VMCR or not. The outputs of AND gates 642 and 646 are provided to an OR gate 644 which drives the select signal of a multiplexer 648. The A input of the multiplexer 648 is connected to IN[4:0]. The B input of the multiplexer 648 is connected to the present value of VMCR. The output of the multiplexer 648 is connected to the input of a register 650 which stores the value of VMCR.

The circuit for storing the virtual programmer scratch register VPSR uses an AND gate 650 generates the appropriate register select signal. The AND gate 658 receives VCDXC, WT[3], and the output of an OR gate 652. The AND gate 658 output indicates whether the OS has modified the programmer's scratchpad register. The OR gate 652 is connected to CM_VRT and CM_MON. Further, an AND gate 654 receives as inputs IO2C and WT[3] and detects whether the SMI firmware is writing to the VPSR. An OR gate 656 receives the outputs of the AND gates 654 and 658. After detection of an access directed at VPSR, the OR gate 656 drives the select signal of a multiplexer 660. The A input of the multiplexer 660 is connected to the IN[31:24] and the B input to the present value of VPSR. The output of the multiplexer 660 is connected to the input of a register 662 which stores the VPSR values.

Figure 13A:
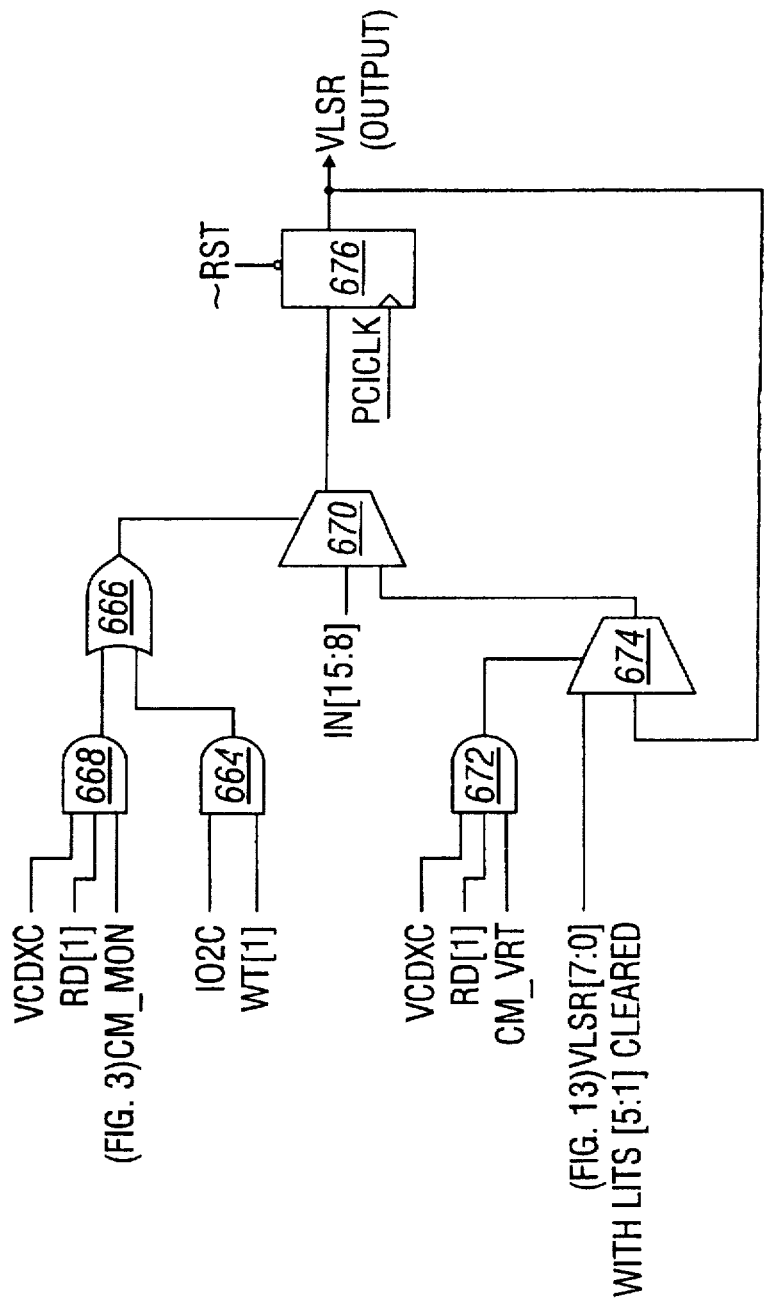
FIG. 13 is a schematic diagram of a circuit for a virtual line status register and a virtual modem status register in the device of FIG. 2.
Figure 13B:
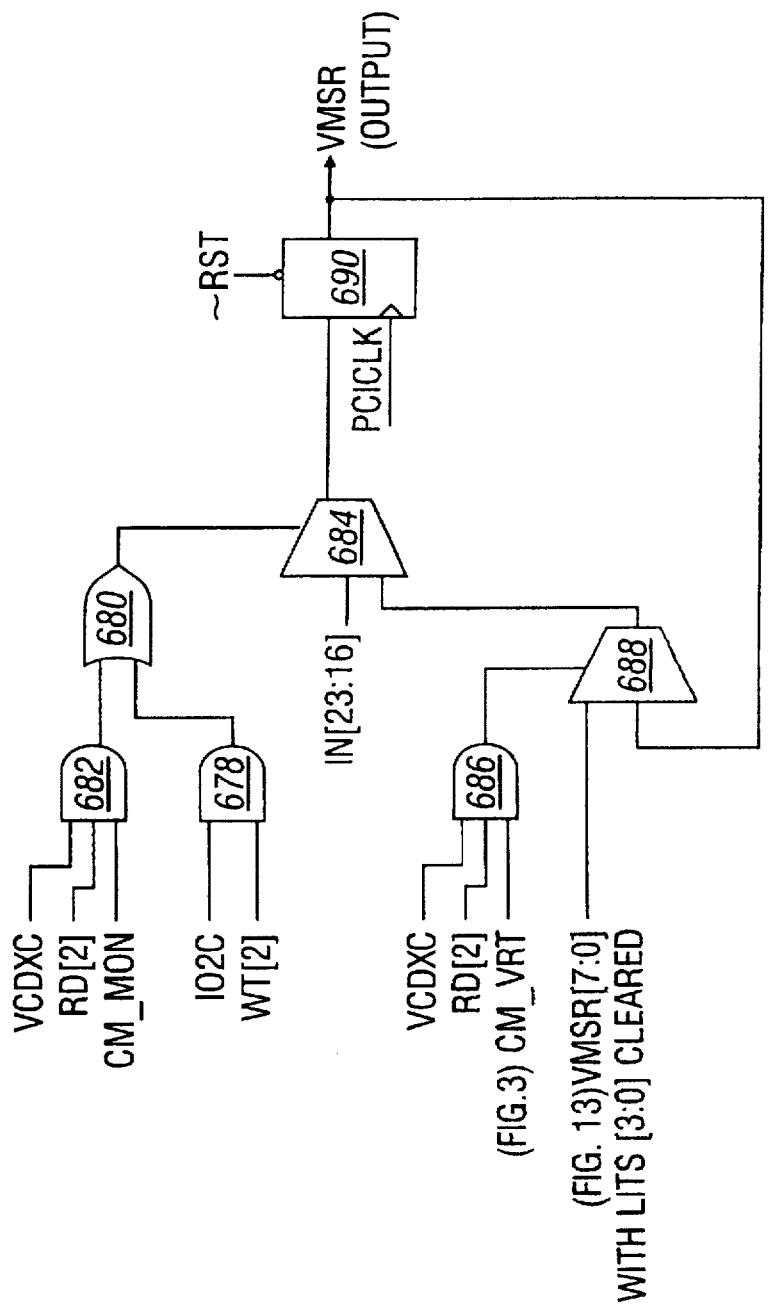

Turning to FIG. 13, the circuit for storing the virtual line status register VLSR is disclosed. In FIG. 13, an AND gate 668 receives VCDXC, RD[1] and CM_MON. The output of the AND gate 668 indicates whether or not the OS is reading the line status register of the actual modem. Further, an AND gate 664 receives IO2C and WT[1] and its output signal VLSR_WR_DCD indicates whether the SMI firmware is writing to the VLSR. The output of the AND gates 664 and 668 is ORed via an OR gate 666 whose output detects accesses to VLSR and is provided to the select input of a multiplexer 670. The A input of the multiplexer 670 is connected to IN[15:8]. The multiplexer 670 is connected to the data input of a register 676 which stores the value of VLSR. VLSR is provided to the B input of a multiplexer 674, while the A input of the multiplexer 674 receives VLSR[7:0] with bits 7-5 of the VLSR register cleared. The select input of the multiplexer 674 is connected to the output of an AND gate 672 which receives VCDXE, RD[1], and CM_VRT as inputs.

At the bottom of FIG. 13, a circuit is depicted for storing the values of the virtual modem status register VMSR. Similar to the circuit for holding the VLSR, an AND gate 682 receives VCDXC, RD[2], and CM_MON. The AND gate 682 indicates whether the OS is reading the modem status register of the actual modem. Further, an AND gate 678 receives IO2C and WT[2] and outputs a signal VMCR_WR_DCD indicating whether the SMI firmware is writing to the VMSR. The outputs of the AND gates 678 and 682 are provided to an OR gate 680. Thus, after detection of accesses to VMSR, the OR gate 680 drives the select input of the multiplexer 684. The A input of the multiplexer 684 is connected to IN[23:16]. Thus, after detection of accesses to VMSR, the AND gate 682 drives the select input of the multiplexer 684. The A input of the multiplexer 684 is connected to IN[23:16]. The output of the multiplexer 684 is connected to the input of a register 690 for storing the value of the virtual modem status register VMSR. VMSR is also provided to the B input of a multiplexer 688. The A input of the multiplexer 688 is connected to VMSR[7:0] with bits 3-0 cleared. The select input of the multiplexer 688 is driven by an AND gate 686, which receives VCDXC, RD[2], and CM_VRT. The output of the AND gate 686 indicates whether the OS is reading the modem status register in the virtual mode. The output of the multiplexer 688 is provided to the B input of the multiplexer 684. Thus, the register provides the current state of the control lines from the modem or the peripheral device to the processor 50. Additionally, change information is also stored in the virtual modem status register.

Figure 14:
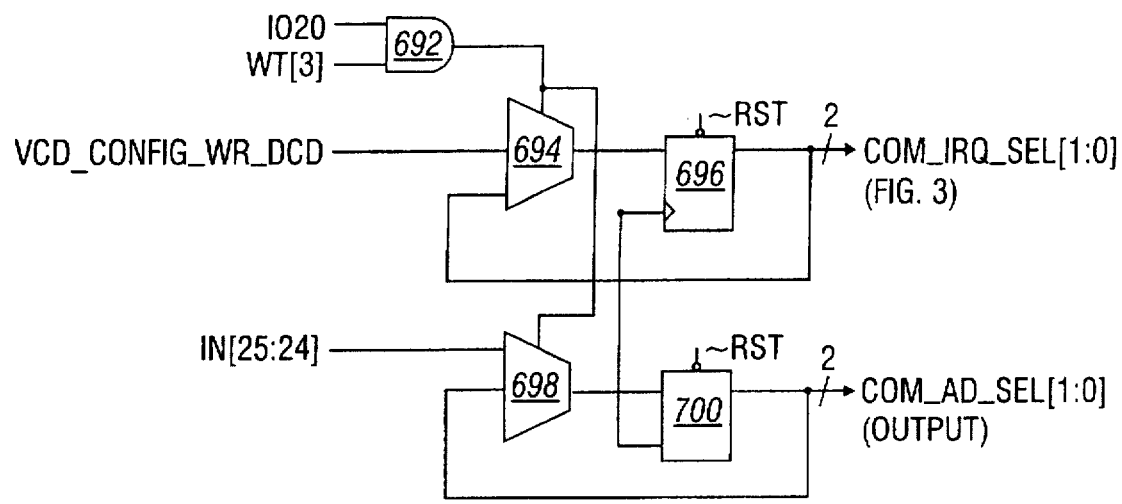
FIG. 14 is a schematic diagram of circuits for generating various communication port address selection signals, interrupt selection signals, and status signals for the line status register and the modem status register in the device of FIG. 2.
Figure 14:
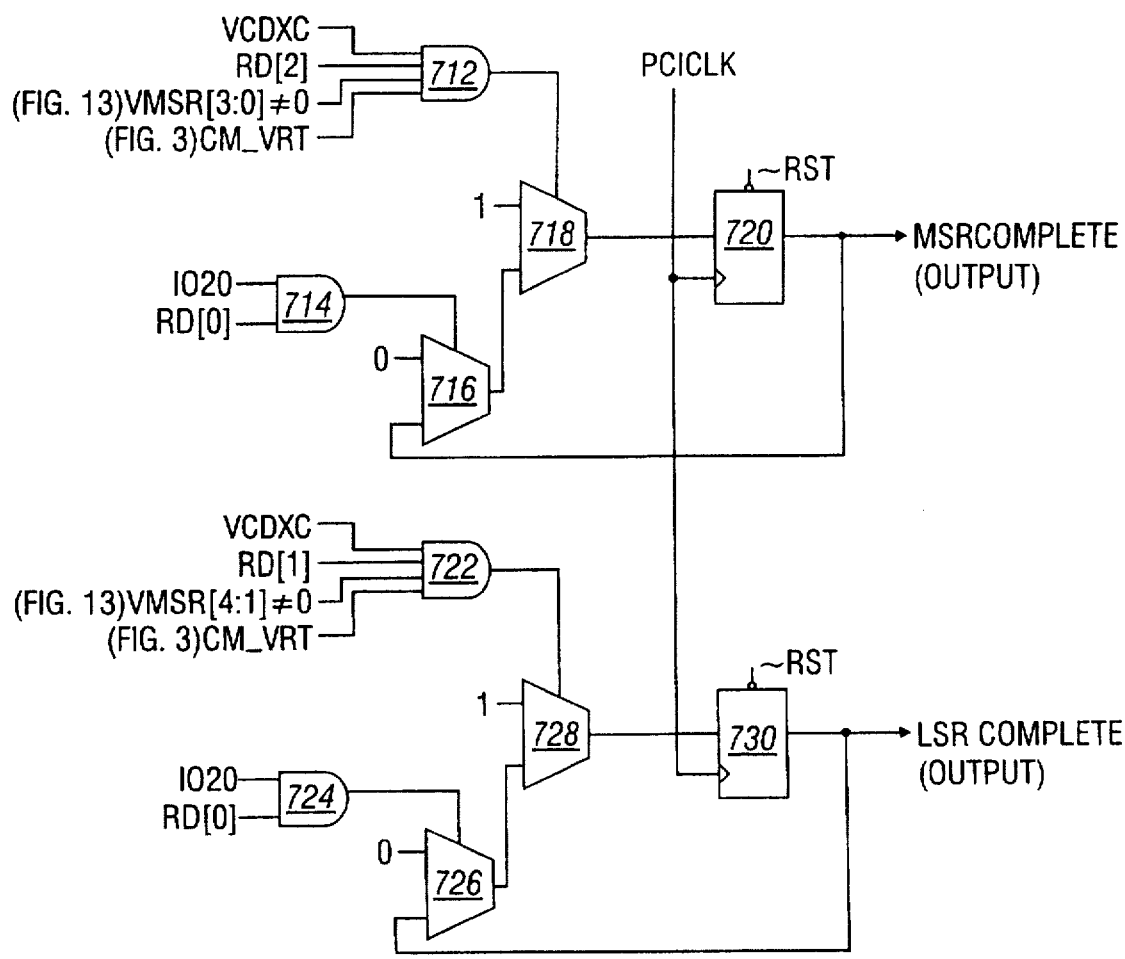

In FIG. 14, the circuit to generate COM_IRQ_SEL, COM_AD_SEL, MSRCHANGE, MSRCOMPLETE, and LSRCOMPLETE is shown. Turning to FIG. 14, an AND gate 692 receives IO20 and WT[3] and outputs a signal indicating that the SMI firmware is writing to a register to configure the virtual COM device. The output of the AND gate 692, which detects that the registers COM_IRQ_SEL and COM_AD_SEL are being written to, is provided to the select input of a multiplexer 694 and a multiplexer 698. The A input of the multiplexer 694 is connected to VCD_CONFIG_WR_DCD, while the A input of the multiplexer 698 is connected to IN[25:24]. The B input of the multiplexer 694 receives the current value of COM_IRQ_SEL. The output of the multiplexer 694 is provided to the input of a register 696 for storing the value of COM_IRQ_SEL, which is the interrupt level setting for the current COM port.

Turning to the circuits for generating COM_AD_SEL, the address selection for the current COM port, the multiplexer 698 receives at the A input IN[25:24] and the current value of COM_AD_SEL at the B input. The output of the multiplexer 698 is provided to the input of a register 700, which identifies the current COM port address.

In the preferred embodiment, a modem status change interrupt is generated by setting any of the lower four bits of the VMSR, indicating a change or a delta in the modem status condition. Alternatively, in the second embodiment of the present invention, the write of a logic one to this bit generates a modem status change interrupt through the IRQ selected in bits indicated in COM_IRQ_SEL. This mechanism is used to wake a sleeping operating system when the SMI firmware decides to relinquish the modem 149. As a result, the operating system receives an interrupt, finds that it is a modem status change interrupt, and then reads that a carrier has been established by the modem. The bit is further reset to zero following a read to the interrupt identification register (IIR). In the event that the MSRCHANGE bit is set and the current virtual communication port mode is virtual.

Turning to the circuit for generating MSRCOMPLETE and LSRCOMPLETE, the MSRCOMPLETE bit is set to indicate that a modem status change has been effectively communicated to the operating system and acted upon. The software uses this bit to queue wake-up events to the operating system. Similarly, the setting of LSRCOMPLETE register indicates that the line status register interrupt has been effectively communicating to the operating system and acted upon. Both MSRCOMPLETE and LSRCOMPLETE are cleared upon reads from the respective register.

In FIG. 14, an AND gate 712 decodes accesses to the MSRCOMPLETE register. The AND gate 712 is connected to VCDXC, RD[2], CM_VRT, and VMSR[3:0]≠0, a signal indicating that the least significant three bits of the virtual modem status register are not zero. The output of the AND gate 712, which indicates that the OS is reading the modem status register following a virtual modem status change interrupt, is connected to the select input of a multiplexer 718. The A input of the multiplexer 718 is connected to one. The output of the multiplexer 718 is connected to the input of a register 720 which stores MSRCOMPLETE. MSRCOMPLETE is also provided to the B input of a multiplexer 716. The A input of the multiplexer 716 is grounded, while the select input of the multiplexer 716 is connected to the output of an AND gate 714. The AND gate 714 receives as inputs IO20 and RD[0] and indicates when the SMI firmware is reading a status register to identify VCDSMI events. The output of the multiplexer 716 is connected to the B input of the multiplexer 718.

The circuit to store LSRCOMPLETE is analogous to the circuit to store MSRCOMPLETE. An AND gate 722 receives VCDXC, RD[1], CM_VRT, and VLSR[4:1]≠0, a signal indicating that bits 1–4 of the virtual line status register are not zero. The output of the AND gate 722, which indicates that the OS is reading the line status register following a virtual modem status change interrupt, is connected to the select input of a multiplexer 728. The A input of the multiplexer 728 is set to one. The output of the multiplexer 728 is connected to the input of a register 730 which stores LSRCOMPLETE. LSRCOMPLETE is also provided to the B input of a multiplexer 726, while the A input of the multiplexer 726 is grounded. Also, an AND gate 724 which receives IO20 and RD[0] is connected to the select input of the multiplexer 726. The output of the multiplexer 726 is connected to the B input of the multiplexer 728. As shown in FIG. 4, MSRCOMPLETE or LSRCOMPLETE is set to indicate that either a modem status change or a line status interrupt has been effected to the operating system and acted upon. Further, upon a read of the status register, the respective MSRCOMPLETE and LSRCOMPLETE registers are cleared.

Figure 15:
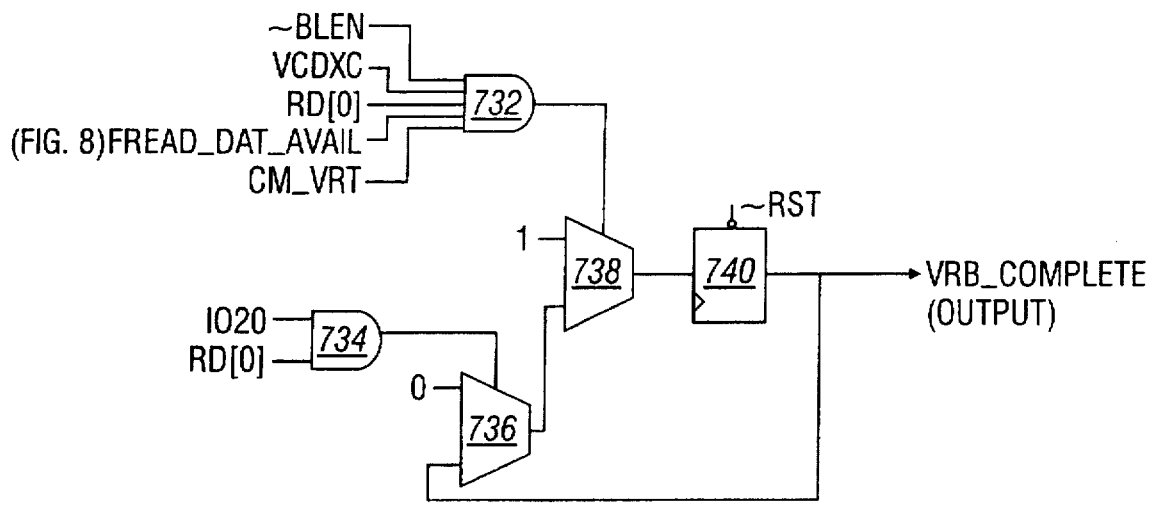
FIG. 15 is a schematic diagram of circuits for generating additional status signals and decoded signals for the virtual communication port in the device of FIG. 2.
Figure 15:
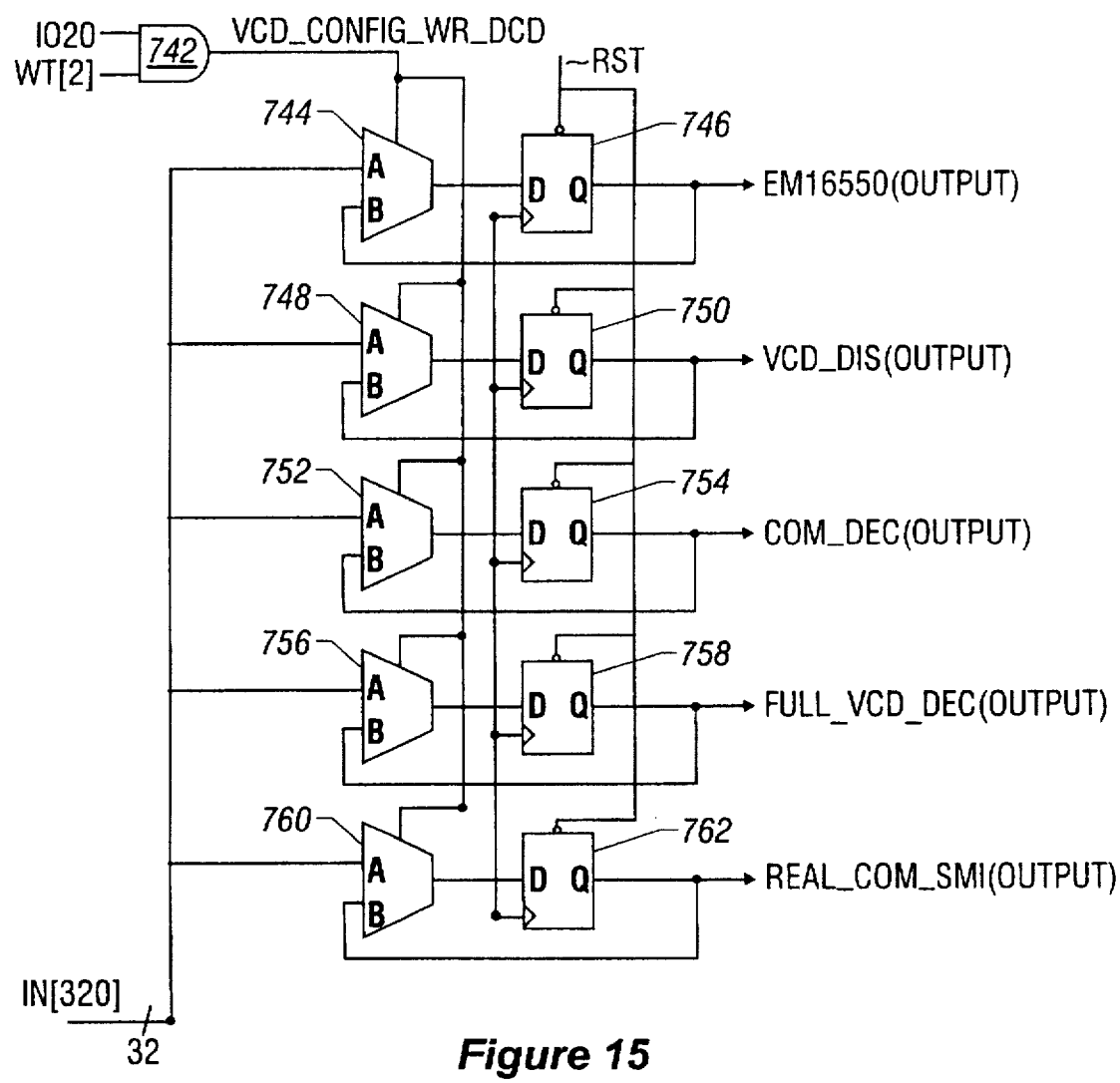

FIG. 15 shows the circuit to generate VRB__COMPLETE. The setting of VRB__COMPLETE indicates that a baud rate divisor change has been effectively communicated to the operating system and acted upon. The circuit for VRB__COMPLETE is similar to that of MSR-COMPLETE. In FIG. 15, an AND gate 732 decodes accesses to VRB__COMPLETE via its input BLEN, VCDX8, RD[0], CM__VRT, and FREAD__DAT__AVAIL. The output of the AND gate 732, which indicates that the OS is reading the receive buffer following a virtual receive data available or a virtual receive FIFO timeout interrupt, is connected to the select input of a multiplexer 738. The A input of the multiplexer 738 is set to one. The output of the multiplexer 738 is connected to the input of a register 740 which stores VRB__COMPLETE. The current value of VRB__COMPLETE is also provided to the B input of a multiplexer 736. The A input of the multiplexer 736 is grounded. The select signal for the multiplexer 736 is connected to the output of an AND gate 734 which receives IO20 and RD[0] and which indicates when the SMI firmware is reading a status register to identify VCD SMI events. Upon a read of VRB__COMPLETE register, the register is cleared. VRB signals that a character has been successfully received by the operating system.

In the lower portion of FIG. 15, the circuit to update various status bits is shown. In FIG. 15, an AND gate 742 receives IO20 and WT[2] to decode writes to a register to configure the virtual COM device by the SMI firmware. The output of the AND gate 742 is provided to the select input of multiplexers 744, 748, 752, 756, 760, and 764. Further, one bit of the IN data bus is provided to the A input of the multiplexer 744. The output of the multiplexer 744 is provided to the input of a flip-flop 746 for storing the EM16550. The setting of EM16550 indicates that the virtual COM port should appear as a 16550 compatible port and further indicate that a FIFO is present. This bit allows the OS to correctly identify the COM virtual port during the booting process without actually accessing real COM port. EM16550 is also provided to the B input of the multiplexer 744.

Another bit of the IN bus is also connected to the A input of the multiplexer 748. The B input of the multiplexer 748 is connected to the current value of VCD__DIS. The output of the multiplexer 748 is connected to the input of a register 750 for storing VCD__DIS. This bit is used to disable the virtual COM port. In conjunction with COM__DEC, the virtual COM port can be controlled.

Yet another bit of IN bus is provided to the A input of the multiplexer 752. The B input of the multiplexer 752 receives the current value of COM__DEC. The output of the multiplexer 752 is connected to the input of a flip-flop 754 for storing COM__DEC. When COM__DEC is set, the IRC device 170 positively decodes PCI accesses to the COM port, as specified in COM__AD__SEL to prevent software from accessing a COM port while the port is used by the remote console. In the second embodiment, this bit is cleared following a read to the interrupt identification register (IIR) in the event that MSRCHANGE is set and the virtual communication port is in virtual mode.

Another bit of IN bus is connected to the A input of the multiplexer 756. The B input of the multiplexer 756 is connected to the current value of FULL__VCD__DEC. The output of the multiplexer 756 is connected to the input of a flip-flop 758 for storing FULL__VCD__DEC. When set, accesses to the virtual COM port will be fully decoded and the virtual communication port will behave accordingly. This means that alias accesses to the COM port will not be decoded by the virtual communication port hardware. When cleared, alias accesses can be directed to the virtual communication port hardware. This bit is set upon the assertion of the reset signal ~RST.

Yet another bit of the IN bus is connected to the A input of the multiplexer 760. The B input of the multiplexer 760 is connected to the current value of REAL__COM__SMI. The output of the multiplexer 760 is connected to the input of the flip-flop 762 which stores REAL__COM__SMI. When this bit is set, all accesses to the selected COM port will be additionally decoded with SMIACT# and forwarded to the EISA bus. All accesses when not in SMI will be positively decoded by the virtual communication port hardware.

Figure 16:
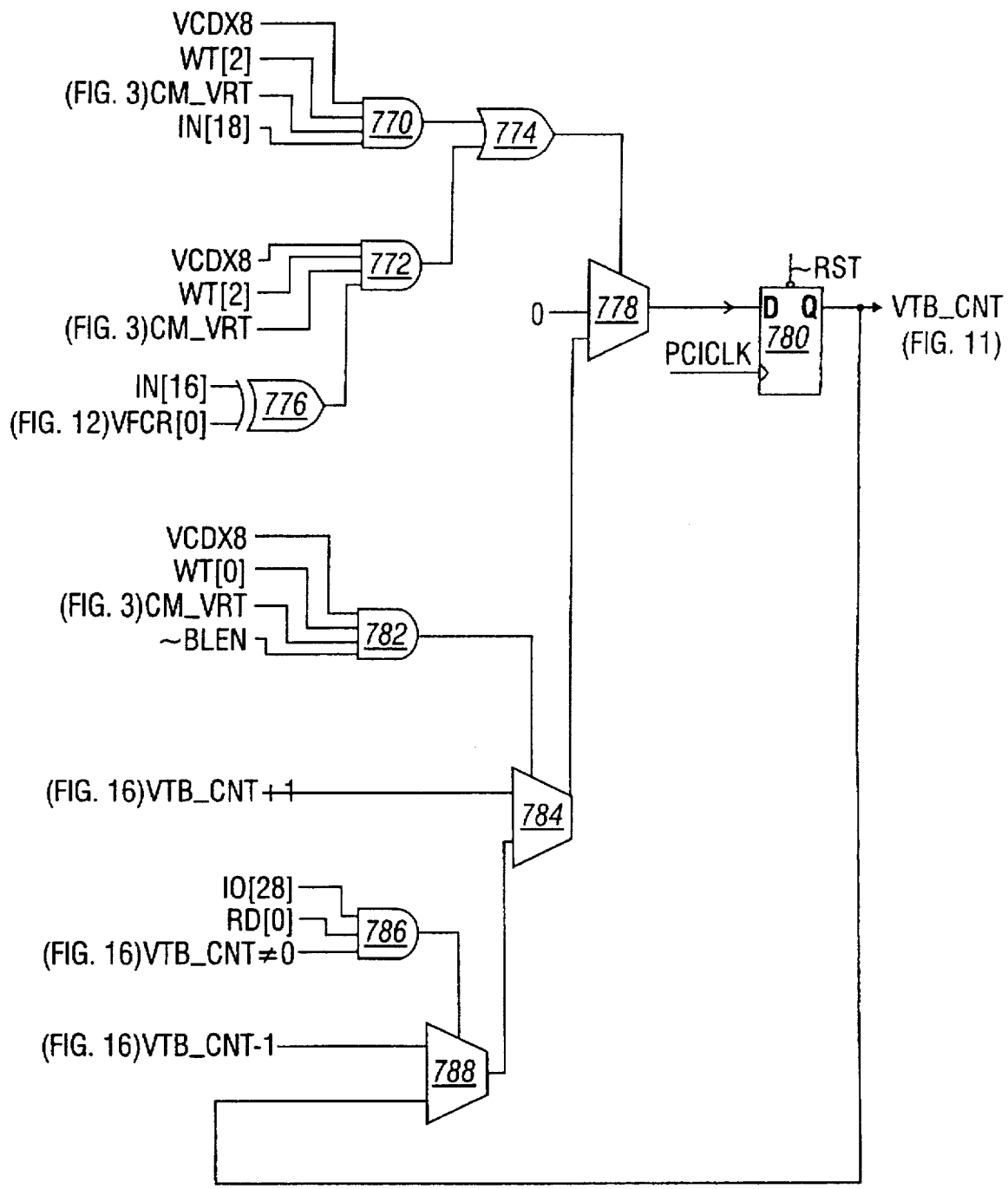
FIG. 16 is a schematic diagram of a circuit for a virtual transmitter buffer counter in the device of FIG. 2.

Turning to FIG. 16, the circuit for tracking the virtual transmitter buffer count is disclosed. In FIG. 16, an AND gate 770 receives VCDX8, WT[2], CMR__VRT, and a bit 18 of IN bus. The output of the AND gate 770 indicates that the OS software is clearing the transmit FIFO. Further, an AND gate 772 receives VCDX8, WT[2], CM__VRT, and the output of an exclusive OR gate 776. The AND gate 772 detects the condition when the OS software is changing the FIFO mode. The exclusive OR gate 776 is connected to IN[16] and VFCR[0]. The output of the AND gates 770 and 772 are provided to an OR gate 774 whose output is connected to the select input of a multiplexer 778. The A input of the multiplexer 778 is grounded. The output of the multiplexer 778 is provided to the input of a register 770 which stores VTB__CNT.

VTB__CNT is also provided to the B input of a multiplexer 788. The A input of the multiplexer 788 is connected VTB__CNT-1, a decremented value of the current VTB__CNT. The select input of the multiplexer 788 is driven by an AND gate 786, whose inputs are IO28, RD[0], and VTB__CNT≠0, a signal indicating that the virtual transmitter buffer count is not equal to zero. The AND gate 786 detects when the SMI firmware is reading a character from the virtual transmit FIFO. The output of the multiplexer 788 is provided to the B input of a multiplexer 784, while the A input of the multiplexer 784 is connected to an incremented value of the virtual transmitter buffer count, VCB__CNT+1. The select input of the multiplexer 784 is driven by an AND gate 782 which detects when the OS software is writing to the transmit FIFO. The AND gate 782 receives VCDX8, WT[0], CM__VRT, and ~BLEN. The output of the multiplexer 784 is connected to the B input of the multiplexer 778.

In addition to the circuitry in the IRC to emulate the UART, the present invention provides software in the form of system management interrupt (SMI). Originally, SMIs were power management interrupts device by Intel Corporation for portable systems. Typically, an SMI is asserted to turn off or reduce the power to any system component in the portable system that is not currently being used. Although originally meant for laptop models, SMIs have become popular for desktop and other stationary models as well, and for purposes other than power management. For instance, in the present invention, SMIs provide the intelligence to enable the IRC to share the COM port between the IRC and OS applications.

SMIs are asserted by an either an SMI timer, by a system request, or by other means. An SMI is a non-maskable interrupt having the highest priority in the system. When an SMI is asserted, an SMI compatible processor 50 maps a portion of memory referred to as the system management memory (SMRAM) into the main memory space. The entire CPU state is then saved in the SMRAM in a stack-like, last in-first out fashion. After the CPU state has been saved, the microprocessor 50 begins executing an SMI handler routine which is an interrupt service routine to perform specific system management tasks like reducing power to specific devices. While the SMI routine is being executed, other interrupt requests are not serviced, and are ignored until the interrupt routine is completed or the microprocessor 50 is reset. When the SMI handler completes its task, the CPU state is retrieved from the SMRAM, and the main program continues.

Figure 17:
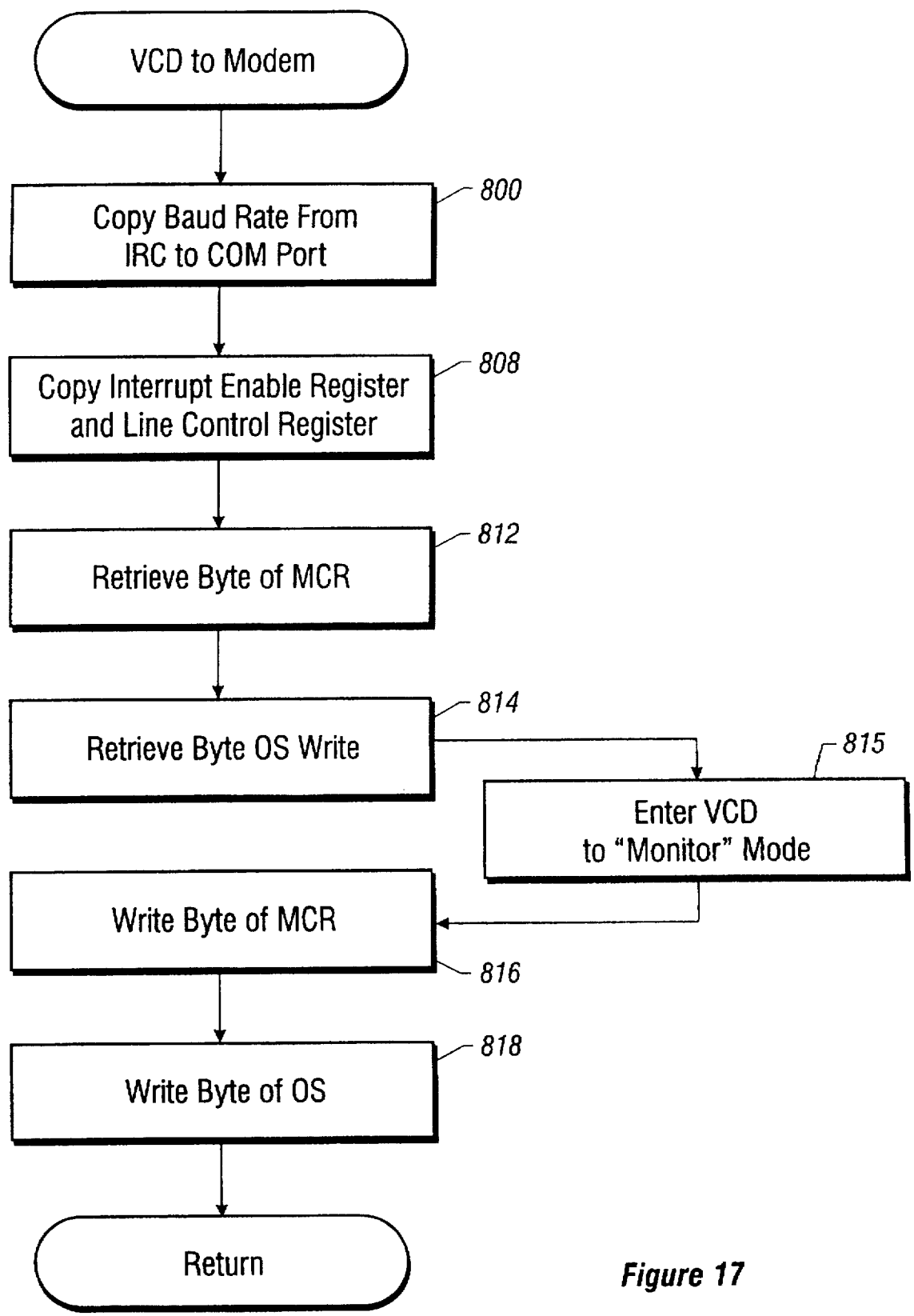
FIG. 17 is a flowchart illustrating the process for copying data from the virtual communication port into the actual communication port in the computer system of FIG. 1.

Turning to the software portion which handles the SMI interrupt signals, the routine to copy data from the virtual communication port COM port into the real COM port is disclosed in FIG. 17. This routine is normally called before giving the operating system control of the modem. In FIG. 17, the baud rate is copied from the IRC to the COM port in step 800. Next, in step 808, the interrupt enable register and line control register settings are copied and sent to the actual UART 145. In step 812, the modem control register byte is retrieved. Further, the byte the operating system wrote is retrieved in step 814. From step 814, the routine places the VCD in a monitor mode in step 815. Next, in step 816, the modem control register is written. Additionally, in step 818, the byte from the operating system is written to generate an IRQ to indicate that the operating system has been allocated the communication port with the modem before the routine of FIG. 17 returns to its caller.

Figure 18:
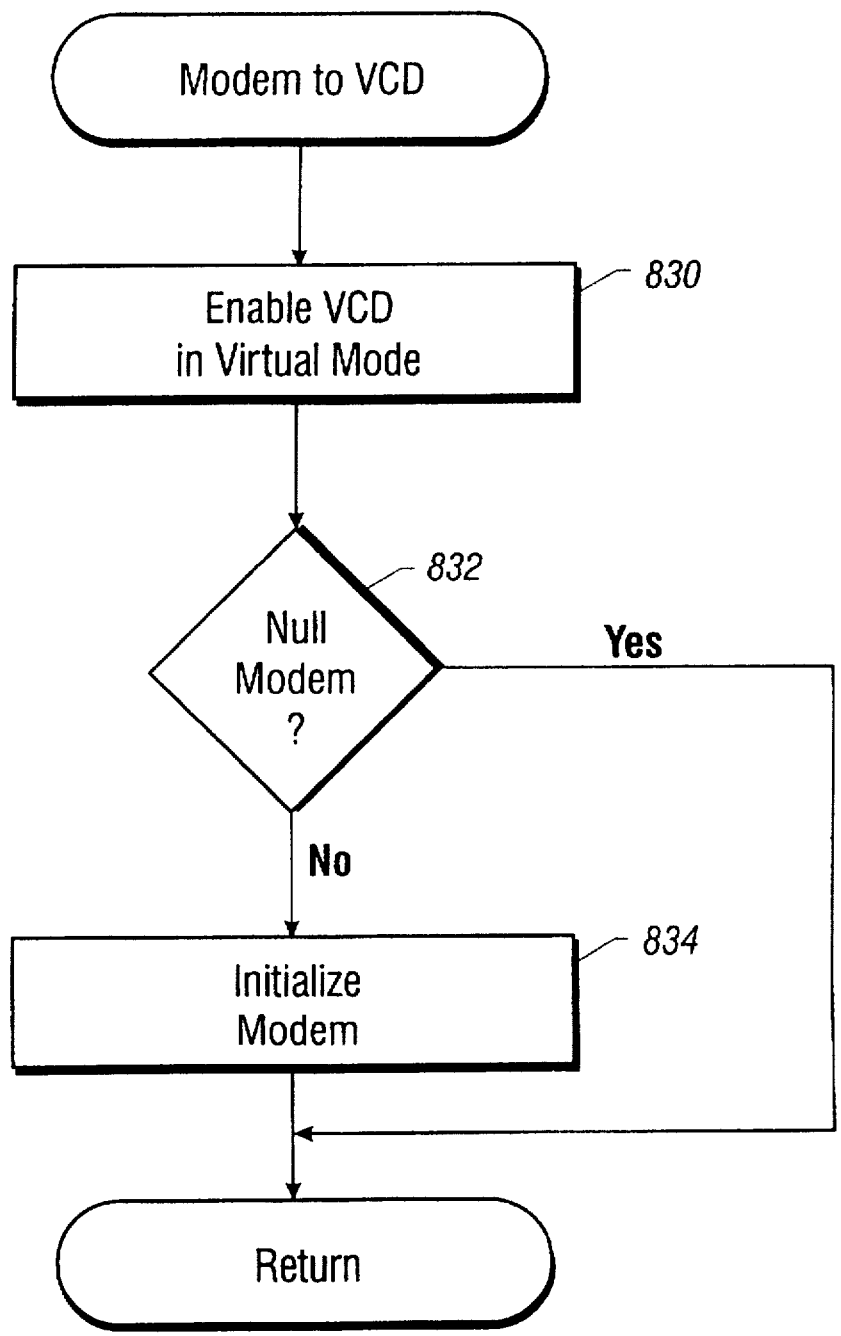
FIG. 18 is a flowchart disclosing the process for copying data from the actual communication port into the virtual communication port in the computer system of FIG. 1.

Turning to FIG. 18, the routine to copy important data from the real COM port into the virtual communication port COM port is disclosed. In step 830, the virtual communication port, or virtual mode, is enabled. Next, in step 832, the routine determines if a modem has been installed. If so, the routine exits. Alternatively, the routine proceeds to step 834 to initialize the modem device before the routine exits.

Figure 19:
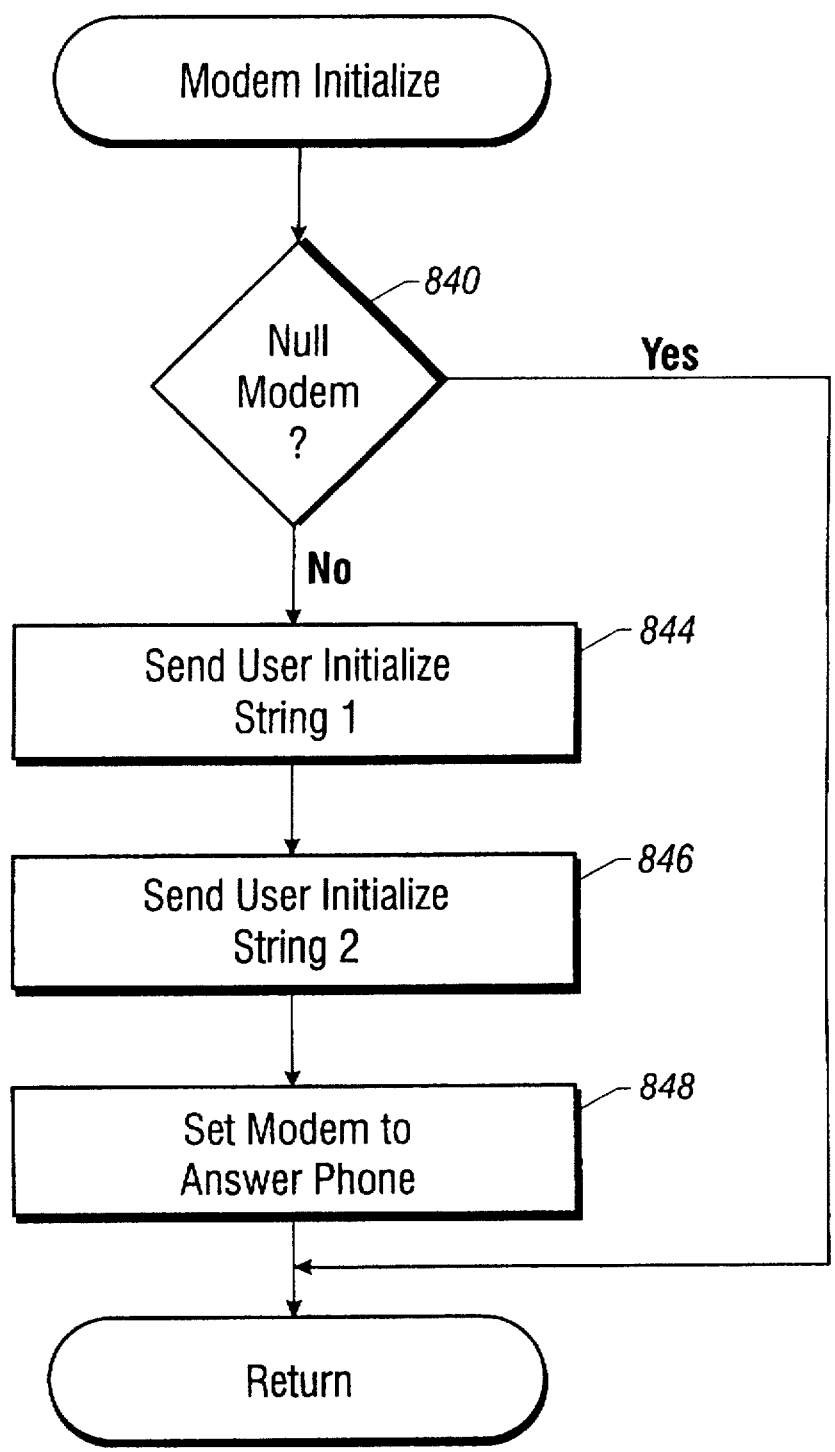
FIG. 19 is a flowchart illustrating the process for initializing the modem in the computer system of FIG. 1.

In FIG. 19, the routine to send the necessary strings into the modem to initialize it properly is disclosed. In step 840, the routine determines if a modem has been installed or not. If not, the routine exits. Alternatively, the routine resets the modem by sending a first user initialization string such as "ATZ" in step 844 and further sends a second user initialization string in step 846. Finally, it sets the modem to an answer mode in step 848 before it returns. Particularly, each time the routine sends a string, the routine resets a timer and becomes idled. When the timer expires, the routine is called again to send the second string. When both strings have been sent, the routine proceeds to step 848 to set the modem to the answer mode before the routine returns.

Figure 20A:
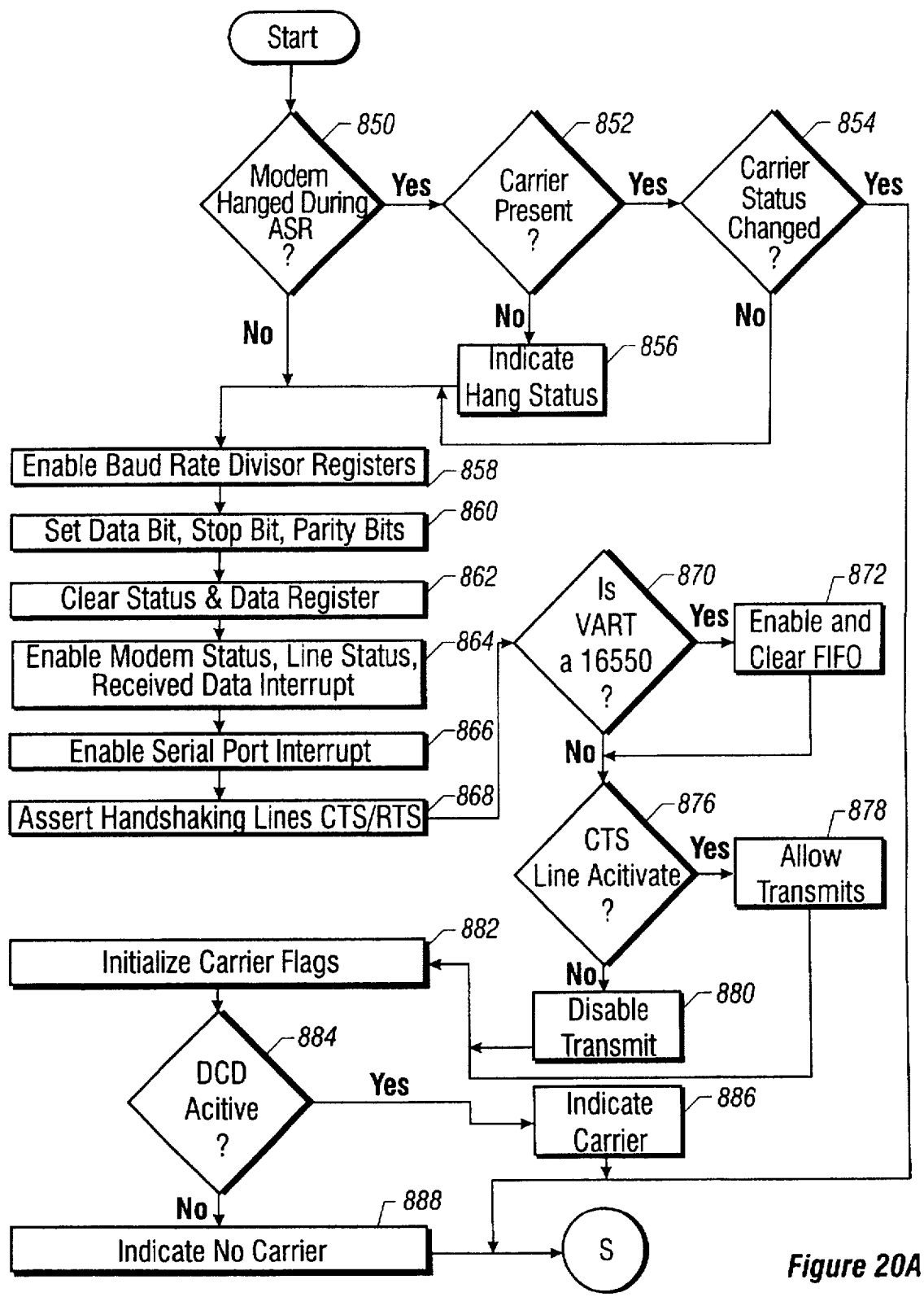
FIGS. 20A and 20B are flowcharts illustrating the initialization of the communication port in the computer system of FIG. 1.
Figure 20B:
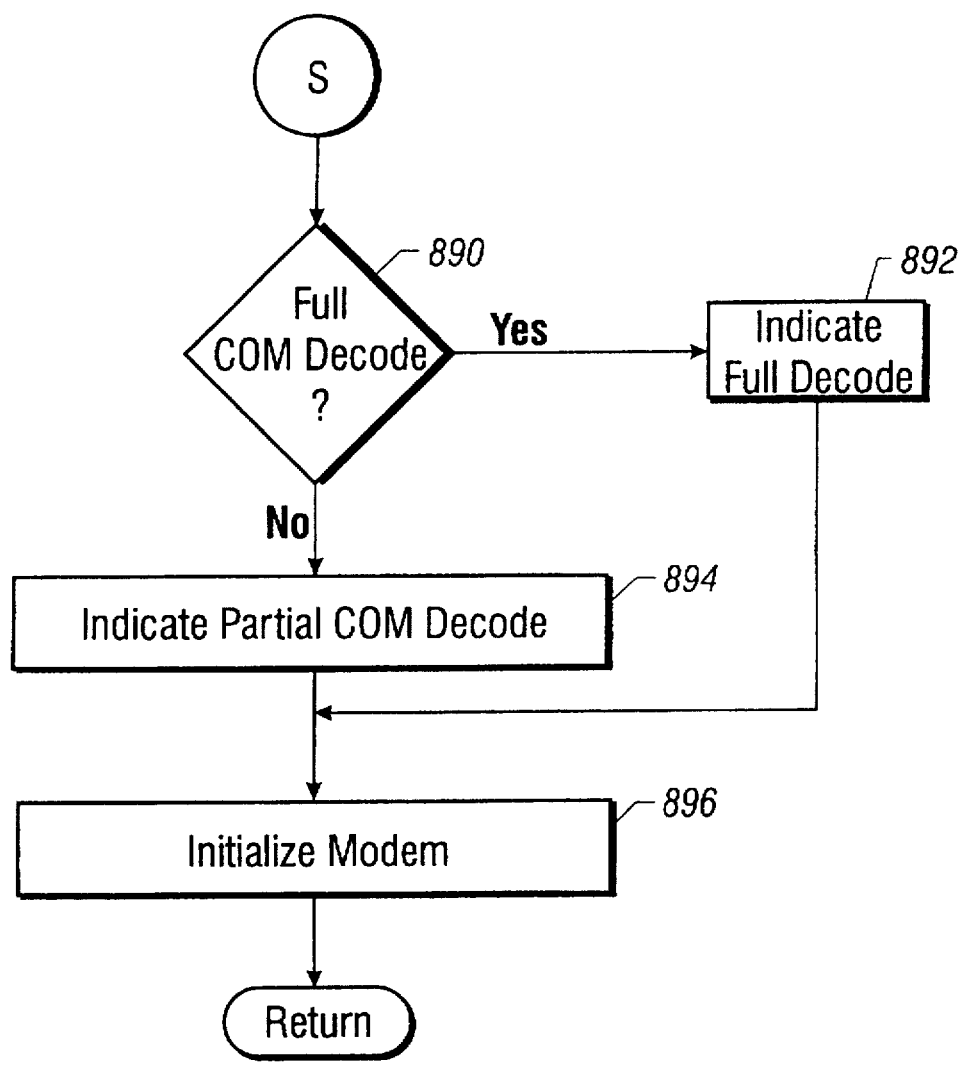

Turning to FIGS. 20A and 20B, the routine to initialize the modem and the modem variable is disclosed. First, in step 850, the routine determines if the modem has hung during the automatic soft reboot (ASR). If so, the routine determines in step 852 whether or not carrier is present. From step 852, if the carrier is present, the routine determines if the carrier status has changed in step 854. If not, the routine jumps to the beginning of FIG. 20B via a jumper S. From step 856, if the modem has not hung, or from step 854 if the carrier status had changed, the routine proceeds to step 858.

In step 858, the routine toggles the DTR to reset the modem device. Next, in step 860, the data bit, stop bit, and parity bit are set as appropriate. Next, the routine clears the status in FIG. 17. This routine is normally called before giving the operating system control of the modem. In FIG. 17, the baud rate is copied from the IRC to the COM port in step 800. Next, in step 808, the interrupt enable register and line control register settings are copied and sent to the actual UART 145. In step 812, the modem control register byte is retrieved. Further, the byte the operating system wrote is retrieved in step 814. From step 814, the routine places the VCD in a monitor mode in step 815. Next, in step 816, the modem control register is written. Additionally, in step 818, the byte from the operating system is written to generate an IRQ to indicate that the operating system has been allocated the communication port with the modem before the routine of FIG. 17 returns to its caller.

Turning to FIG. 18, the routine to copy important data from the real COM port into the virtual communication port COM port is disclosed. In step 830, the virtual communication port, or virtual mode, is enabled. Next, in step 832, the routine determines if a modem has been installed. If so, the routine exits. Alternatively, the routine proceeds to step 834 to initialize the modem device before the routine exits.

In FIG. 19, the routine to send the necessary strings into the modem to initialize it properly is disclosed. In step 840, the routine determines if a modem has been installed or not. If not, the routine exits. Alternatively, the routine resets the modem by sending a first user initialization string such as "ATZ" in step 844 and further sends a second user initialization string in step 846. Finally, it sets the modem to an answer mode in step 848 before it returns. Particularly, each time the routine sends a string, the routine resets a timer and becomes idled. When the timer expires, the routine is called again to send the second string. When both strings have been sent, the routine proceeds to step 848 to set the modem to the answer mode before the routine returns.

Turning to FIGS. 20A and 20B, the routine to initialize the modem and the modem variable is disclosed. First, in step 850, the routine determines if the modem has hung during the automatic soft reboot (ASR). If so, the routine determines in step 852 whether or not carrier is present. From step 852, if the carrier is present, the routine determines if the carrier status has changed in step 854. If not, the routine jumps to the beginning of FIG. 20B via a jumper S. From step 856, if the modem has not hung, or from step 854 if the carrier status had changed, the routine proceeds to step 858.

In step 858, the routine toggles the DTR to reset the modem device. Next, in step 860, the data bit, stop bit, and parity bit are set as appropriate. Next, the routine clears the status in the data register in step 862. Next, it enables the modem status, the line status, and the receive data interrupt in step 864. The routine then enables the serial port interrupt in step 866 before it asserts the hand-shaking lines CTS/RTS in step 868. From step 868, the routine determines if the UART 145 is a 16550 in step 870. If so, the routine enables and clears the FIFO in step 872. From step 870 or step 872, the routine determines if the CTS line is active or not in step 876. If so, it allows the transmission in step 878. If the CTS line is inactive, the routine disables the transmit flag in step 880. From step 878 or step 880, the routine initializes the carrier flag in step 882. Next, it determines if DCD line is active in step 884. If the DCD line is active in step 884, the routine indicates carrier status in step 886. If the DCD line is inactive, the routine indicates no carrier in step 888. From steps 886 or 888 of FIG. 20A, the routine proceeds to step 890 of FIG. 20B. In step 890, the routine determines if the virtual communication port is fully decoded or not. If the virtual port is fully decoded, the routine notes the full decode status in step 892 and proceeds to step 896. Alternatively, if the virtual port is partially decoded, the routine indicates the partial decode status of the virtual port in step 894. From steps 892 or 894, the routine initializes the modem in step 896 before it returns.

Figure 21:
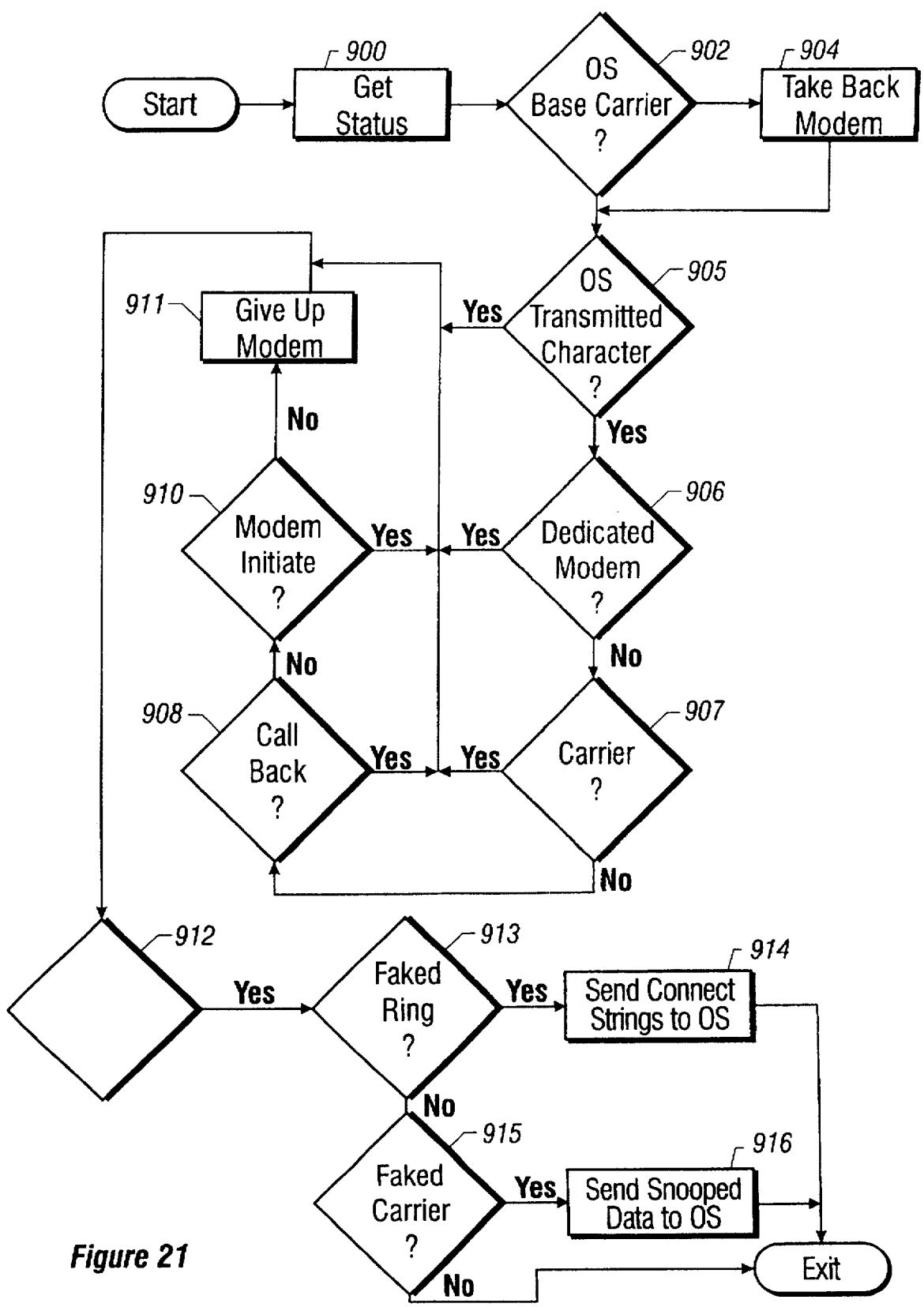
FIG. 21 is a flowchart illustrating the process for handling the SMI interrupt associated with the virtual communication port in the computer system of FIG. 1.

In FIG. 21, the routine to handle the virtual communication port is disclosed. This routine is typically called from a main routine for handling SMI interrupts. In the event that the main SMI handling routine detects a modem interrupt event, the main SMI routine would jump into the routine of FIG. 21. The modem interrupt events could be caused by a number of conditions, including when the operating system loses its carrier or when the operating system is attempting to transmit via the virtual transmit data buffer VTDB. Upon entry to the virtual COM device handler, the routine gets the virtual port 200 status in step 900. Next, it determines if the operating system application has lost carrier in step 902. If so, the routine reassigns modem ownership back to the IRC in step 904. From step 902 or 904, the routine checks if the OS has transmitted a character in step 905. If not, the routine checks whether the modem is a dedicated modem in step 906.

From step 906, if the modem is not a dedicated modem, the routine of FIG. 21 checks if carrier is present in step 907. If not, the routine then checks if a call back is needed in step 908. If not, the routine then checks if the modem needs to be initialized in step 910. If the tests in step 906 through 910 fail collectively, the routine gives up the modem to the operating system in step 911. Alternatively, if any of the tests in step 906 through 910 pass, the routine allows the IRC to retain the modem and proceeds to step 912.

In step 912, the routine of FIG. 21 checks if the OS has read the faked MSR change signal. If not, the routine exits. Alternatively, if the OS has read the MSR change signal, the routine further checks if the signal is a faked ring in step 913. If so, the routine proceeds from step 913 to step 914 where it sends the correct string to the operating system before the routine exits.

From step 913, if the signal is not a faked ring, the routine of FIG. 21 proceeds to check if the signal is a faked carrier signal in step 915. If so, the routine sends the snooped data to the OS in step 916. From step 916, the routine of FIG. 21 completes its operation and exits.

Figure 22:
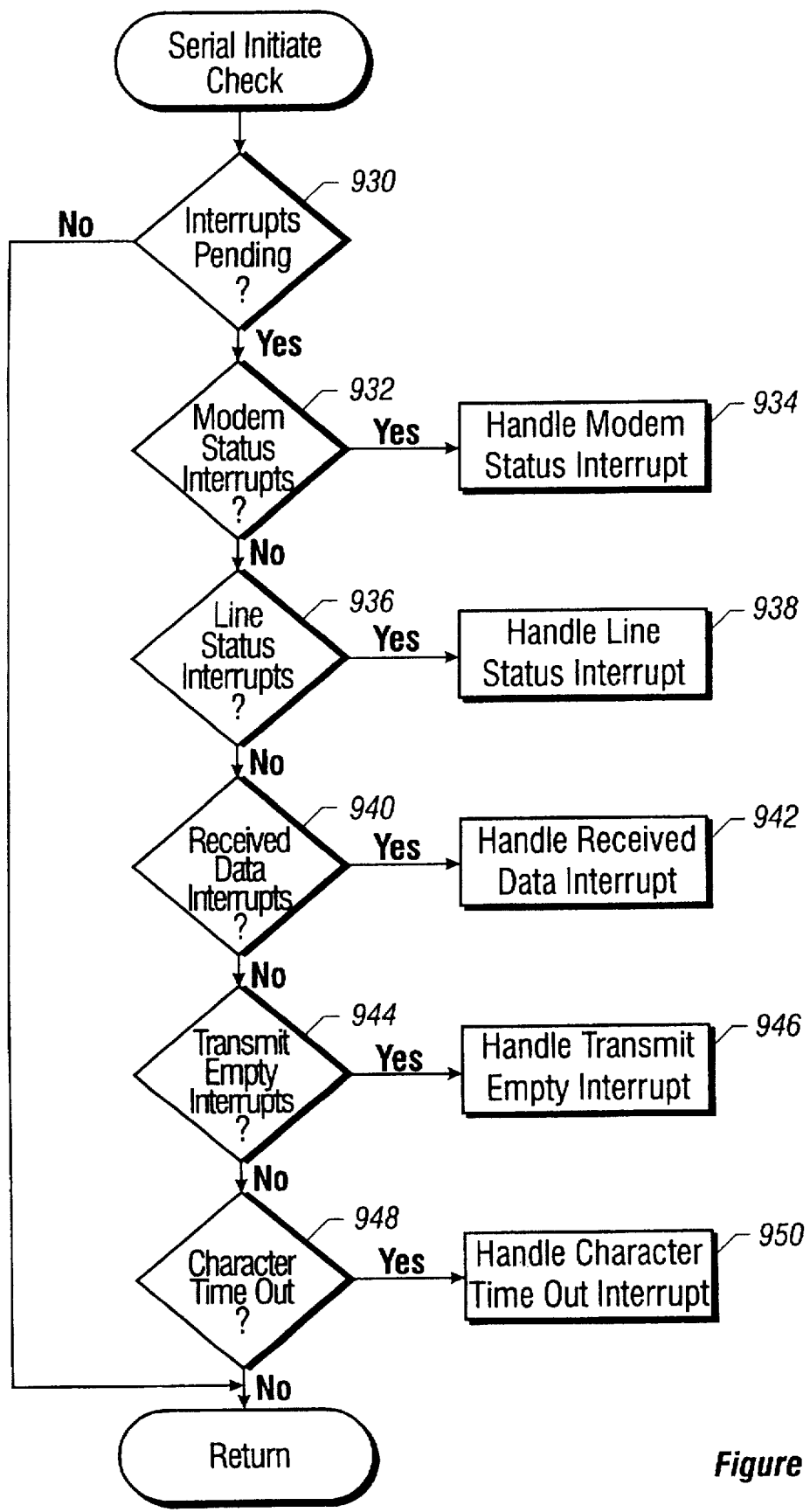
FIG. 22 is a flowchart illustrating the process of handling the serial interrupt during the process illustrated in FIG. 21.

Turning to FIG. 22, the serial interrupt handler for serial interrupts is disclosed. This routine handles five types of serial interrupts:

Modem Status Interrupt, typically caused by a change in the control line of the modem status register;

Line Status Interrupt, typically caused by an error or a break condition;

Receive Data Interrupt, typically caused when a character is received and the FIFO is full;

Transmitter Buffer Empty Interrupt, typically caused when a transmitter holding register becomes empty; or Character Time out, typically caused by a timeout in the FIFO.

Generally, these interrupts are cleared by reading the status register associated with each of the interrupts, with the exception of the transmitter buffer empty interrupt. In the case of a transmitter buffer empty interrupt, it is cleared upon reading the IIR and no other status register reading is necessary since the SMI cannot be interrupted.

In FIG. 22, the routine determines if interrupts are pending in Step 930. If not, the routine simply returns. If interrupts are pending, the routine determines in step 932 if a modem status interrupt is pending. If so, the routine jumps to handle the modem status interrupt in step 934. If not, the routine next determines if the line status interrupt is pending in step 936. If so, the routine jumps to handle the line status interrupt in step 938. Alternatively, the routine determines in step 940 to see if the receive data interrupt is pending. If so, the routine jumps in step 942 to handle the receive data interrupt routine. From step 940, if the interrupt is not a receive data interrupt, the routine then determines if the interrupt is a transmitter buffer empty interrupt in step 944. If so, the routine jumps to the handler for the transmitter empty routine in step 946. Alternatively, if the transmitter buffer empty interrupt is not pending in step 944, the routine determines if the character timeout interrupt is pending in step 948. If so, the routine jumps to handle the character timeout interrupt in step 940. From step 940 or from step 930, if no interrupts are pending, the routines simply returns.

Figure 23:
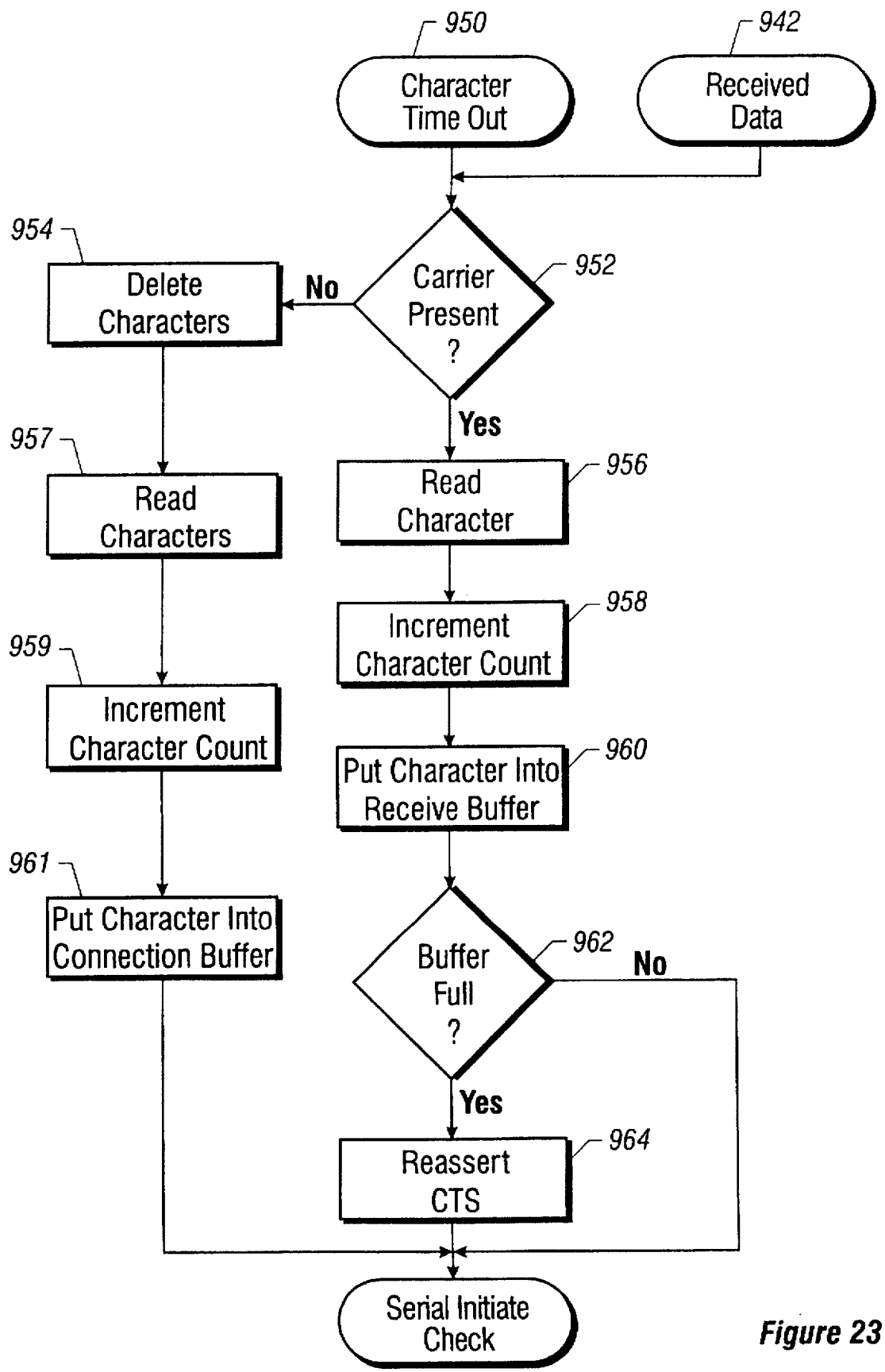
FIG. 23 is a flowchart illustrating the process of handling the character timeout interrupt or the receive data interrupt during the process illustrated in FIG. 22.

The routine to handle the character timeout interrupt or the receive data interrupt is disclosed in FIG. 23. In the event that the interrupt pending is a character timeout interrupt in step 950, or in the event that the pending interrupt is a receive data interrupt in step 942, the routine next determines if a carrier is present in step 952.

If not, the routine deletes characters from the buffer in step 954 and proceeds to step 957 where it reads the next character in step 957. From step 957, the routine increments the character count in step 959. Next, the routine of FIG. 3 puts the character into a connection buffer before exiting to the serial interrupt check routine of FIG. 22. In this manner, the characters are stored even when the carrier is not present as the signal may be a "ring" or a "connect" signal which needs to be passed to the OS if the call is not for the IRC.

From step 952, if a carrier is present, the routine reads the next character in step 956 and increments the character count in step 958. Next, it puts the character into the receive buffer in step 960. It then determines if the buffer is full in step 962. If it is, the routine deasserts the clear to send (CTS) signal in step 964 to prevent further characters from being transmitted. From step 962, if the buffer is not full, the routine simply returns to the serial interrupt check routine of FIG. 22.

Figure 24:
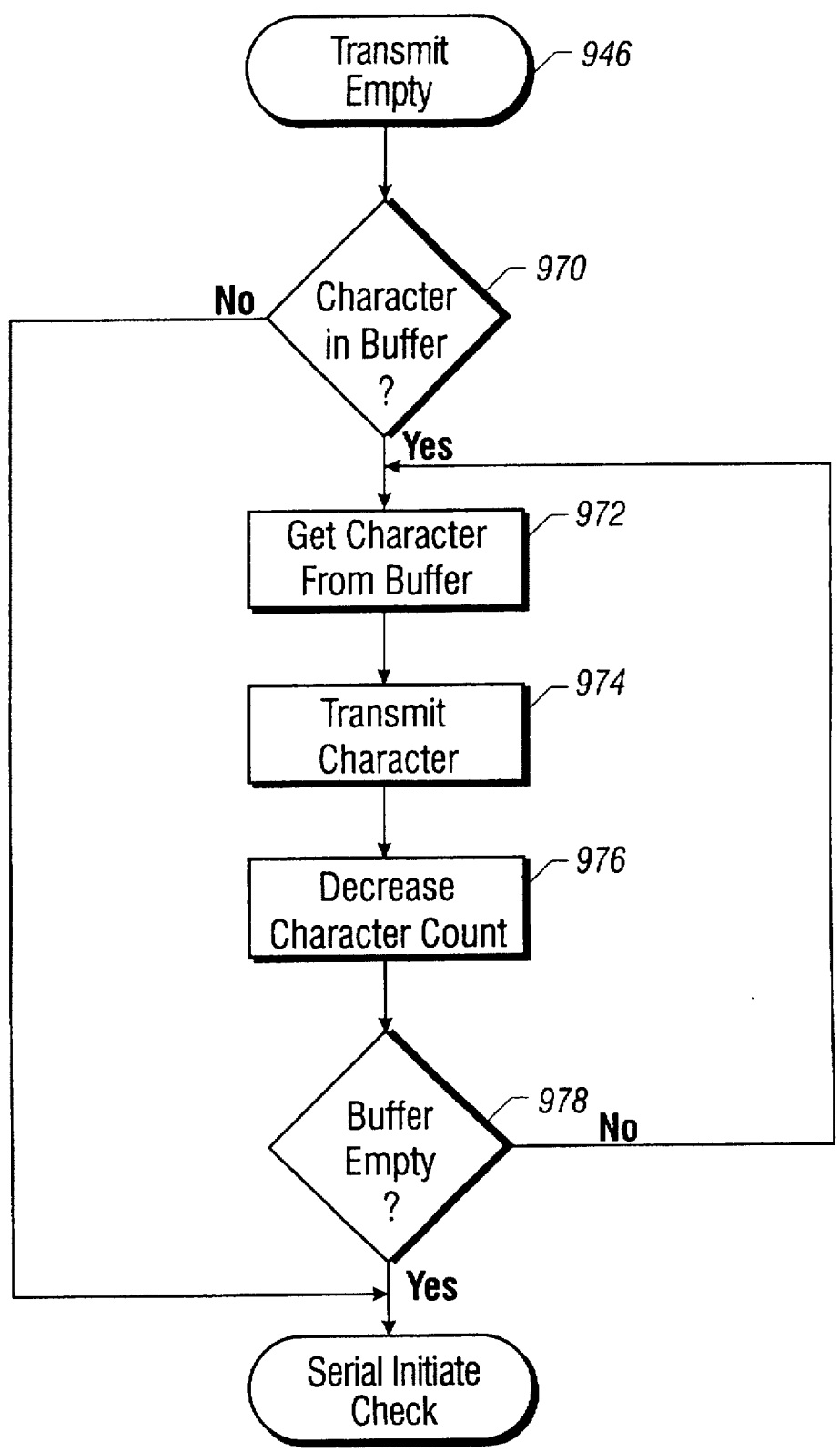
FIG. 24 is a flowchart illustrating the process for handling the transmitter buffer empty interrupt during the process illustrated in FIG. 22.

Turning to FIG. 24, the routine to handle the condition where the pending interrupt is a transmitter empty interrupt. From step 946, the routine determines if a character exists in the buffer in step 970. If not, the routine simply returns to the serial interrupt routine of FIG. 22. From step 970, if a character exists in the buffer, the routine retrieves the character from the buffer in step 974. The buffer preferably stores sixteen characters at a time. Next, it transmits the character in step 974 and decreases the character count by one in step 976. The routine then determines if the buffer is empty in step 978. If not, the routine returns to step 972 to transmit the next character. Alternatively, if the buffer is empty, the routine is finished and returns to the serial interrupt routine of FIG. 22.

Figure 25A:
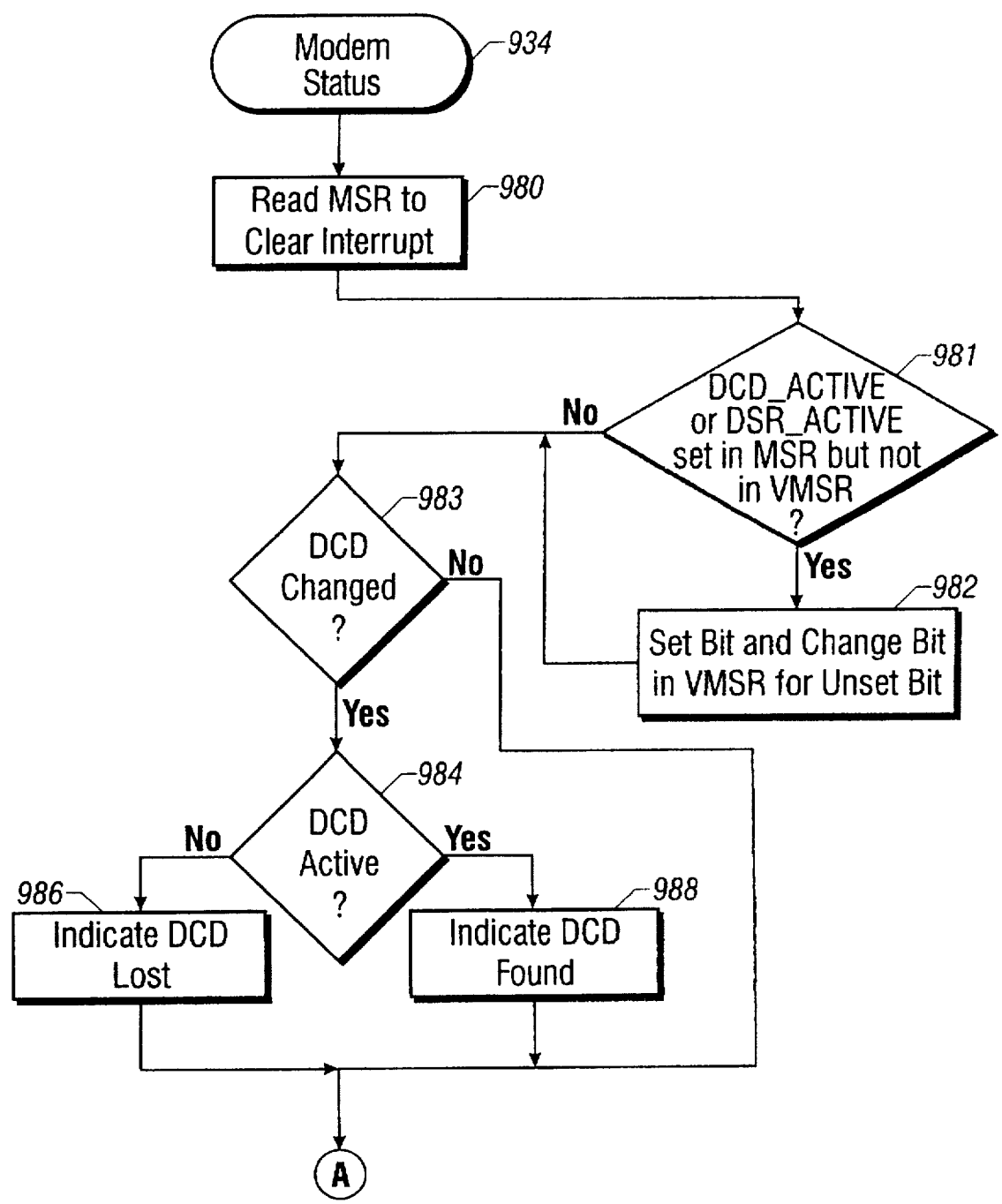
FIG. 25 is a flowchart illustrating the process for handling the modem status interrupt during the process illustrated in FIG. 22.
Figure 25B:
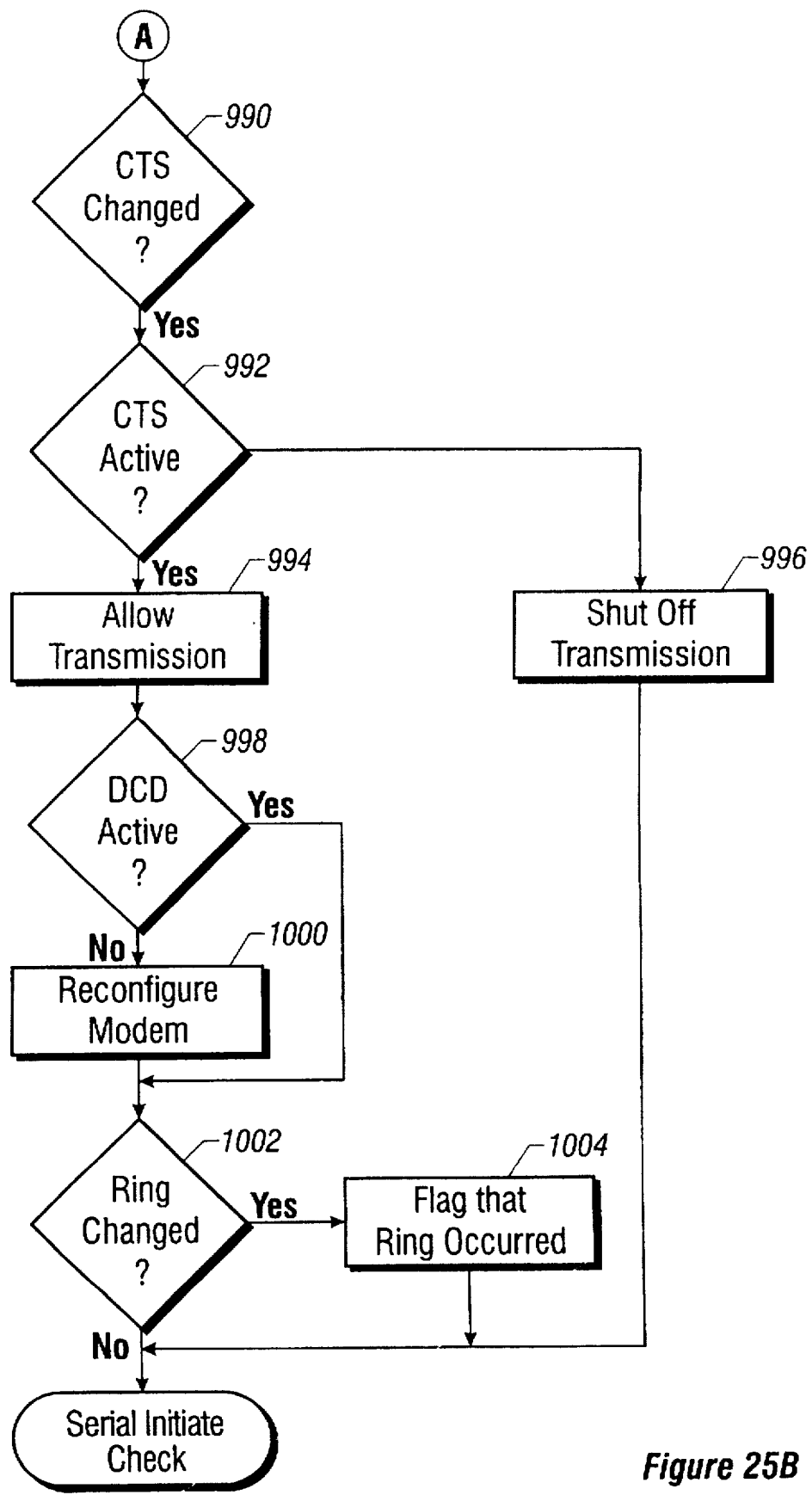

In FIG. 25, the routine to handle the modem status interrupt is disclosed. From step 934, the routine reads the modem status register to clear the interrupts therein in step 980. From step 980, the routine checks if DCD_ACTIVE bit is set, or if DSR_ACTIVE bit is set in the MSR but not the VMSR register in step 981. If so, the routine sets VMSR register to take care of the possibility that one of these bits may not have been set when the VMSR register was first initialized.

Next, the routine determines if the data carrier detect DCD line has changed in step 983. If so, the routine proceeds to check to determine if the DCD is active in step 984. From step 984, if the DCD is inactive, the routine indicates that DCD is lost in step 986. Alternatively, from step 984, the routine indicates that a DCD has been found in step 988. From step 982 if the DCD had not changed, or from steps 986 or 988, the routine proceeds to step 990 where it determines if the clear to send (CTS) signal has changed. If so, the routine next determines if the CTS is active in step 992. If the CTS is active in step 992, the routine allows the transmission to continue in step 994.

From step 994, the routine checks if the DCD_ACTIVE bit is set in step 998. If not, the routine reconfigures the modem in step 1000. From step 990, 998 or 1000, the routine of FIG. 25 proceeds to check whether the ring bit has changed in step 1002. If so, the routine sets a flag to indicate that the ring has occurred in step 1004 to warn the OS. Finally, from step 996, 1002, or 1004, the routine proceeds to the serial interrupt routine of FIG. 22.

The thus disclosed invention provides an apparatus which shares a resource, preferably a modem, between operation system software and remote console software to provide remote console capability at a low cost. In combination, the virtual communication port, the processor and the arbitrator transparently orchestrate accesses to a standard modem between the operating system software and the remote console software so that only one of either the operating system software or the remote console software controls the modem at a time.

During the boot-up of the server, the operating system looks for the presence of the COM port by reading and writing to the register of the UART device 145. These accesses are intercepted by the apparatus of the present invention, which responds to the register accesses by emulating the industry standard UART responses such that the presence and availability of the COM port is duly noted by the operating system as being available for accesses by the first application, even though the UART supporting the COM port is initially allocated to the second application which performs remote console functions.

When the server is running and the remote console software is not being executed, an application software on the operating system is permitted to dial-out or to receive incoming communications using the modem. During a dial-out, the application software generates writes to the COM port. The writes to the COM port wakes up the arbitrator via the SMI interrupt. The arbitrator decides whether or not write operations from the first application should be forwarded to the modem. If the second application is not using the modem, the SMI software switches in the modem and allows the application software to directly access the modem. The SMI software stays resident in the background and snoops, or monitors, accesses to the modem to monitor modem usage. If the modem carrier drops or the modem carrier is not established within a predetermined time, the SMI software ejects the first application from ownership of the modem, reclaims control of the modem, and reallocates the modem source back to the second application in anticipation of remote console sessions.

For dial-in accesses, the modem is configured to answer the incoming call. The arbitrator examines the first few characters received to determine the intended destination of the incoming call. If the initial few characters indicate that a remote console session is to be established, such as three carriage returns, the arbitrator maintains ownership of the modem with the second application for performing remote console functions. Upon receipt of ASCII characters from the modem in the remote console mode, the IRC device 170 converts the ASCII character into scan codes and presents the scan codes to the 8042 keyboard controller 156. The scan codes generated by the IRC device 170 emulate the keyboard output such that the keyboard controller 156 believes that the local keyboard is actually being depressed, even though the keyboard of the remote computer is actually being actuated by the remote operator. Thus, the operator can diagnose or cause the server system to reboot. Alternatively, in the second embodiment of the invention, if the initial few characters of the first packet is an operating system application related packet such as a point-to-point packet (PPP) and the second application software is not accessing the modem, the apparatus of the present invention relinquishes the modem to the first application.

The use of the virtual processor and the virtual communication port via the SMI mode to control the standard modem ensures that the remote console client can control the operation of the server, even if the operating system of the server had crashed. Thus, by tapping into the processing power of the server CPU and the existing modem to applications on execute remote console operations when necessary and to relinquish the modem to applications on the operating system when remote console operations are no longer being performed, the present invention allows for the a modem to be robustly shared between the operating system application and the remote console application. Hence, the overall cost of the server is reduced while the benefits and features associated with the remote console function are still provided.

It can now be appreciated that the communication port/ modem system implemented according to the disclosed embodiment works with various standardized modem command protocols, including the Hayes protocol. It can further be appreciated that the sharing of an inexpensive industry standard modem between the operating system and the remote console software results in substantial efficiency and monetary savings. Further, the preferred embodiment is preferably implemented as a module independent specific operating system software and specific data communication protocol, so that the virtual communication port can easily work with other operating systems.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A computer system having a first mode of operation and a second mode of operation, said modes of operation sharing access to a resource, said computer system comprising:

a processor adapted for executing a first application in the first mode of operation and a second application in the second mode of operation;

a data storage device coupled to said processor, said data storage device adapted to buffer data associated with said first and second modes of operation;

a communication port for communicating with the resource, said communication port normally allocated to receive accesses from the second application;

a virtual port for emulating said communication port, said virtual port diverting accesses from the first application directed at said communication port and buffering the accesses in said virtual port; and an arbitrator coupled to said processor, said communication port, and said virtual port, said arbitrator claiming said communication port from the second application and forwarding accesses received by said virtual port to said communication port if the first application is accessing the resource and if said communication port is idle, said arbitrator reallocating said communication port to said second application upon the termination of accesses to the resource by the first application.

2. The computer system of claim 1, wherein said first mode is an operating system mode and said second mode is a remote console mode.

3. The computer system of claim 1, further comprising a first bus coupled to said processor and to said arbitrator.

4. The computer system of claim 3, wherein said first bus is a Peripheral Component Interconnect (PCI) bus.

5. The computer system of claim 4, wherein said PCI bus has cycles, said arbitrator positively decoding the PCI cycles to said communication port when said first application accesses said communication port while said second application owns said resource.

6. The computer system of claim 4, wherein said virtual port snoops accesses to the resource from the first application to allow said arbitrator to detect the termination of accesses to the resource from said first application.

7. The computer system of claim 4, wherein said virtual port emulates registers of a Universal Asynchronous Receiver/Transmitter (UART).

8. The computer system of claim 7, wherein said virtual port generates an interrupt to said processor, further comprising a Transmitter Data Buffer (TDB) register, said virtual port interrupting said processor when said TDB register is written to.

9. The computer system of claim 8, wherein said communication port has registers corresponding to said virtual port registers, further comprising an interrupt handler, said interrupt handler forwarding the contents of said registers in said virtual port to registers in said communication port if said arbitrator has claimed said communication port for the first application.

10. The computer system of claim 8, wherein said virtual port generates a System Management Interrupt (SMI) to the processor when said TDB register is written to.

11. The computer system of claim 3, further comprising a second bus coupled to said processor, wherein said communication port is coupled to said second bus.

12. The computer system of claim 11, wherein said second bus is selected from a group consisting of an Industry Standard Architecture (ISA) bus and an Extended Industry Standard Architecture (EISA) bus.

13. The computer system of claim 3, wherein said first bus is a Peripheral Component Interconnect (PCI) bus and wherein said communication port is coupled to said PCI bus.

14. The computer system of claim 1, wherein said communication port is located at a communication port address and wherein said first and second applications direct accesses to said communication port address.

15. The computer system of claim 1, further comprising an operating system for execution by said processor, said operating system identifying and initializing said virtual port upon booting up.

16. The computer system of claim 15, wherein said first application establishes a connection to a remote computer using a protocol, said arbitrator further comprising a protocol detector for detecting accesses to said first application.

17. The computer system of claim 16, wherein said protocol detector examines a predetermined number of characters transmitted from said remote computer to detect the first application protocol.

18. The computer system of claim 16, wherein said protocol detector gobbles said predetermined number of characters and wherein said remote computer retransmits said predetermined number of characters.

19. The computer system of claim 16, wherein said protocol detector forwards all data characters or predetermined signals to the first application.

20. The computer system of claim 1, wherein said resource is an industry standard modem.

21. The computer system of claim 1, wherein said communication port is located at a predetermined interrupt range and wherein said virtual port is located at a virtual interrupt range, said arbitrator translating said virtual interrupt range into said predetermined interrupt range.

22. The computer system of claim 1, wherein said accesses from first and second applications are accesses directed at a modem.

23. An apparatus for sharing access to a resource in a computer system, said computer system having a first mode of operation and a second mode of operation, said computer system having a processor adapted for executing a first application in the first mode of operation and a second application in the second mode of operation, said apparatus comprising:

a communication port for receiving the resource, said communication port normally allocated to receive accesses from the second application;

a virtual port for emulating said communication port, said virtual port diverting accesses from the first application directed at said communication port and buffering the accesses in said virtual port; and an arbitrator coupled to said processor, said communication port, and said virtual port, said arbitrator claiming said communication port from the second application and forwarding accesses received by said virtual port to said communication port if the first application is accessing the resource and if said communication port is idle, said arbitrator reallocating said communication port to said second application upon the termination of accesses to the resource by the first application.

24. The apparatus of claim 23, wherein said first mode is an operating system mode and said second mode is a remote console mode.

25. The apparatus of claim 23, further comprising a first bus coupled to said processor and to said arbitrator.

26. The apparatus of claim 25, wherein said first bus is a Peripheral Component Interconnect (PCI) bus.

27. The apparatus of claim 26, wherein said PCI bus has cycles, said arbitrator positively decoding the PCI cycles to said communication port when said first application accesses said communication port while said second application owns said resource.

28. The apparatus of claim 26, wherein said virtual port snoops accesses to the resource from the first application to allow said arbitrator to detect the termination of accesses to the resource from said first application.

29. The apparatus of claim 26, wherein said virtual port emulates registers of a Universal Asynchronous Receiver/Transmitter (UART).

30. The apparatus of claim 29, wherein said virtual port generates an interrupt to said processor, further comprising a Transmitter Data Buffer (TDB) register, said virtual port interrupting said processor when said TDB register is written to.

31. The computer system of claim 30, further comprising a second bus coupled to said processor, wherein said communication port is coupled to said second bus.

32. The apparatus of claim 30, wherein said virtual port generates a System Management Interrupt (SMI) to the processor.

37

33. The apparatus of claim 25, further comprising a second bus coupled to said first bus, wherein said communication port resides on said second bus.

34. The apparatus of claim 33, wherein said second bus is selected from a group consisting of an Industry Standard Architecture (ISA) bus and an Extended Industry Standard Architecture (EISA) bus.

35. The apparatus of claim 25, wherein said first bus is a Peripheral Component Interconnect (PCI) bus and wherein said communication port is coupled to said PCI bus.

36. The apparatus of claim 23, wherein said communication port is located at a communication port address and wherein said first and second applications direct accesses to said communication port address.

37. The apparatus of claim 23, further comprising an operating system for execution by said processor, said operating system identifying and initializing said virtual port upon booting up.

38. The apparatus of claim 37, wherein said first application establishes a connection to a remote computer using a protocol, said arbitrator further comprising a protocol detector for detecting accesses to said first application.

39. The apparatus of claim 38, wherein said protocol detector examines a predetermined number of characters transmitted from said remote computer to detect the first application protocol.

40. The apparatus of claim 38, wherein said protocol detector gobbles said predetermined number of characters and wherein said remote computer retransmits said predetermined number of characters.

41. The apparatus of claim 38, wherein said protocol detector forwards all data characters to the first application.

42. The apparatus of claim 23, wherein the resource is an industry standard modem.

43. The apparatus of claim 23, wherein said communication port is located at a predetermined interrupt range and wherein said virtual port is located at a virtual interrupt range, said arbitrator translating said virtual interrupt range into said predetermined interrupt range.

44. The apparatus of claim 23, wherein said accesses from first and second applications are accesses directed at a modem.

45. A method for sharing a resource in a computer system between a first application executing in a first mode of operation and a second application executing in a second mode of operation, said computer system having a communication port which is adapted to receive the resource, the method comprising the steps of:

initially allocating said communication port to the second application;

emulating the communication port with a virtual port;

buffering accesses to the communication port from the first application to said virtual port;

detecting whether the communication port is being accessed by the first application;

when the second application is not accessing the communication port, claiming the resource from the second

38 application and forwarding accesses stored in said virtual port to said communication port; and upon the termination of accesses from the first application, reallocating said communication port to the second application.

46. The method of claim 45, wherein said executing step further comprises the step of running the first application in an operating system mode.

47. The method of claim 45, wherein said executing step further comprises the step of running the second application in a remote console mode.

48. The method of claim 45, wherein said computer system has PCI bus cycles, further comprising the step of positively decoding the PCI cycles to said communication port when said first application accesses said communication port while said second application owns said resource.

49. The method of claim 48, further comprising the step of snooping accesses to the resource from the first application to detect the termination of accesses to the resource from said first application.

50. The method of claim 45, further comprising the step of emulating registers of a Universal Asynchronous Receiver/Transmitter (UART).

51. The method of claim 50, wherein one of said registers is a Transmitter Data Buffer (TDB) register, further comprising the step of interrupting said processor when said TDB register is written to.

52. The method of claim 51, wherein said communication port has registers corresponding to said virtual port registers, further comprising the step of forwarding the contents of said registers in said virtual port to registers in said communication port if said arbitrator has claimed said communication port for the first application.

53. The method of claim 52, wherein said interrupting step comprises the step of generating a System Management Interrupt (SMI) to the processor.

54. The method of claim 45, wherein said first application establishes a connection to a remote computer using a protocol, further comprising the step of detecting said protocol from said remote computer.

55. The method of claim 54, further comprising the step of examining a predetermined number of characters transmitted from said remote computer to detect said protocol.

56. The method of claim 55, further comprising the step of causing said remote computer to retransmit said predetermined number of characters.

57. The method of claim 55, further comprising the step of forwarding said buffered characters to the first application.

58. The method of claim 46, wherein said communication port is located at a predetermined interrupt range and wherein said virtual port is located at a virtual interrupt range, further comprising the step of translating said virtual interrupt range into said predetermined interrupt range.

59. The method of claim 58, wherein virtual port is located at an ISA compatible interrupt range.

* * * * *